(12) United States Patent
Kurita et al.

(10) Patent No.: US 11,597,639 B2
(45) Date of Patent: Mar. 7, 2023

(54) TRANSPORT APPARATUS

(71) Applicant: Ricoh Company, Ltd., Tokyo (JP)

(72) Inventors: Satoru Kurita, Kanagawa (JP);
Kazunori Bannai, Kanagawa (JP);
Daisuke Maeda, Kanagawa (JP);
Satoshi Okuno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 464 days.

(21) Appl. No.: 16/822,156

(22) Filed: Mar. 18, 2020

(65) Prior Publication Data

US 2020/0299118 A1 Sep. 24, 2020

(30) Foreign Application Priority Data

Mar. 20, 2019 (JP) .............................. JP2019-053777

(51) Int. Cl.
*B62B 3/06* (2006.01)
*B66F 9/20* (2006.01)
(Continued)

(52) U.S. Cl.
CPC .............. *B66F 9/20* (2013.01); *B62B 3/0612* (2013.01); *B66F 9/065* (2013.01); *B66F 9/0755* (2013.01);
(Continued)

(58) Field of Classification Search
CPC .................... B62B 2203/28; B62B 2203/24
See application file for complete search history.

(56) References Cited

U.S. PATENT DOCUMENTS

| | | | | |
|---|---|---|---|---|
| 4,747,610 A | * | 5/1988 | Yingling | ............... B62B 3/0612 280/43.12 |
| 8,632,082 B2 | * | 1/2014 | Lantz | .................... B66F 9/0755 280/43.12 |

(Continued)

FOREIGN PATENT DOCUMENTS

| | | |
|---|---|---|
| CA | 2138713 A1 | 6/1996 |
| CN | 104649183 A | 5/2015 |

(Continued)

OTHER PUBLICATIONS

Combined Chinese Office Action and Search Report dated Apr. 2, 2021 in Chinese Patent Application No. 202010155823.7 (with English translation of Categories of Cited Documents), 10 pages.

(Continued)

*Primary Examiner* — Mark C Hageman
(74) *Attorney, Agent, or Firm* — Xsensus LLP

(57) ABSTRACT

A transport apparatus includes a body; a fork having one portion supported by the body and another portion protruded from the body; a lifting unit; a control unit; a primary rotatable member mounted at a front end portion of the fork; an auxiliary rotatable member mounted at a rotatable-member-attaching position of the fork closer to a front end portion or a rear end portion of the fork compared to the primary rotatable member; and a step detection unit, disposed at a detection-unit-attaching position of the fork closer to the front end portion or closer to the rear end portion of the fork compared to the auxiliary rotatable member, the step detection unit configured to detect a step member of a carriage base. The control unit lowers the fork using the lifting unit in response to a detection of the step member by the step detection unit.

7 Claims, 58 Drawing Sheets

(51) Int. Cl.
  *B66F 9/065* (2006.01)
  *B66F 9/075* (2006.01)
(52) U.S. Cl.
  CPC ....... *B62B 2203/24* (2013.01); *B62B 2203/28* (2013.01)

(56) References Cited

U.S. PATENT DOCUMENTS

| | | | |
|---|---|---|---|
| 10,421,474 B2* | 9/2019 | Jonasson | B62B 3/0612 |
| 2017/0153641 A1 | 6/2017 | Serizawa et al. | |
| 2017/0349197 A1* | 12/2017 | Jonasson | B62B 5/0069 |
| 2020/0231199 A1* | 7/2020 | Dunigan | B62B 3/02 |
| 2021/0002114 A1* | 1/2021 | Long | B62B 3/0612 |

FOREIGN PATENT DOCUMENTS

| | | |
|---|---|---|
| CN | 204508701 U | 7/2015 |
| CN | 205187773 U | 4/2016 |
| CN | 205590240 U | 9/2016 |
| DE | 10 2006 035 822 A1 | 2/2008 |
| DE | 20 2009 011 802 U1 | 7/2010 |
| EP | 3 251 918 A1 | 12/2017 |
| JP | 2005-028971 | 2/2005 |
| JP | 2005-029082 | 2/2005 |
| JP | 2006-027789 | 2/2006 |
| JP | 2006-321583 | 11/2006 |
| JP | 2017-147682 | 8/2017 |
| WO | WO 2012/158531 A1 | 11/2012 |

OTHER PUBLICATIONS

Extended European Search Report dated Sep. 9, 2020 in European Patent Application No. 20163728.7, 9 pages.
Office Action dated Nov. 11, 2021 in Chinese Patent Application No. 202010155823.7, 9 pages.

* cited by examiner

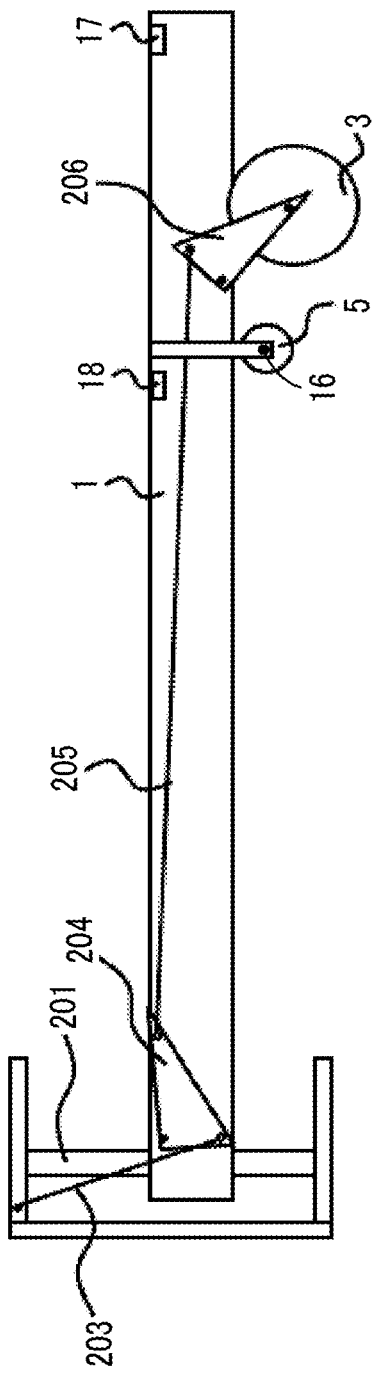
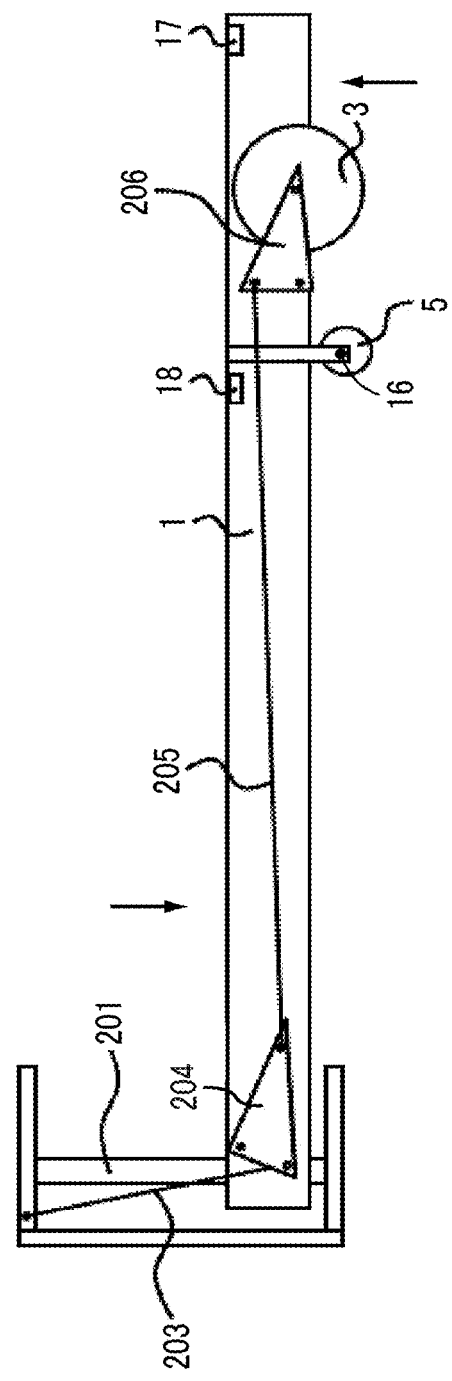
FIG. 8A
FIG. 8B

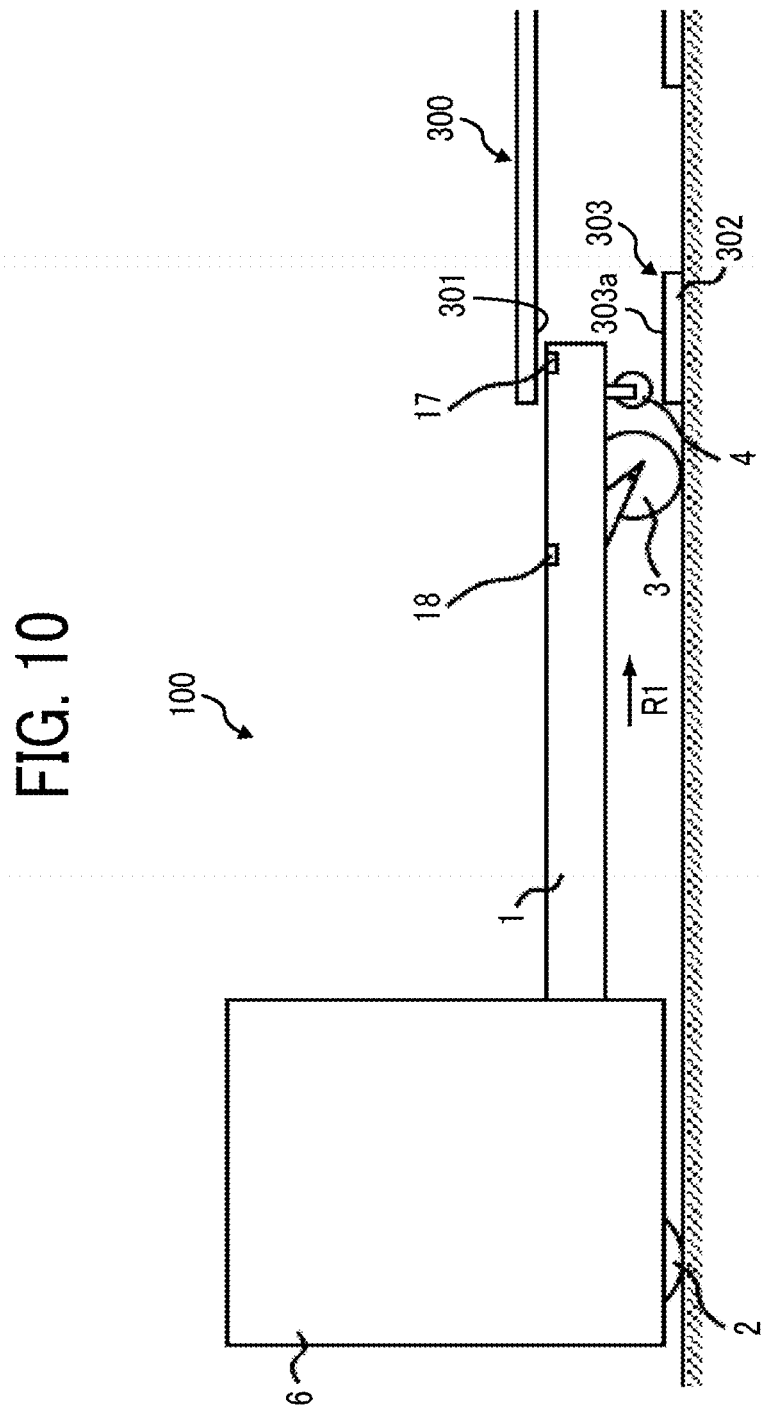

FIG. 58

| | ONE WHEEL + AUXILIARY WHEEL (FIG.57A) | LINKED TWO WHEELS (FIG.57B) | LINKED TWO WHEELS + AUXILIARY WHEEL (FIG.57C) |
|---|---|---|---|
| 4.8Kg (WOOD PALLET (SMALL)) | × | × | × |
| 10Kg (PLASTIC PALLET) | × | × | × |
| 15Kg (WOOD PALLET) | × | × | × |
| 20Kg | × | ○ | ○ |
| 30Kg | × | ○ | ○ |
| 40Kg | ○ | ○ | ○ |

TRANSPORT APPARATUS

CROSS-REFERENCE TO RELATED APPLICATION

This application claims priority pursuant to 35 U.S.C. § 119(a) to Japanese Patent Application No. 2019-053777, filed on Mar. 20, 2019 in the Japan Patent Office, the disclosure of which is incorporated by reference herein in its entirety.

BACKGROUND

Technical Field

This disclosure present invention relates to a transport apparatus.

Background Art

In factories and warehouses, packages are stored by placing the packages on pallets so that the packages can be transported by moving the pallets using transport apparatuses. The pallet is made of wood, resin or metal, and has insertion holes formed at lateral sides of the pallet, which are perpendicular to the floor or ground surface. Typically, the pallets are lifted and moved using fork lifters (hereinafter, lifter) having forks (claws), which is an example of transport apparatus of automated-driven transport system or manually-driven transport system. When the pallet is to be lifted up and moved using the lifter, the forks are inserted into the insertion hole, and the forks (hereinafter, fork) are extracted from the insertion hole after the pallet is moved to a transport destination.

Typically, the pallet has a portion protruding upward from the bottom of the pallet (hereinafter, step member) inside the insertion hole. When the pallet is to be lifted up and moved using the lifter, the fork is inserted into the insertion hole by stepping over the step member. When the fork is inserted into or extracted from the insertion hole of the pallet, a primary rotatable member that is provided at a front end portion of the fork is required to step over or pass over the step member, and the stepping-over action of the primary rotatable member may cause the resistance when inserting the fork into the insertion hole of the pallet or extracting the fork from the insertion hole of the pallet.

Further, if the pallet is an empty pallet not loading any package or a pallet loading a light-weight package, the pallet may be pushed due to a resistance caused by the friction between the fork and the step member caused by the inserting or extracting operation of the fork, with which the operability and efficiency of pallet handling operation may deteriorate. Therefore, some lifters are provided with one or more wheels (rotatable members) at the front and rear end portions of the fork, and some lifters are provided with an auxiliary wheel protruding below a plane connecting the front and rear wheels so that the resistance between the fork and the step member caused by the inserting or extracting operation of the fork can be reduced.

However, conventional lifters having the auxiliary wheel may need a mechanism to rise and lower the fork, a mechanism to change positions of the auxiliary wheel and a drive mechanism to change the relative positions between the rotatable wheel and the auxiliary wheel, causing the lifter to become greater in size.

SUMMARY

In one aspect of the present, a transport apparatus for transporting a carriage base is devised. The transport apparatus includes a body; a fork having a shape extending from the body, the fork having one portion supported by the body and another portion protruded from the body, the fork is insertable into the carriage base and extractable from the carriage base, the fork being inserted into the carriage base when transporting the carriage base using the transport apparatus; a lifting unit including one or more links; a control unit configured to control at least the lifting unit; a primary rotatable member mounted at a front end portion of the fork via the lifting unit, a relative position of the primary rotatable member with respect to the fork is changeable using the lifting unit; an auxiliary rotatable member mounted at least at one rotatable-member-attaching position of the fork closer to a front end portion of the fork compared to the primary rotatable member along an insertion direction or another rotatable-member-attaching position of the fork closer to a rear end portion of the fork compared to the primary rotatable member along an extraction direction of the fork, the auxiliary rotatable member is settable at a position lower than a position of the primary rotatable member when the fork is lowered using the lifting unit; and a step detection unit, disposed at least at one detection-unit-attaching position of the fork closer to the front end portion of the fork compared to the auxiliary rotatable member along the insertion direction or another detection-unit-attaching position of the fork closer to the rear end portion of the fork compared to the auxiliary rotatable member along the extraction direction of the fork, the step detection unit configured to detect a step member formed in the carriage base. The control unit lowers the fork using the lifting unit in response to a detection of the step member by the step detection unit.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 7A is a schematic diagram illustrating a case of contacting the driven wheel on a floor, and FIG. 7B illustrates a schematic diagram of a case when the driven wheel is set at a position higher than a position of the auxiliary wheel:

FIGS. 8A and 8B illustrate one configuration having an auxiliary wheel at a position closer to a rear end portion of a fork compared to a driven wheel, FIG. 8A is a schematic diagram illustrating a case of contacting the driven wheel on a floor, and FIG. 8B illustrates a schematic diagram of a case when the driven wheel is set at a position higher than a position of the auxiliary wheel;

FIG. 9A is a schematic diagram illustrating a case of contacting the driven wheel on a floor, and FIG. 9B illustrates a schematic diagram of a case when the driven wheel is set at a position higher than positions of two auxiliary wheels;

FIG. 10 illustrates a side view illustrating an initial state when inserting a fork into a pallet of the first embodiment;

FIG. 58 illustrates comparison results between the conventional wheel configurations of FIGS. 57A, 57B and 57C.

Figure 1A:
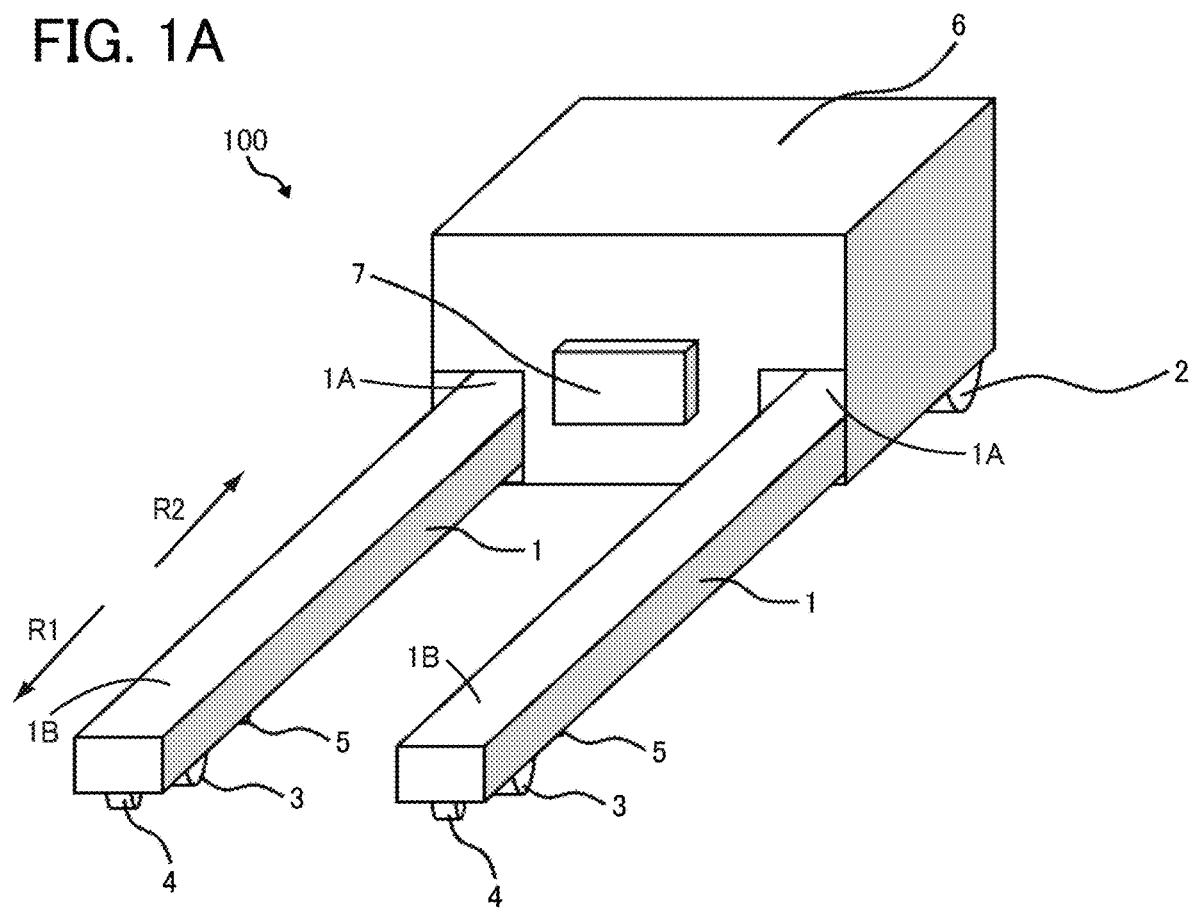
FIG. 1A illustrates a perspective view of an example of a transport apparatus according to an embodiment of this disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

To be described in this specification, a transport apparatus according to one or more embodiments includes, for example, a fork, a lifting mechanism having a motor, a driven wheel serving as a primary rotatable member mounted at least a front side or a rear side of the fork, and an auxiliary rotatable member mounted at least a front side or rear side of the driven wheel, in which by lowering the fork, the auxiliary rotatable member can be positioned relatively lower than the primary rotatable member. The transport apparatus further includes a step detection unit at a position closer to a front end portion of the fork compared with the rotation center axis of the auxiliary rotatable member, which detects a step member of a pallet when inserting the fork into the pallet, and controls an elevation position of the fork (positions of the fork in the up-to-down direction) based on a detection result of the step detection unit.

When a conventional fork is inserted into and extracted from a pallet of a double-sided loading type that can be loaded on either side, it is necessary to move the transport apparatus by increasing the momentum force in order to step over a step member formed on the bottom side of the pallet, so that the transport apparatus is moved by the primary rotatable member, and the fork can be inserted into the pallet or extracted from the pallet. Conventionally, when the pallet is not loaded with a package or is loaded with a light-weight package, the pallet may be moved by a wheel when the wheel passes over the step member formed on the bottom side of the pallet because the wheel applies a force equal to or greater than the static friction force of the pallet on the floor in the horizontal direction, and thereby it becomes difficult to insert the fork into the pallet, and there is a room for improvement in efficiency and operability.

With applying the configuration of the one or more embodiments, without adding a complicated mechanism or actuator, the fork can be inserted into the pallet and extracted from the pallet using the fork lifting mechanism without exercising an excessive momentum force to the pallet when inserting the fork into the pallet and extracting the fork from the pallet, and thereby the fork can be securely fitted to or coupled an empty pallet, which is difficult to be fitted to or coupled with the fork in conventional technologies. This feature can allow the transport apparatus to be moved automatically in factories to transport pallets, and stable and secured transportation operation using the automatic movement of the transport apparatus.

Hereinafter, a description is given of the transport apparatus according to one or more embodiments with reference to the drawings. In the embodiments, the same functions and those having the same configuration are denoted by the same reference numerals, and the redundant description thereof is omitted as appropriate. The drawings may also be partially omitted or simplified in order to help understand some of the configurations.

Figure 1B:
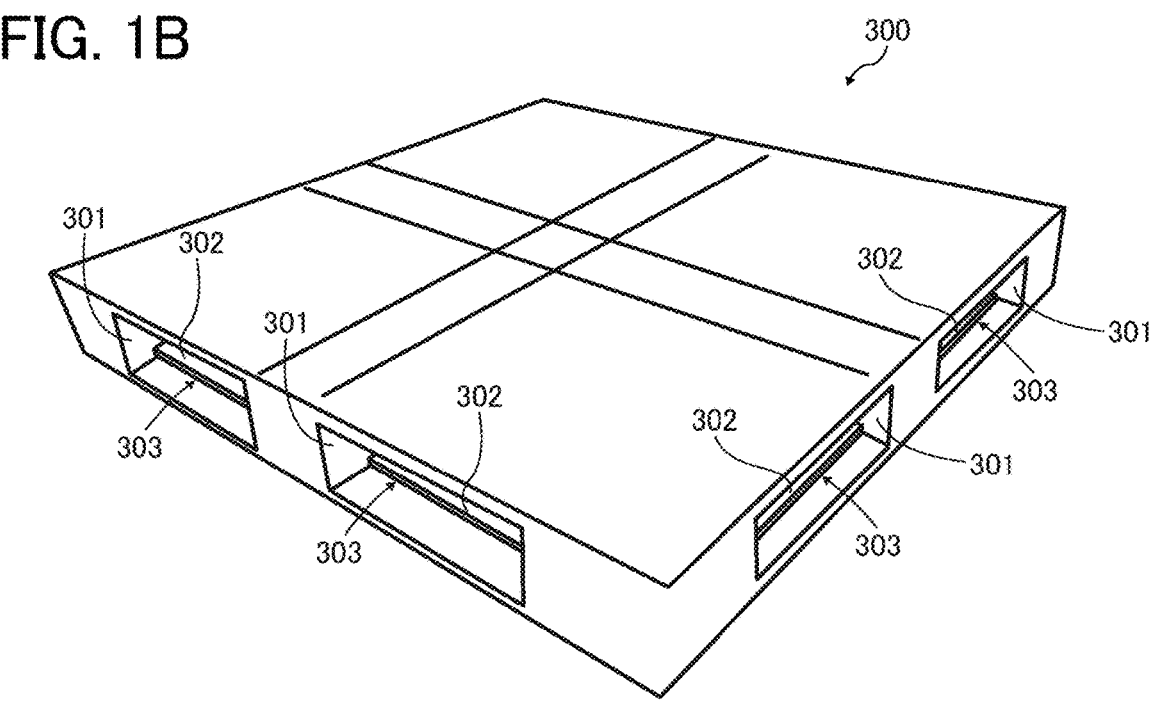
FIG. 1B illustrate and a perspective view of an example of a pallet.
Figure 2:
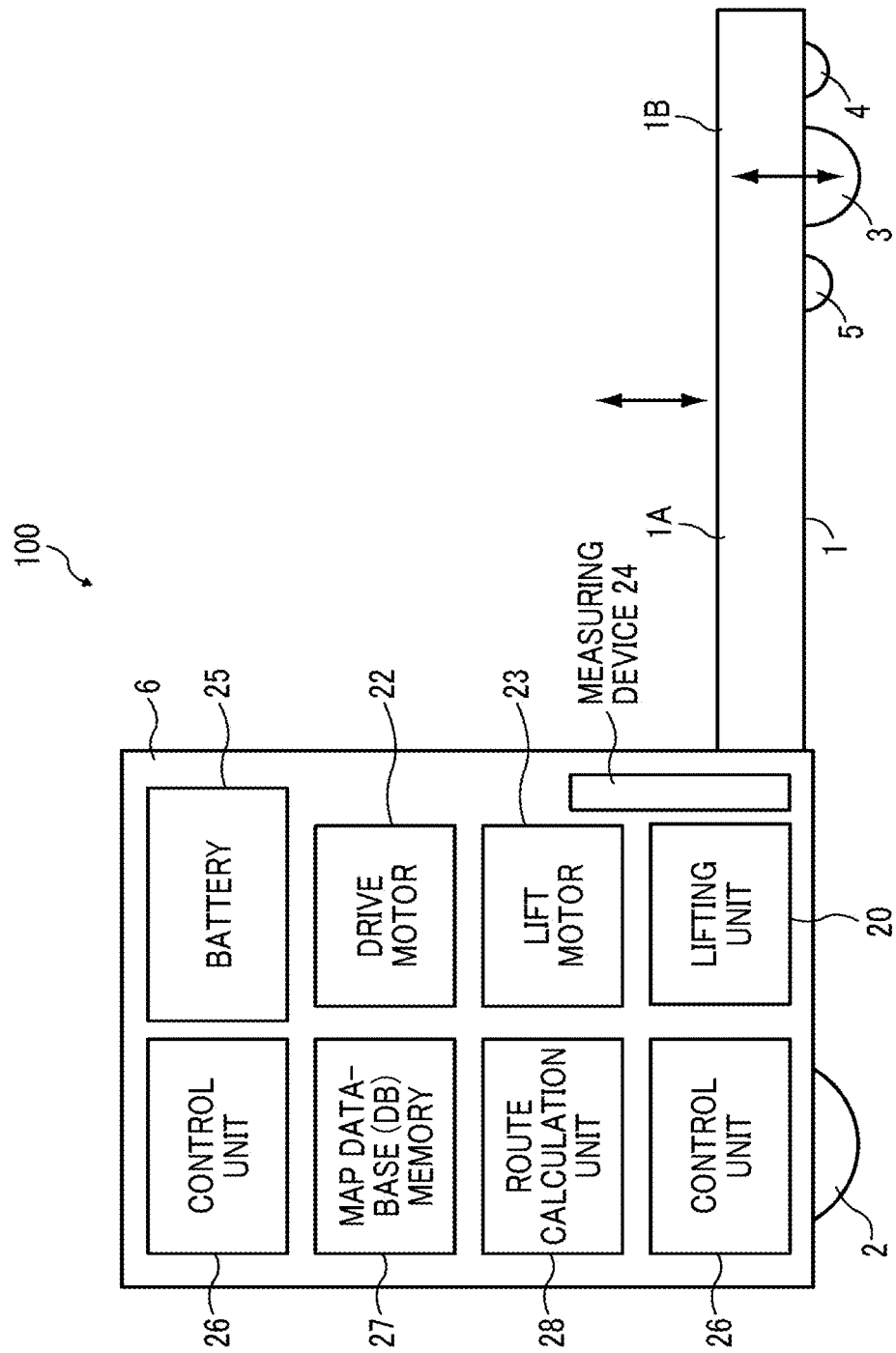
FIG. 2 illustrates a schematic side view of the transport apparatus of FIG. 1.

FIG. 1A illustrates a perspective view of an example of a lifter 100 (or hand lifter) to be described as an example of transport apparatus according to the embodiment, and FIG. 1B illustrates a perspective view of an example of a pallet 300 to be described as an example of carriage base transportable by the lifter 100. FIG. 2 illustrates a schematic side view of the lifter 100. The lifter 100 includes an automatic-operation travel type lifter and an manual-operation type lifter. In the embodiment, the lifter 100 is described as the automatic-operation travel type lifter.

As illustrated in FIG. 1A, the lifter 100 includes, for example, a pair of forks 1, a drive wheel 2, a driven wheel 3, and a body 6. The pair of forks 1 that are parallel to one another can be lifted up and down (raised and lowered), and the pair of forks 1 are used to carry or hold the pallet 300 that is an example of carriage base (hereinafter, the pair of forks 1 is simply referred to as fork 1). The drive wheel 2 provided for the body 6 is used as a drive rotatable member. The driven wheel 3 is disposed on a front end portion 1B of the fork 1 as a primary rotatable member used as a driven rotatable member.

The fork 1 has an arm shape having a front end portion 1B and a rear end portion 1A, which are opposite end portions of the fork 1. The rear end portion 1A of the fork 1 is supported within the body 6 and the front end portion 1B of the fork 1 protrudes from the body 6. Since the lifter 100 can be moved forward and rearward with respect to the pallet 300, the fork 1 of the lifter 100 can be moved forward and rearward with respect to the pallet 300. In the embodiment, an arrow R1 indicates an insertion direction of the fork 1 into the pallet 300, and an arrow R2 indicates an extraction direction of the fork 1 from the pallet 300 (see also FIG. 3).

As illustrated in FIG. 2, the body 6 includes, for example, a drive motor 22, a lifting unit 20x, a lift motor 23, a measuring device 24, a battery 25, a control unit 26, a map database memory 27, and a route calculation unit 28.

The drive motor 22 is used as a drive source for driving the drive wheel 2. The lifting unit 20 (lifting mechanism) is used for lifting (elevating) and lowering the fork 1. The lift motor 23 is used as a drive source for driving the lifting unit 20 to lift up and down the fork 1. The measuring device 24 is used for measuring an amount of lifting and lowering of the fork 1 (hereinafter, elevation amount or lift amount).

The battery 25 is used as a power supply. The control unit 26 is used for controlling the lifter 100, such as controlling each motor and sensor. The map database memory 27 stores map data required for autonomous driving. The route calculation unit 28, used as a route calculator for calculating a traveling route to a designated destination, a travel distance, and the like.

Further, as illustrated in FIG. 1A, the lifter 100 includes, for example, a pallet position detection unit 7 (e.g., camera unit) provided on a front face of the body 6 to detect a position of the pallet 300. The drive wheel 2 is mounted at the bottom part of the body 6 and supports the front end portion 1B of the fork 1 via the body 6 and the lifting unit 20.

The pallet 300 is, for example, a wood pallet formed with an insertion hole 301 at the bottom of the pallet 300 as illustrated in FIG. 1B. The fork 1 can be inserted into the insertion hole 301 and the fork 1 can be extracted from the insertion hole 301. At the bottom of the insertion hole 301, a frame is disposed to form a step member 303 on the bottom side of the pallet 300. The number of the insertion hole 301 and the number of the step member 303 can be changed as needed.

Figure 3:
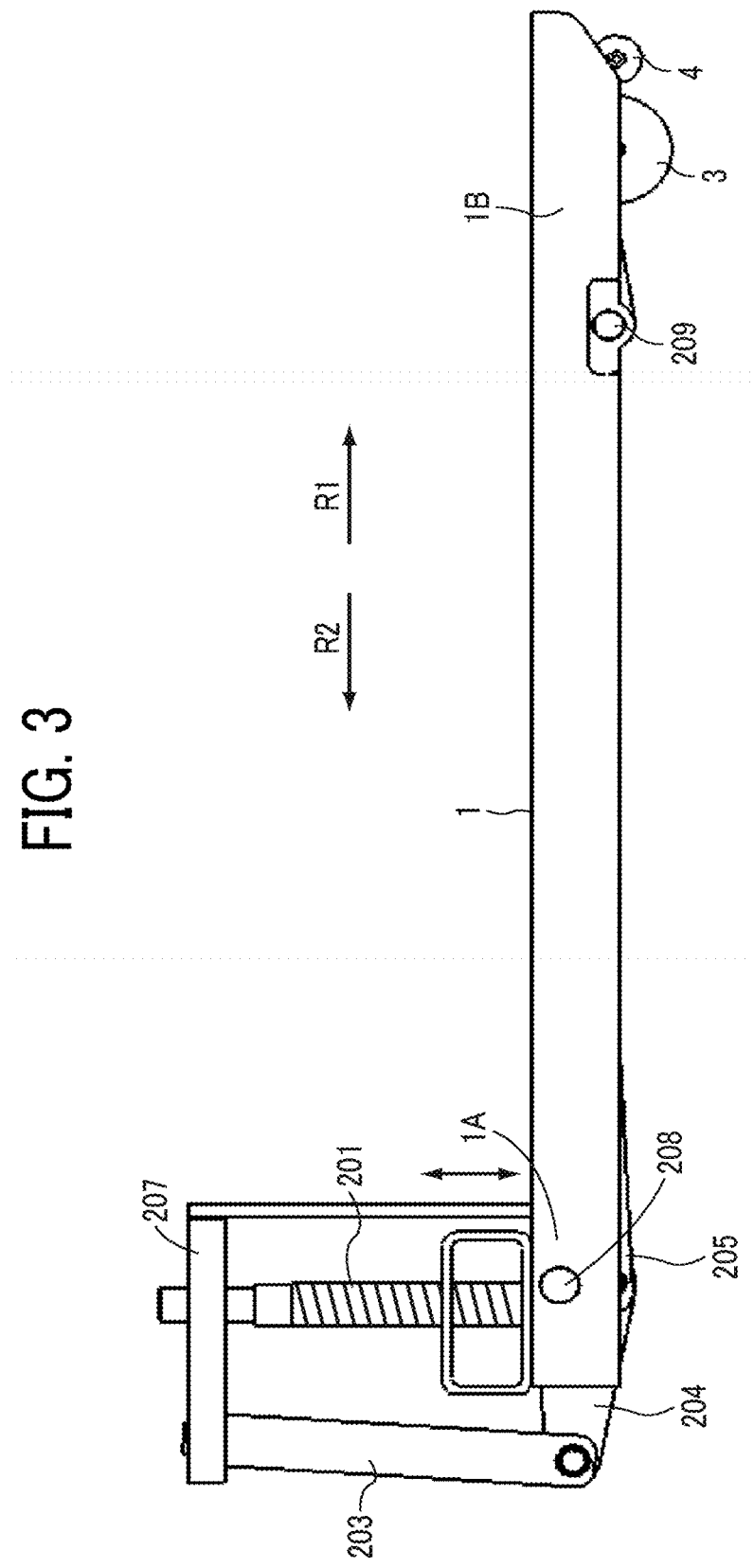
FIG. 3 illustrates a schematic configuration of a lifting unit for moving a fork in an elevation direction of the transport apparatus of FIG. 1A.
Figure 4:
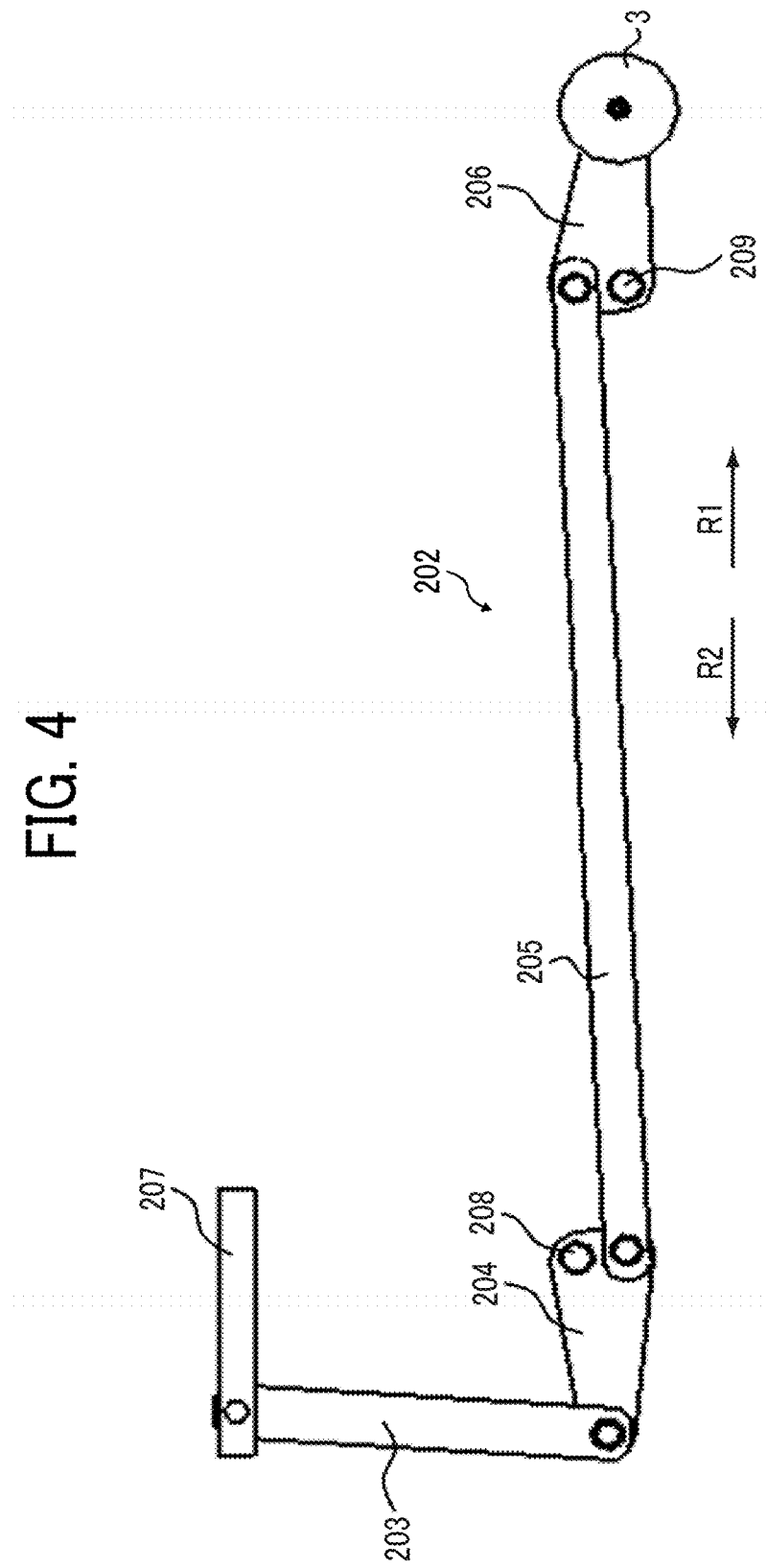
FIG. 4 illustrates a link mechanism that changes positions of a driven wheel based on an elevation of a fork.

As illustrated in FIGS. 3 and 4, the lifting unit 20 includes, for example, a ball screw shaft 201, and a link mechanical unit 202.

The ball screw shaft 201, which is mounted in the body 6 and coupled to the rear end portion 1A of the fork 1 set within the body 6, can be rotated in opposite directions by driving the lift motor 23 in one direction and another direction.

As illustrated in FIG. 4, the link mechanical unit 202 includes, for example, four links 203, 204, 205, and 206. The link 203 is a bar link having a joint at each end portions. In the body 6, the one end portion of the link 203 is pin coupled a plate 207 provided to the ball screw shaft 201. Since the fixed plate 207 is fixed at a given position in the body 6, the height of the link 203 does not change even when the fork 1 is lifted up and lowered. The other end portion of the link 203 is pin coupled to the link 204.

As illustrated in FIG. 4, the link 204 (plate link) has three joints. One joint of the link 204 is coupled to the link 203, one joint of the link 204 is coupled to the link 205, and one joint of the link 204 is coupled to the rear end portion 1A of the fork 1 via an axis shaft 208 as illustrated in FIG. 3.

As illustrated in FIG. 4, the link 205 is a rod link extending in the longitudinal direction of the fork 1. The link 205 has a joint at each end of the link 205. The joint at the one end of the link 205 is pin coupled to the link 204, and the joint at the other end of the link 205 is pin coupled to the link 206.

As illustrated in FIG. 4, the link 206 is a plate-shaped link having three joints. One joint of the link 206 is coupled to the link 205, one joint of the link 206 is coupled to the driven wheel 3, and one joint of the link 206 is coupled to the front end portion 1B of the fork 1 via an axis shaft 209. The driven wheel 3 is rotatably supported by the link 206 via an axis shaft 15 (see FIG. 5).

By lifting the fork 1 up and down by driving the lift motor 23 and using the link mechanical unit 202 of the lifting unit 20, the relative positions of the fork 1 and the driven wheel 3 can be changed.

When the fork 1 is to be lifted up, the link 204 rotates in a direction in which the link 204 is pushed forward about the axis shaft 208 (joint) coupled to the fork 1. Then, the link 206 coupled to the link 205 rotates in a direction in which the driven wheel 3 is lowered about the axis shaft 209 (joint) coupled to the fork 1. That is, when the fork 1 is lifted up, the driven wheel 3 moves in a relatively downward direction (i.e., the position of the driven wheel 3 changes to relatively downward direction).

Further, when the fork 1 is to be lowered, the link 204 rotates in a direction in which the link 205 is pulled rearward about the axis shaft 208 coupled to the fork 1. Then, the link 206 coupled to the link 205 rotates in a direction in which the driven wheel 3 rises about the axis shaft 209 coupled to the fork 1. That is, when the fork 1 is lowered, the driven wheel 3 moves in a relatively upward direction (i.e., the position of the driven wheel 3 changes to relatively upward direction).

Figure 5:
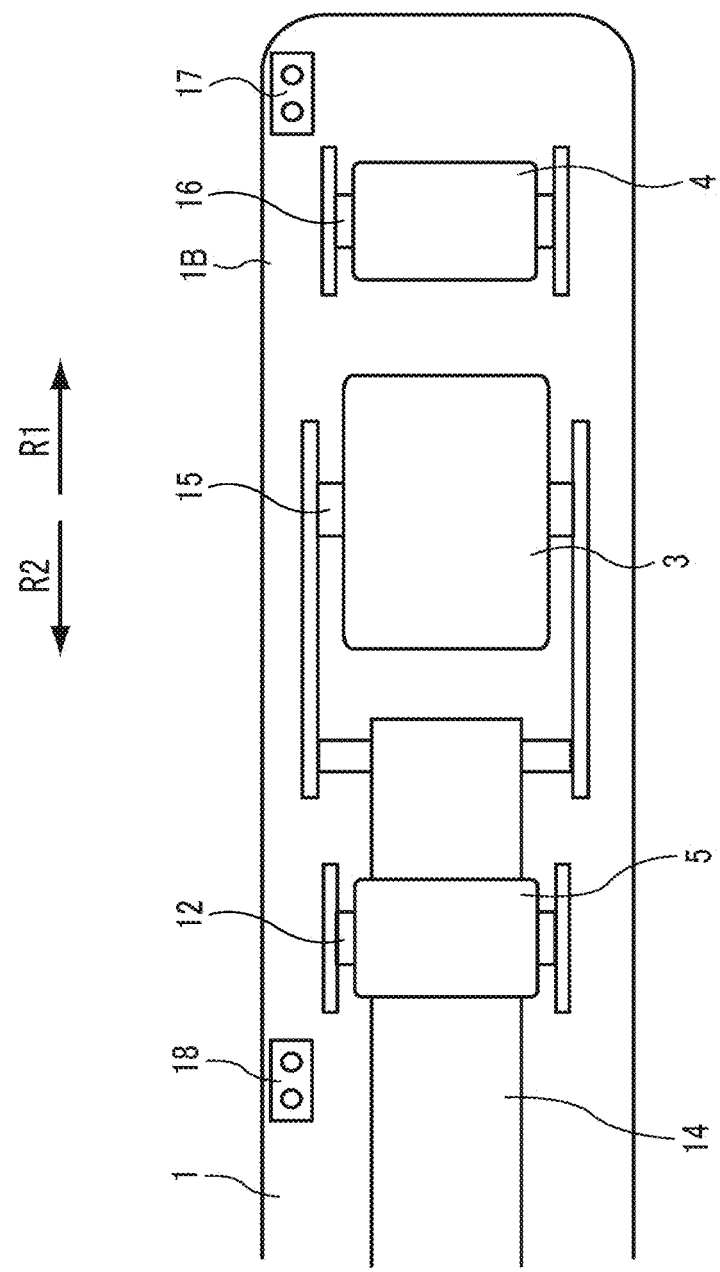
FIG. 5 is an enlarged view illustrating a configuration of a fork from a bottom side of the fork.

As illustrated in FIGS. 1, 2 and 5, the lifter 100 includes, for example, an auxiliary wheel 4 and an auxiliary wheel 5 used as auxiliary rotatable members. The auxiliary wheel 4 is disposed or mounted at a position closer to the front end portion of the fork 1 compared with the driven wheel 3. The auxiliary wheel 4 is used as the auxiliary rotatable member that can be set at a position relatively lower than a position of the driven wheel 3 by lowering the fork 1. The auxiliary wheel 5 is disposed or mounted at a position closer to the rear end portion of the fork 1 compared with the driven wheel 3. The auxiliary wheel 5 is used as the auxiliary rotatable member that can be set at a position relatively lower than a position of the driven wheel 3 by lowering the fork 1. The auxiliary wheel 4 are rotatably supported by an axis shaft 16 in the fork 1 as illustrated in FIG. 5. The auxiliary wheel 5 are rotatably supported by an axis shaft 12 in the link 205 as illustrated in FIG. 5.

As illustrated in FIG. 5, the fork 1 includes one or more step detection units, such as a first step detection unit 17 and a second step detection unit 18. The first step detection unit 17, mounted at a position forward or front side viewed from the axis shaft 16 serving as a rotation center axis of the auxiliary wheel 4, detects a step member. The second step detection unit 18, mounted at a position rearward or rear side viewed from the axis shaft 12 serving as the rotation center axis of the auxiliary wheel 5, also detects a step member. That is, the first step detection unit 17 is disposed or mounted at the position closer to the front end portion of the fork 1 relative to the auxiliary wheel 4 along the insertion direction R1 to detect the step member 303. The second step detection unit 18 is disposed or mounted at the position closer to the rear end portion of the fork 1 relative to the auxiliary wheel 4 along the extraction direction R2 to detect the step member 303.

In the embodiment, two auxiliary wheels such as the auxiliary wheel 4 and 5 are provided, but is not limited thereto. For example, the function of the auxiliary wheel can be performed if any one of the auxiliary wheels is provided.

Each of the first step detection unit 17 and the second step detection unit 18 includes, for example, a reflective optical sensor that can detect a distance and a position to the step member 303 of the pallet 300 to be described later.

If the auxiliary wheel 4, which is disposed or mounted at the position closer to the front end portion of the fork 1 compared to the position of the driven wheel 3 and can be set at the position relatively lower than the position of the driven wheel 3 by lowering the fork 1, is alone provided, the first step detection unit 17 is mounted at a position closer to the front end portion of the fork 1 compared to the position of the axis shaft 16 of the driven wheel 3.

Further, if the auxiliary wheel 5, which is disposed or mounted at the position closer to the rear end portion of the fork 1 compared to the position of the driven wheel 3 and can be set at the position relatively lower than the position of the driven wheel 3 by lowering the fork 1, is alone provided, the second step detection unit 18 is mounted at a position closer to the rear end portion of the fork 1 compared to the position of the axis shaft 16 of the driven wheel 3.

Figure 6A:
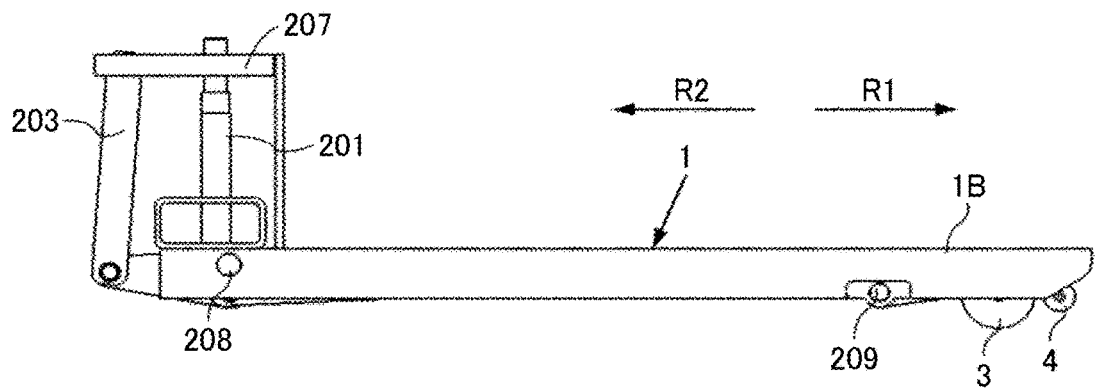
FIGS. 6A. 6B, and 6C illustrate a positional relationship between a driven wheel and an auxiliary wheel when elevating a fork in a upper direction.
Figure 6B:
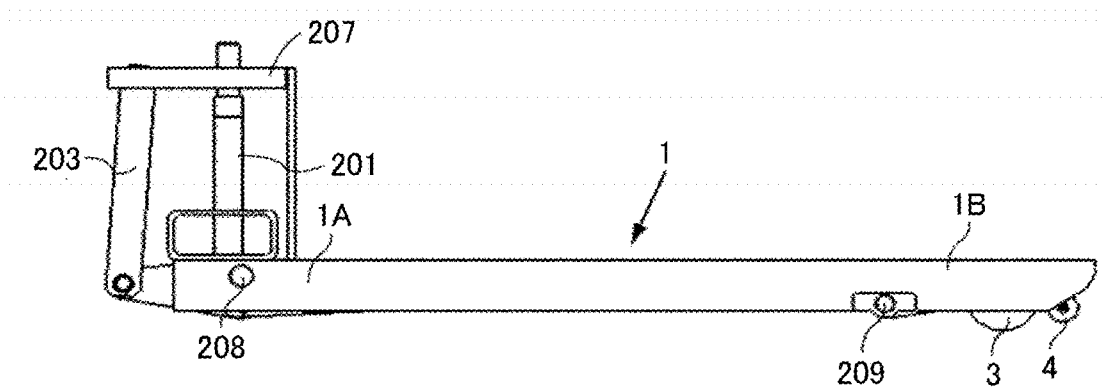
Figure 6C:
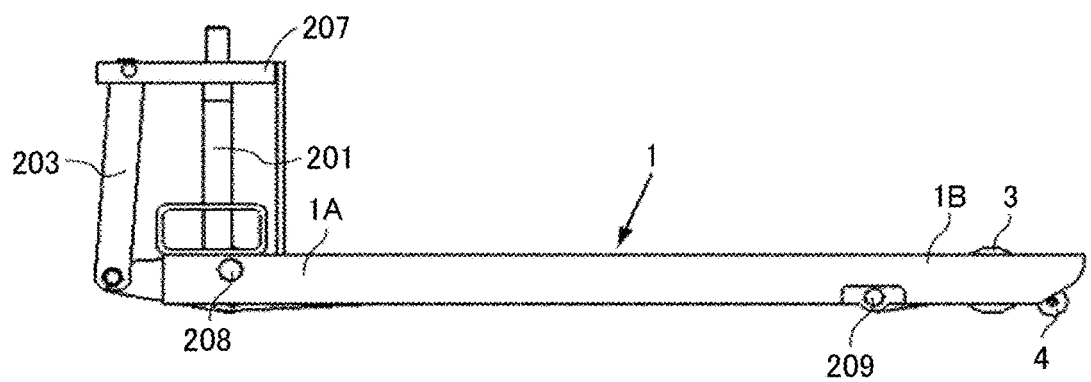

Hereinafter, a description is given of a configuration of the positional relationship between the driven wheel 3 and the auxiliary wheel when the fork 1 is lifted up and lowered with reference to FIGS. 6A, 6B, and 6C. FIGS. 6A, 6B, and 6C illustrate one case having the auxiliary wheel 4 alone. When the fork 1 is to be lowered from the position of FIG. 6A to the positions of FIGS. 6B and 6C, the auxiliary wheel 4 fixed to the fork 1 descends while the driven wheel 3 moves in a relatively upward direction by lowering the fork 1. Therefore, by lowering the fork 1, the relative positional relationship between the driven wheel 3 and the auxiliary wheel 4 is changed.

Hereinafter, a description is given of a an operation of the driven wheel 3 and the auxiliary wheel 4 associated with the movement of the fork 1 with reference to FIGS. 7, 8, and 9.

Figure 7A:
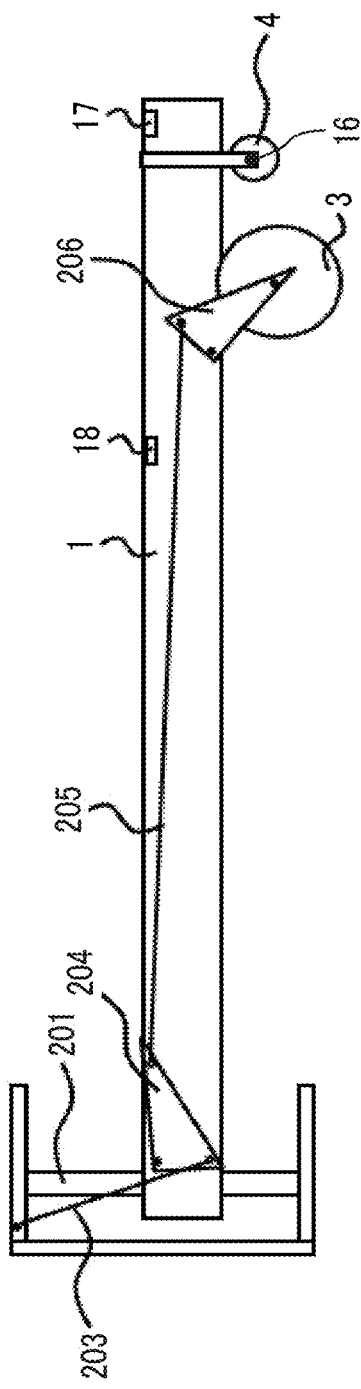
FIGS. 7A and 7B illustrate one configuration having an auxiliary wheel at a position closer to a front end portion of a fork compared to a driven wheel of a first embodiment.
Figure 7B:
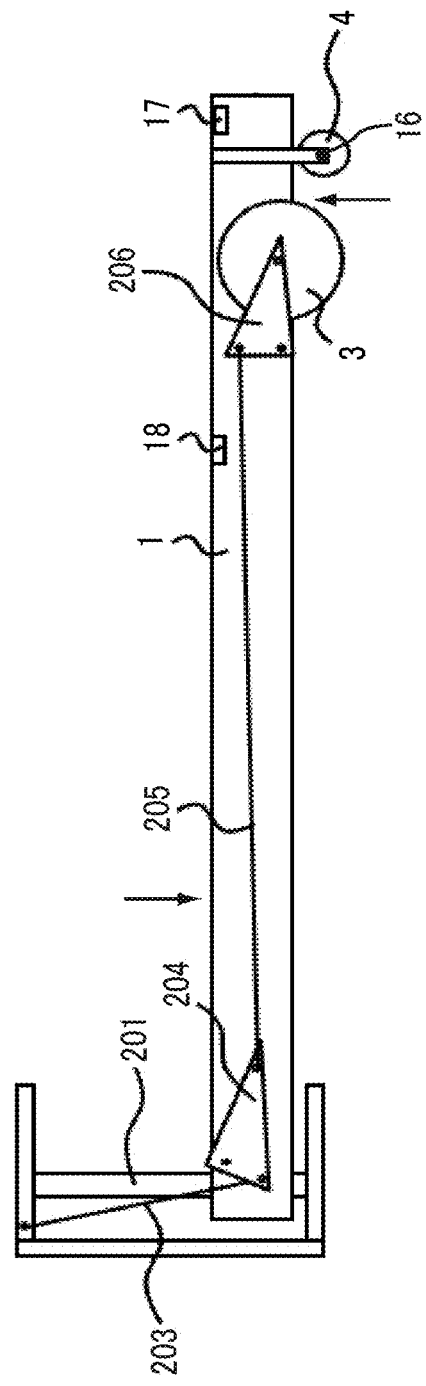

FIGS. 7A and 7B illustrate one configuration having the auxiliary wheel 4 alone at a position closer to the front end portion 1B of the fork 1 compared to the driven wheel 3.

FIGS. 8A and 8B illustrate one configuration having the auxiliary wheel 5 alone at a position closer to the rear end portion 1A of the fork 1 compared to the driven wheel 3.

Figure 9A:
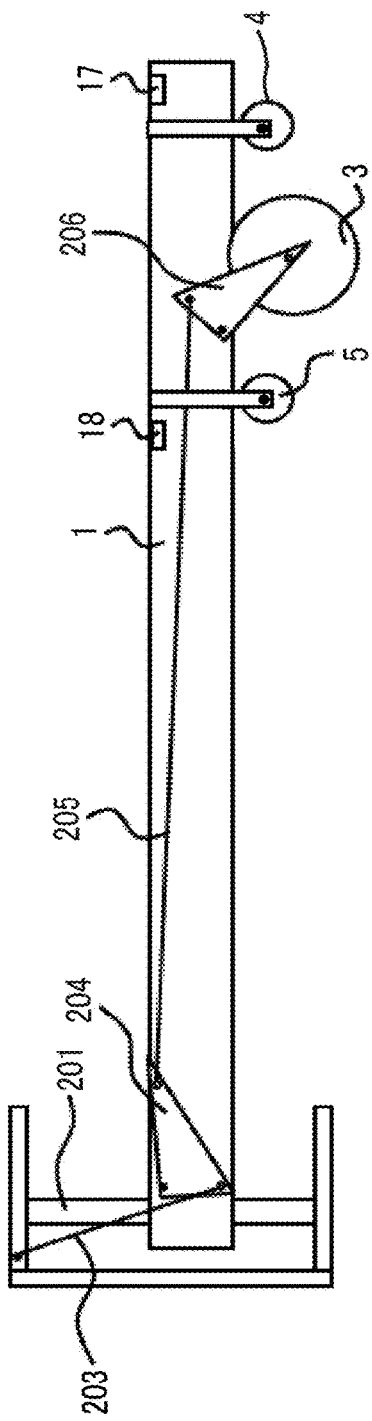
FIGS. 9A and 9B illustrate one configuration having an auxiliary wheel at a position closer to a front end portion of a fork compared to a driven wheel, and an auxiliary wheel at a position closer to a rear end portion of the fork compared to the driven wheel.
Figure 9B:
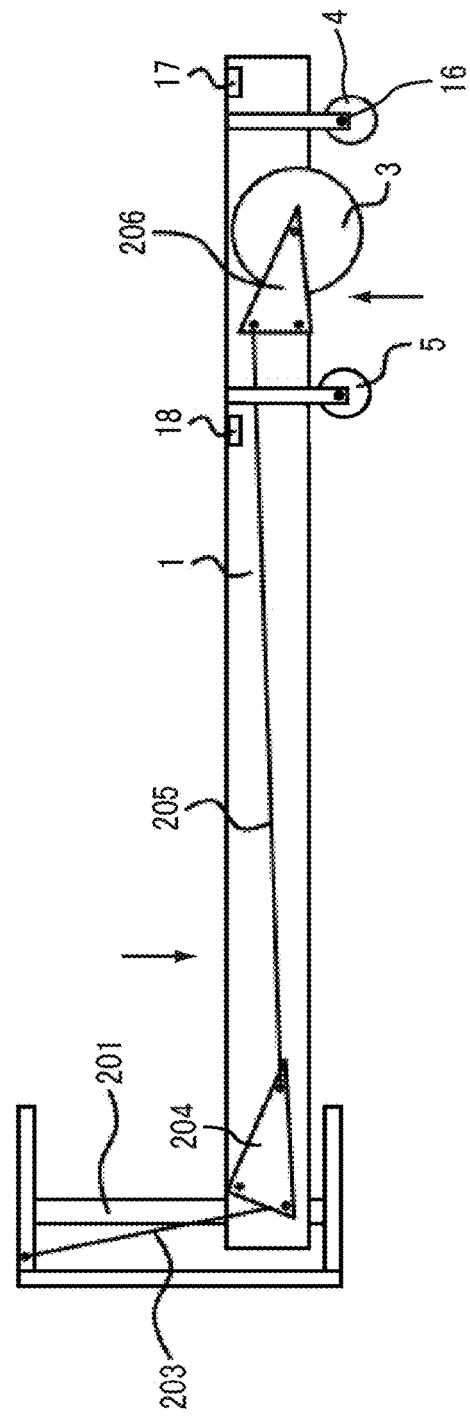

FIGS. 9A and 9B illustrate one configuration having the auxiliary wheel 4 at the position closer to the front end portion 1B of the fork 1 compared to the driven wheel 3, and the auxiliary wheel 5 at the position closer to the rear end portion 1A of the fork 1 compared to the driven wheel 3.

FIG. 7A is a schematic diagram illustrating a case when the lifter 100 runs or travels on the floor by contacting the driven wheel 3 on the floor. FIG. 7B illustrates a schematic diagram when the fork 1 is lowered until the driven wheel 3 is set at a position higher than a position of the auxiliary wheel 4. The fork 1 can be lifted up and lowered by the ball screw shaft 201 rotatable by driving the lift motor 23 described above. The driven wheel 3 is pin coupled to the fork 1 by the links 203 to 206, and the position of the driven wheel 3 relative to the fork 1 can be changed by lifting up and lowering the fork 1. Further, the links 203 to 206 are configured to set the position of the driven wheel 3 higher than the position of the auxiliary wheel 4 when the fork 1 is lowered to the lowest point as illustrated in FIG. 7B.

FIG. 8A is a schematic diagram illustrating another case when the lifter 100 runs or travels on the floor by contacting the driven wheel 3 on the floor. FIG. 8B illustrates a schematic diagram when the fork 1 is lowered until the driven wheel 3 is set at a position higher than the position of the auxiliary wheel 5. The fork 1 can be lifted up and lowered by the ball screw shaft 201 rotatable by driving the lift motor 23 described above. The driven wheel 3 is pin coupled to the fork 1 by the links 203 to 206, and the position of the driven wheel 3 relative to the fork 1 can be changed by lifting up and lowering the fork 1. Further, the links 203 to 206 are configured to set the position of the driven wheel 3 higher than the position of the auxiliary wheel 5 when the fork 1 is lowered to the lowest point as illustrated in FIG. 8B.

FIG. 9A is a schematic diagram illustrating another case when the lifter 100 runs or travels on the floor by contacting the driven wheel 3 on the floor. FIG. 9B illustrates a schematic diagram when the fork 1 is lowered until the driven wheel 3 is set at the position higher than the positions of the auxiliary wheels 4 and 5. The fork 1 can be lifted up and lowered by the ball screw shaft 201 rotatable by driving the lift motor 23 described above. The driven wheel 3 is pin coupled to the fork 1 by the links 203 to 206, and the position of the driven wheel 3 relative to the fork 1 can be changed by lifting up and lowering the fork 1. Further, the links 203 to 206 are configured to set the position of the driven wheel 3 higher than the positions of the auxiliary wheels 4 and 5 when the fork 1 is lowered to the lowest point as illustrated in FIG. 9B.

Hereinafter, a description is given of an operation of the lifter 100 that automatically steps over or passes over the step member 303 formed on the bottom side of the pallet 300 with reference to FIGS. 10 to 16.

First Embodiment

FIGS. 10 to 16 illustrates an operation of the lifter 100 when the fork 1 is inserted into the pallet 300 (the fork insertion operation of the first embodiment), in which the auxiliary wheel 4 is disposed or mounted at the position closer to the front end portion 1B compared to the driven wheel 3 in the fork 1, and the position of the auxiliary wheel 4 is settable lower than the position of the driven wheel 3 by lowering the fork 1.

When the lifter 100 is to insert the fork 1 into the pallet 300, the pallet position detection unit 7 (FIG. 1A) attached or mounted to the front face of the body 6, which is used to detect the position of the pallet 300, detects a location of the pallet 300 and/or a position of the insertion hole 301 formed on the bottom side of the pallet 300, and then the movement amount of the lifter 100 is calculated from the rotation angle of the drive wheel 2 to approach to the pallet 300 while controlling the traveling of the lifter 100. The automatic travel control and the lifting control of the fork 1 will be described later.

FIG. 10 illustrates a state in which the first step detection unit 17, disposed on the front side of the auxiliary wheel 4, is positioned or comes above the step member 303. In the state illustrated in FIG. 10, the detection face of the first step detection unit 17, attached or mounted to the fork 1, faces a downward direction. When the first step detection unit 17 detects the step member 303 formed on the bottom side of the pallet 300, the fork 1 is lifted up so that the auxiliary wheel 4 is positioned higher than an upper face 303a of the step member 303.

After the first step detection unit 17 detects the step member 303 and the fork 1 is lifted up to set the auxiliary wheel 4 higher than the upper face 303a of the step member 303 as illustrated in FIG. 10, the lifter 100 activates or drives the drive motor 22 to rotate the drive wheel 2 to move for a distance between the first step detection unit 17 and the rotation axis center of the auxiliary wheel 4 (the rotation center of the axis shaft 16).

Figure 11:
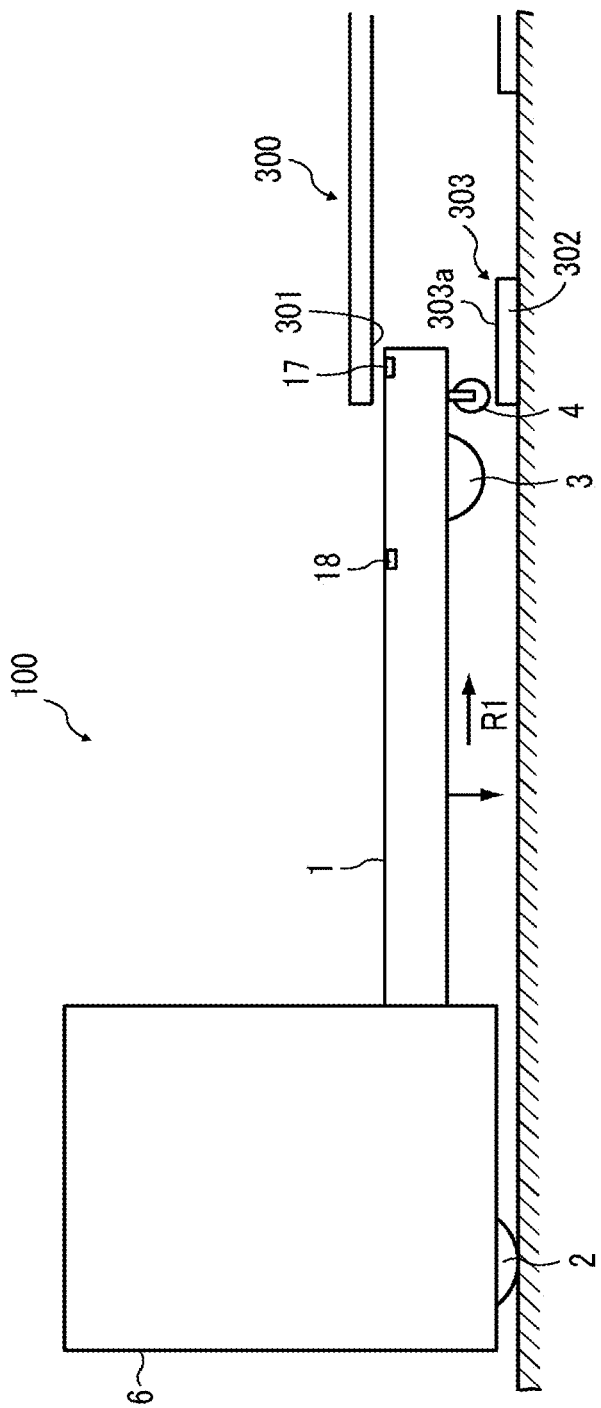
FIG. 11 illustrates a side view illustrating a state in which an auxiliary wheel comes above a step member of the pallet from the state of FIG. 10.

Then, as illustrated in FIG. 11, the fork 1 is inserted into the insertion hole 301 until the auxiliary wheel 4 comes above the step member 303 of the pallet 300.

Figure 12:
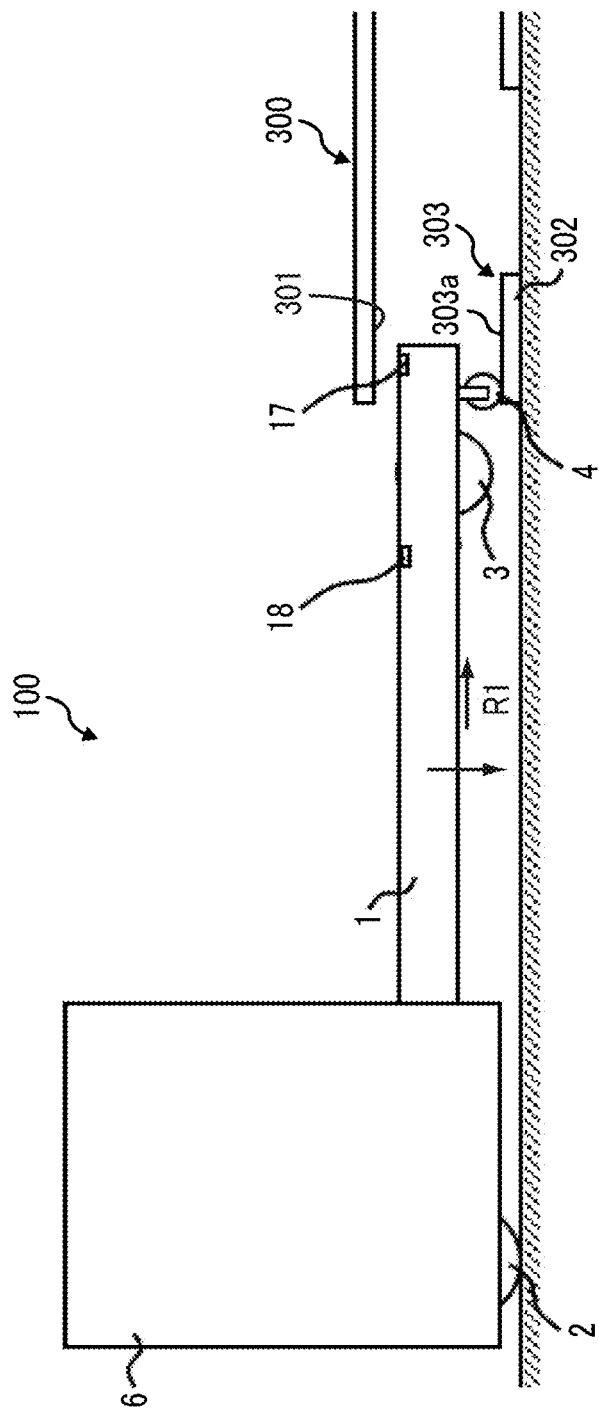
FIG. 12 illustrates a state in which a driven wheel moves upward and the auxiliary wheel contacts a upper face of a step member of a pallet by lowering a fork.

After inserting the fork 1 into the insertion hole 301 until the auxiliary wheel 4 comes above the step member 303, the fork 1 is lowered so that the auxiliary wheel 4 contacts on the upper face 303a of the step member 303 as illustrated in FIG. 12. Further, from the state of FIG. 11, as illustrated in FIG. 12, the fork 1 is lowered until the driven wheel 3 is set at a position higher than a position of the auxiliary wheel 4.

Figure 13:
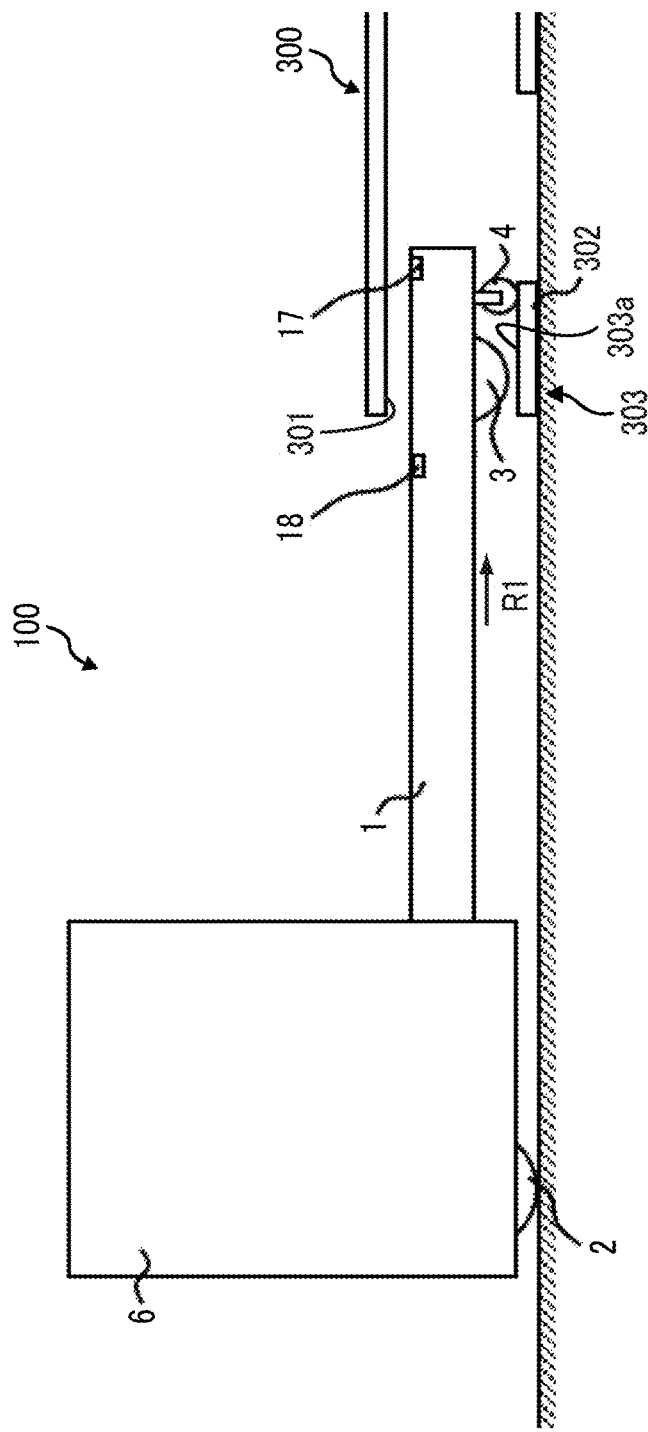
FIG. 13 illustrates a state in which the fork is being inserted while the auxiliary wheel being contacted on the upper face of the step member.

While the auxiliary wheel 4 is being contacted on the upper face 303a of the step member 303 and the position of the driven wheel 3 is being set higher than the position of the auxiliary wheel 4, the lifter 100 activates or drives the drive motor 22 to rotate the drive wheel 2 to move for a distance between the rotation axis center of the auxiliary wheel 4 (the rotation center of the axis shaft 16) and the rotation axis center of the driven wheel 3 to further insert the fork 1 into the insertion hole 301 until the driven wheel 3 comes above the upper face 303a of the step member 303 as illustrated in FIG. 13.

Figure 14:
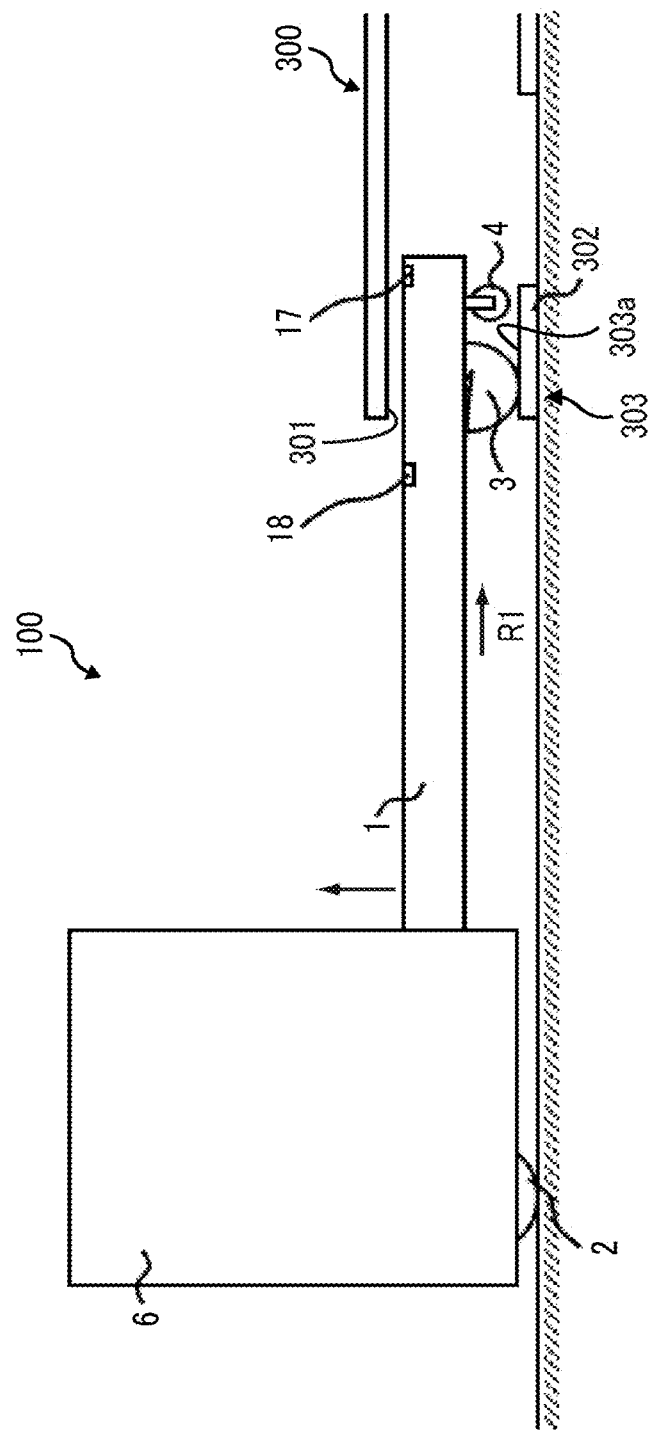
FIG. 14 illustrates a state in which the driven wheel descends and contacts with the upper face of the step member by lifting up the fork.

After inserting the fork 1 until the driven wheel 3 comes above the upper face 303a of the step member 303, the lifter 100 lifts up the fork 1 to contact the driven wheel 3 on the upper face 303a of the step member 303 as illustrated in FIG. 14.

Figure 15:
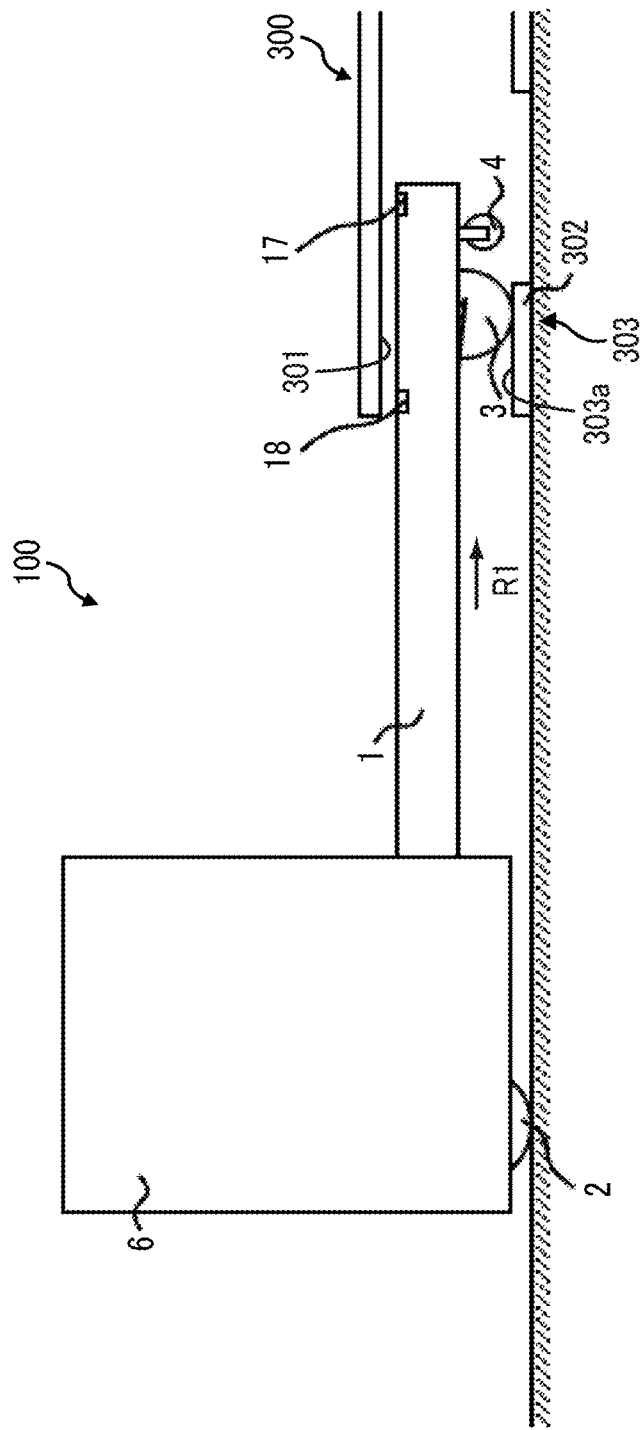
FIG. 15 illustrates a state in which the fork is being inserted while the driven wheel being contacted on the upper face of the step member.
Figure 16:
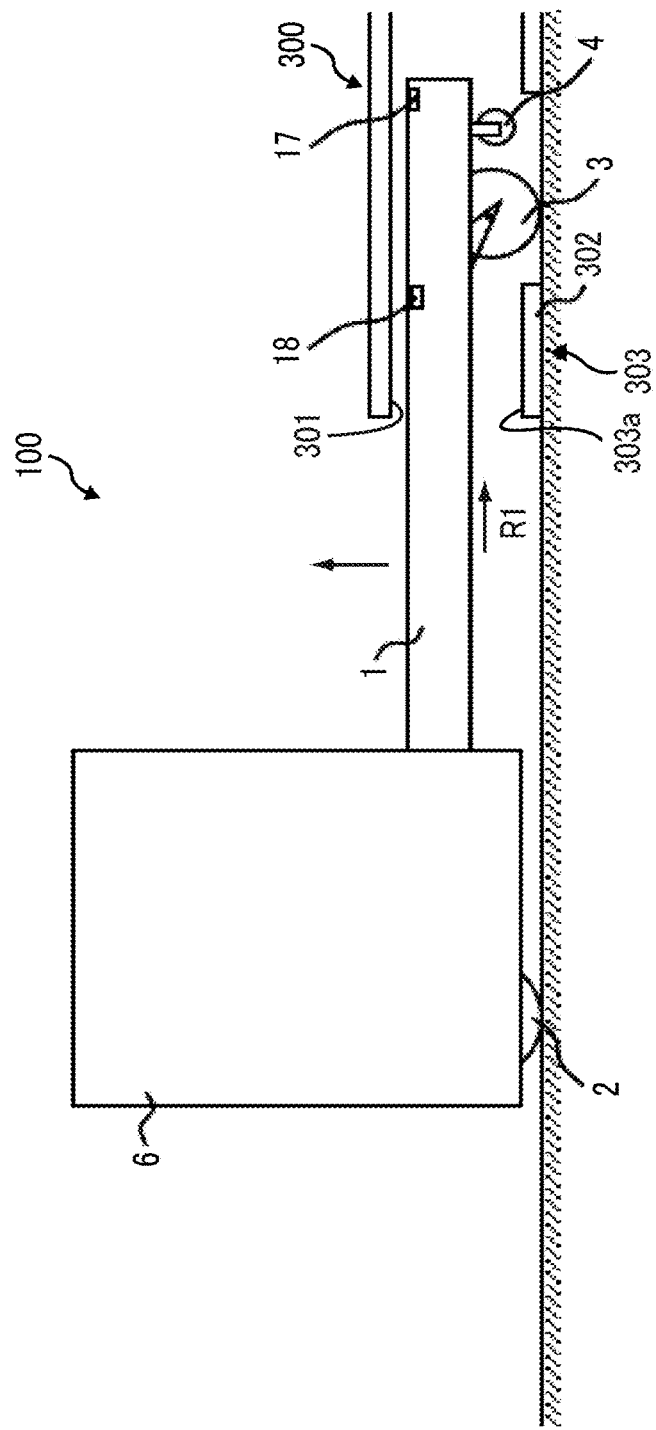
FIG. 16 illustrates a state in which the driven wheel has stepped over or passed over the step member.

Then, as illustrated in FIG. 15, the lifter 100 further inserts the fork 1 while the driven wheel 3 is being contacted on the upper face 303a of the step member 303, and then the lifter 100 lowers the driven wheel 3 from the step member 303 formed on the bottom side of the pallet 300 as illustrated in FIG. 16, with which the driven wheel 3 steps over or passes over the step member 303 formed on the bottom side of the pallet 300.

Further, when the first step detection unit 17 detects the next step member 303, the lifter 100 is operated as above described again to step over or pass over the next step member 303. The fork 1 is inserted into the pallet 300 by stepping over the step member 303 of the pallet 300 until the positional relationship between the fork 1 and the pallet 300 is set to a state in which the lifter 100 can lift up and carry or hold the pallet 300 stably.

Hereinafter, a description is given of an operation of the lifter 100 when the fork 1 is to be extracted from the pallet 300 with reference to FIGS. 17 to 22 (the fork extraction operation of the first embodiment), in which the auxiliary wheel 4 is disposed or mounted at the position closer to the front end portion 1B compared to the driven wheel 3 in the fork 1.

Figure 17:
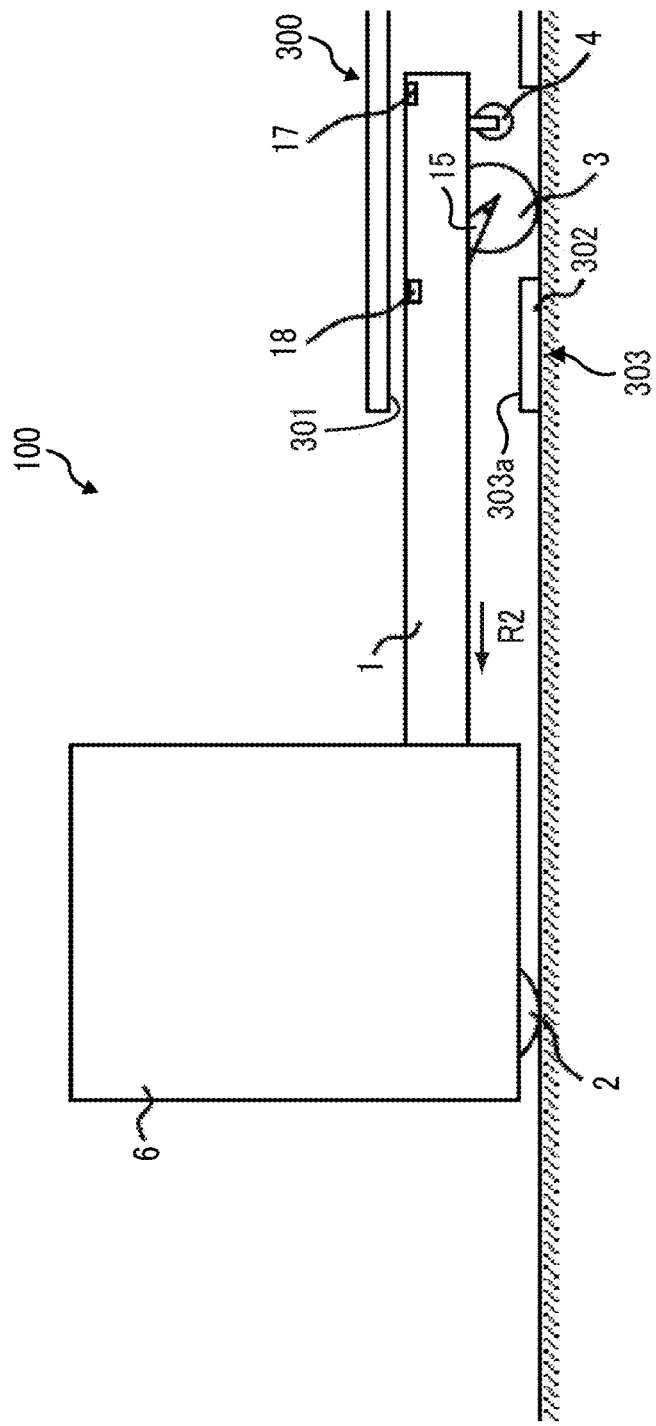
FIG. 17 illustrates an initial state in which a fork is to be extracted from a pallet.

FIG. 17 illustrates a state in which the second step detection unit 18, which is used to detect the step member 303, comes above the upper face 303a of the step member 303. The second step detection unit 18 is disposed or mounted at the position closer to the rear end portion of the fork 1 compared to the position of the rotation axis center of the driven wheel 3 (the rotation center of the axis shaft 15). In the state illustrated in FIG. 17, the detection face of the second step detection unit 18, attached or mounted to the fork 1, faces a downward direction.

Figure 18:
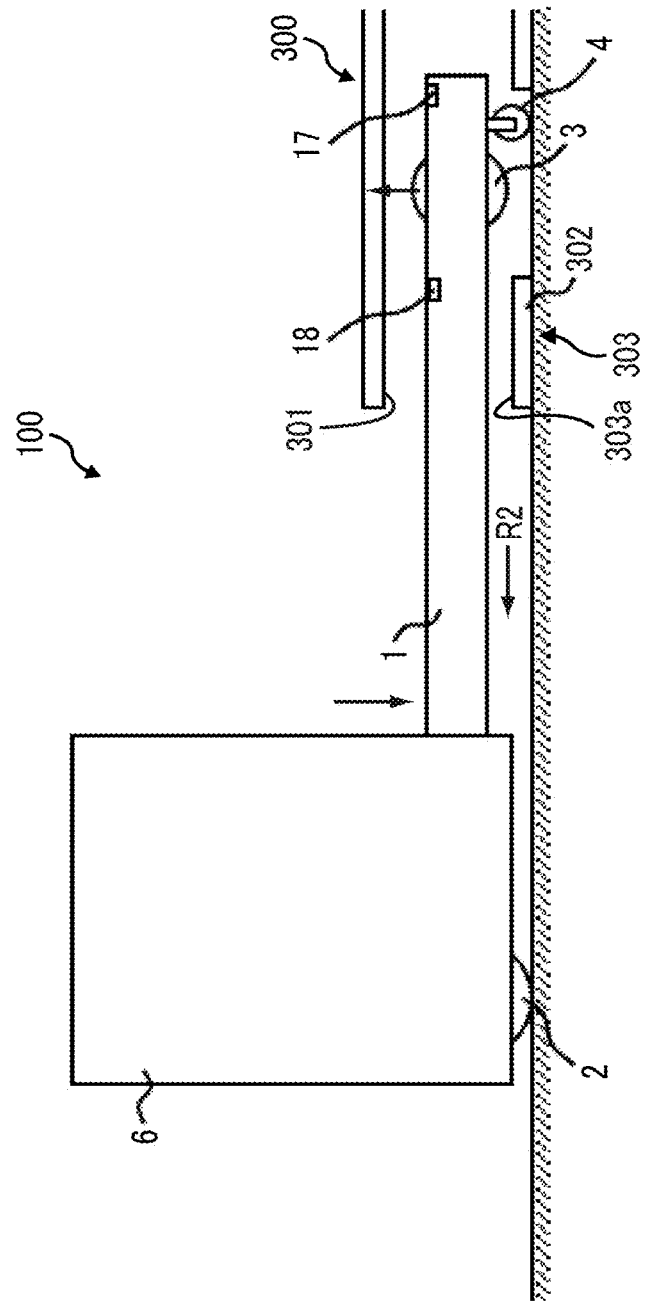
FIG. 18 illustrates a state in which the driven wheel rises and the auxiliary wheel are grounded by lowering of the fork.

When the second step detection unit 18 detects the step member 303, the lifter 100 lowers the fork 1 so that the auxiliary wheel 4 is grounded on the floor and the driven wheel 3 is set higher than the upper face 303a of the step member 303 as illustrated in FIG. 18.

Figure 19:
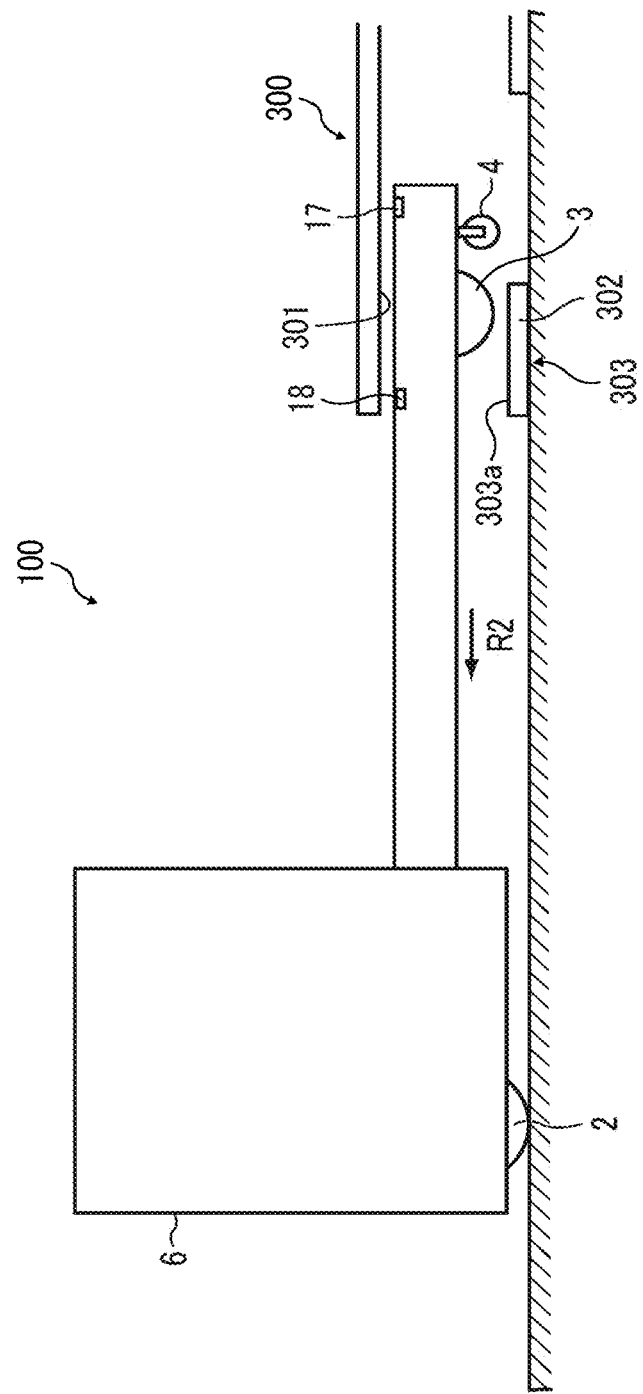
FIG. 19 illustrates a state in which the driven wheel comes above a step member of the pallet during the extraction.

After the auxiliary wheel 4 is grounded on the floor and the driven wheel 3 is positioned higher than the upper face 303a of the step member 303 by lowering the fork 1, the lifter 100 activates or drives the drive motor 22 to rotate the drive wheel 2 to move for a distance between the second step detection unit 18 and the rotation axis center of the driven wheel 3 (the rotation center of the axis shaft 15) to extract the fork 1 until the driven wheel 3 comes above the upper face 303a of the step member 303 as illustrated in FIG. 19.

Figure 20:
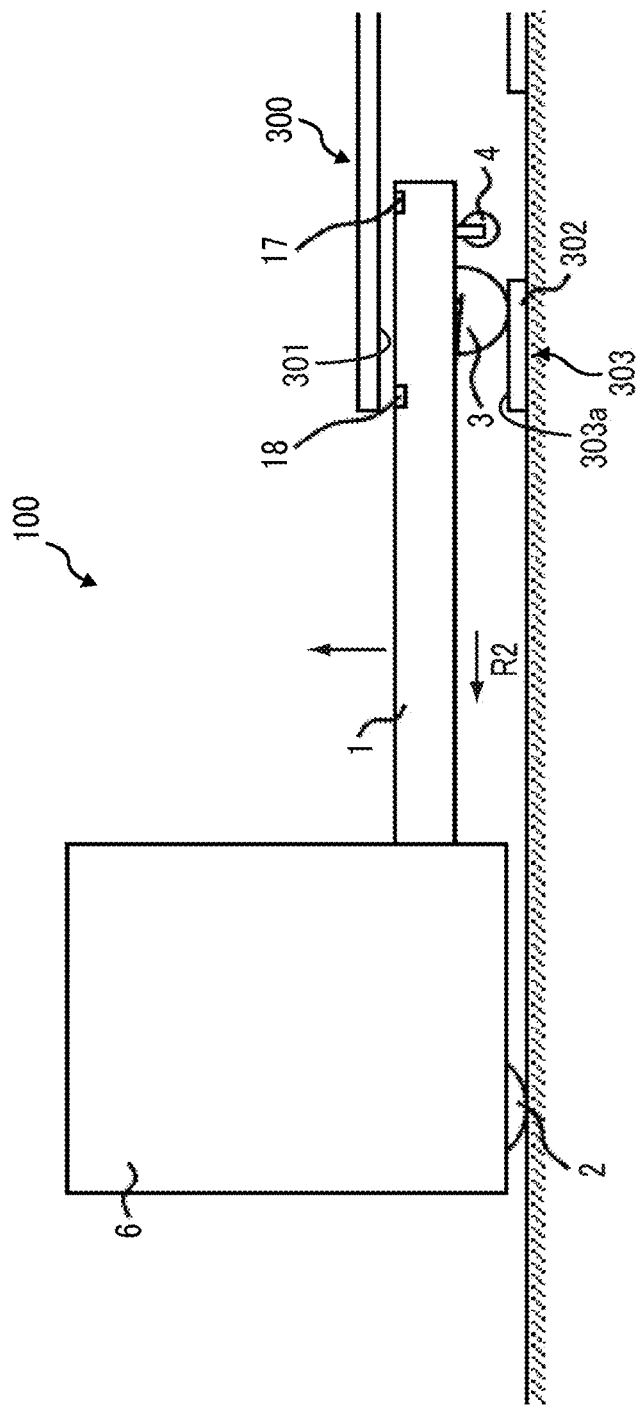
FIG. 20 illustrates a state in which the fork is lifted up from the state of FIG. 19.

After extracting the fork 1 until the driven wheel 3 comes above the upper face 303a of the step member 303, the lifter 100 lifts up the fork 1 to contact the driven wheel 3 on the upper face 303a of the step member 303 as illustrated in FIG. 20.

Figure 21:
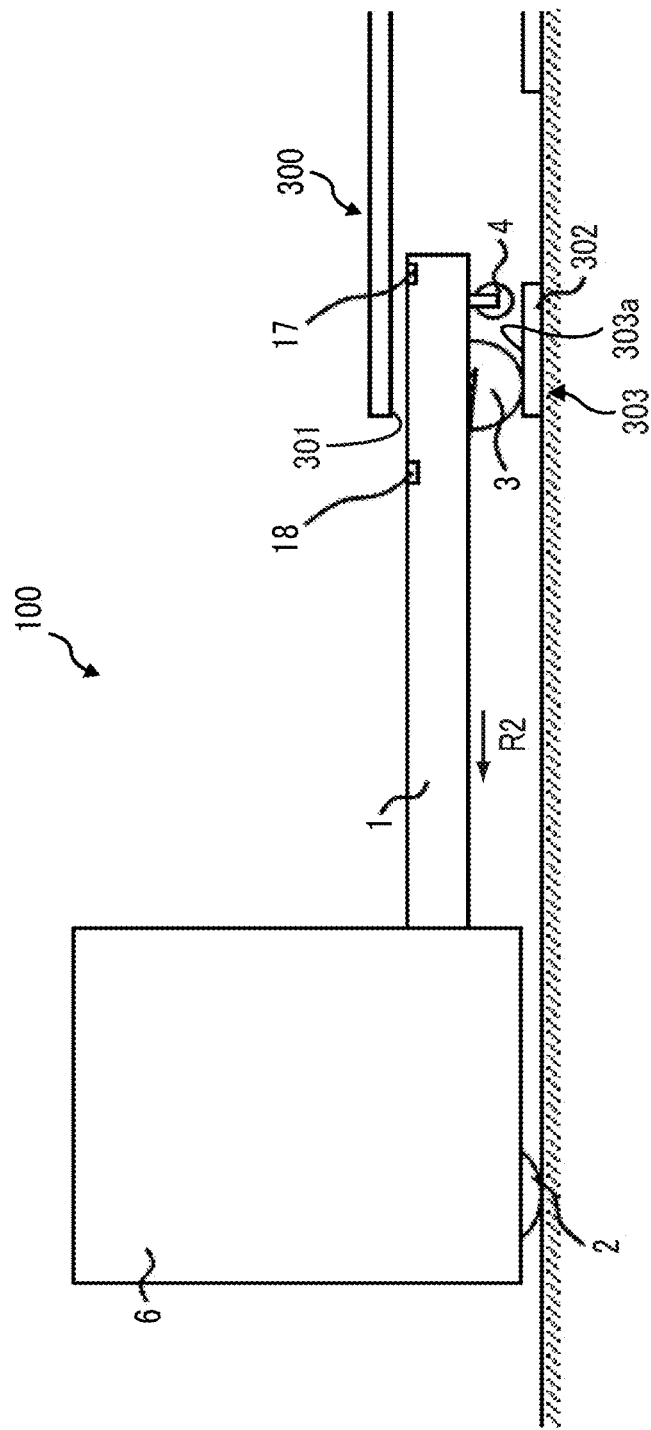
FIG. 21 illustrates a state in which the fork is being extracted while the driven wheel being contacted on the upper face of the step member.
Figure 22:
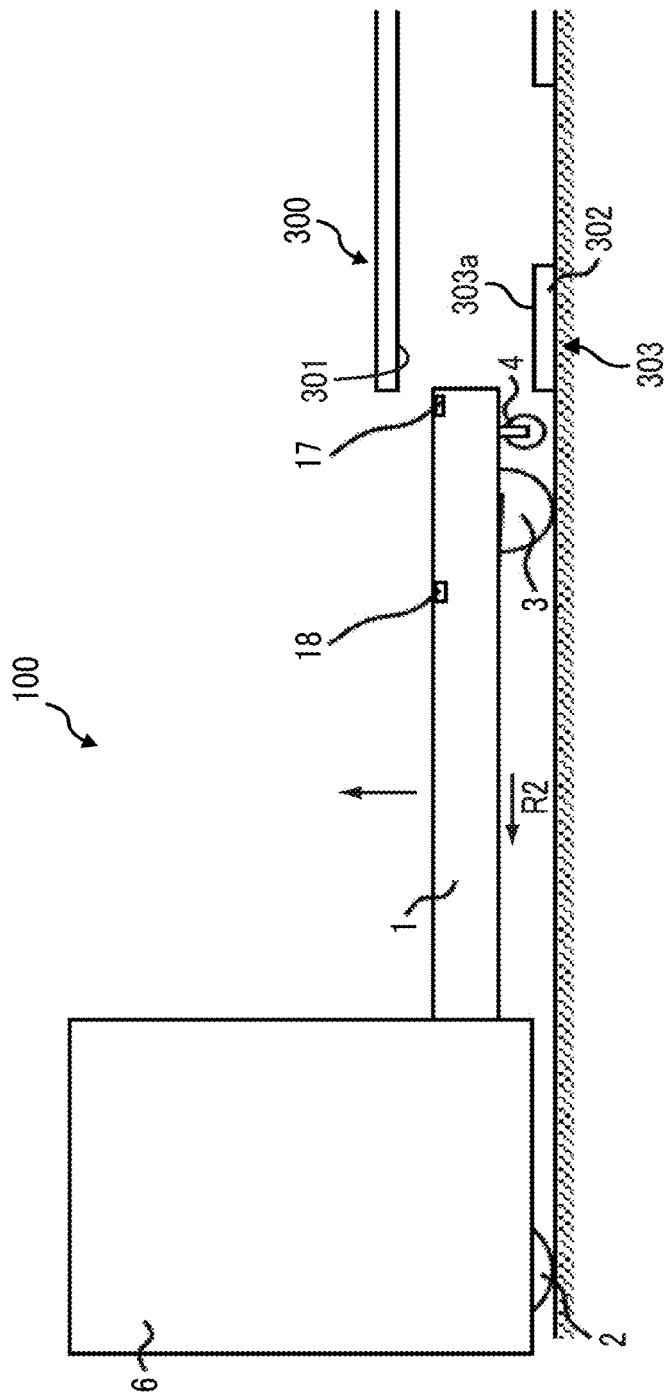
FIG. 22 illustrates a state in which the fork is extracted from the pallet.

After the fork 1 is lifted up and the driven wheel 3 is contacted with the upper face 303a of the step member 303, the lifter 100 extracts the fork 1 while contacting the driven wheel 3 on the upper face 303a of the step member 303 as illustrated in FIG. 21, and then the lifter 100 lowers the driven wheel 3 from the step member 303 formed on the bottom side of the pallet 300 as illustrated in FIG. 22, with which the driven wheel 3 steps over or passes over the step member 303 formed on the bottom side of the pallet 300.

Further, when the second step detection unit 18 detects the next step member 303, the lifter 100 is operated as above described again to step over or pass over the next step member 303. The fork 1 can be extracted from the pallet 300 by stepping over all of the step members 303 of the pallet 300 by repeating the above described extraction operation.

Second Embodiment

FIGS. 23 to 28 illustrate an operation of the fork 1 when the fork 1 is inserted into the pallet 300 (the fork insertion operation of the second embodiment), in which the auxiliary wheel 5 is disposed or mounted at the position closer to the rear end portion 1A compared to the driven wheel 3 in the fork 1, and the position of the auxiliary wheel 5 is settable lower than the position of the driven wheel 3 by lowering the fork 1.

Figure 23:
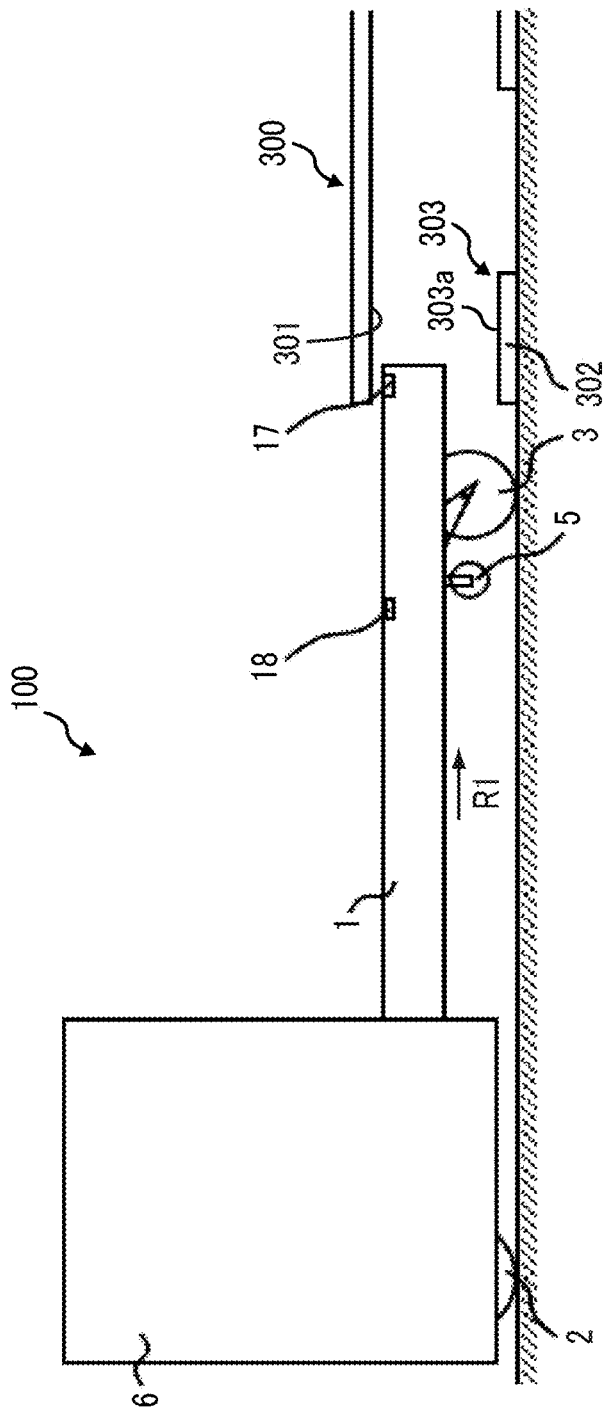
FIG. 23 illustrates a side view illustrating an initial state when inserting a fork into a pallet of a second embodiment.

FIG. 23 illustrates a state in which the first step detection unit 17, disposed on the front side of the rotation axis center of the driven wheel 3 (the rotation center of the axis shaft 15), is positioned or comes above the step member 303 of the pallet 300. In the state illustrated in FIG. 23, the detection face of the first step detection unit 17, attached or mounted to the fork 1, faces a downward direction.

Figure 24:
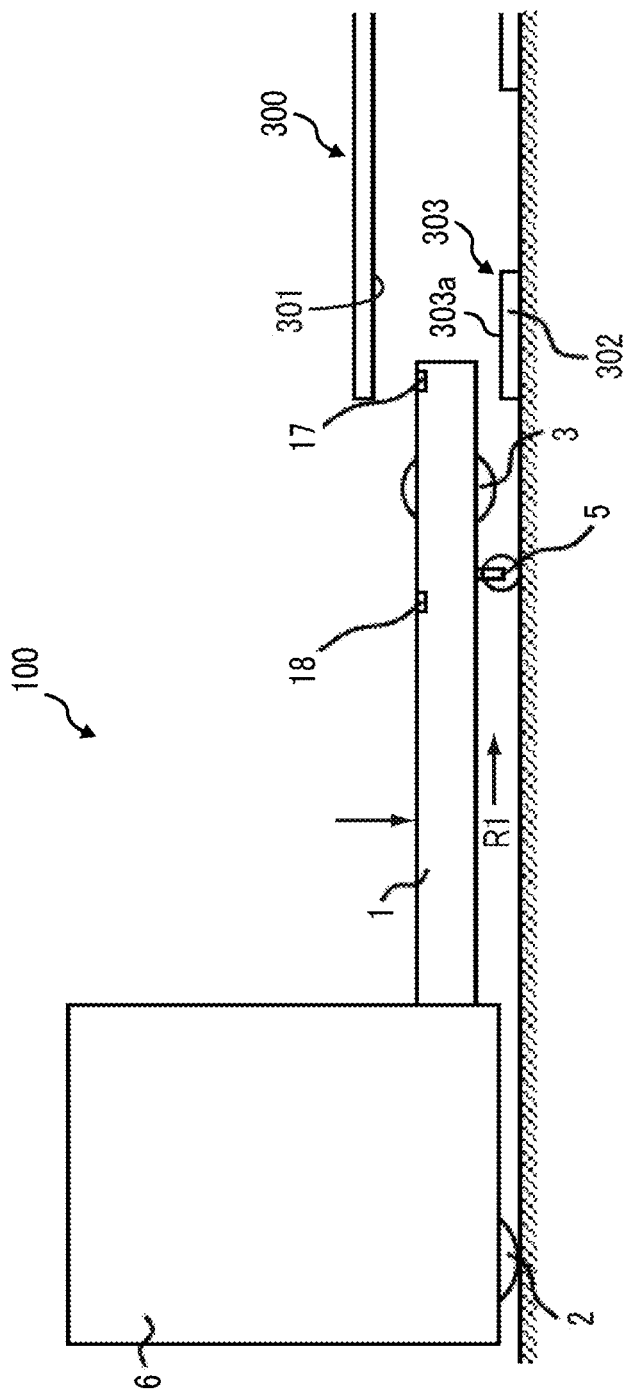
FIG. 24 illustrates a state in which a driven wheel moves upward and the auxiliary wheel are grounded by lowering a fork.

When the first step detection unit 17 detects the step member 303 formed on the bottom side of the pallet 300, the lifter 100 lowers the fork 1 so that the auxiliary wheel 5 is grounded on the floor and the position of the driven wheel 3 is set higher than the upper face 303a of the step member 303 as illustrated in FIG. 24.

Figure 25:
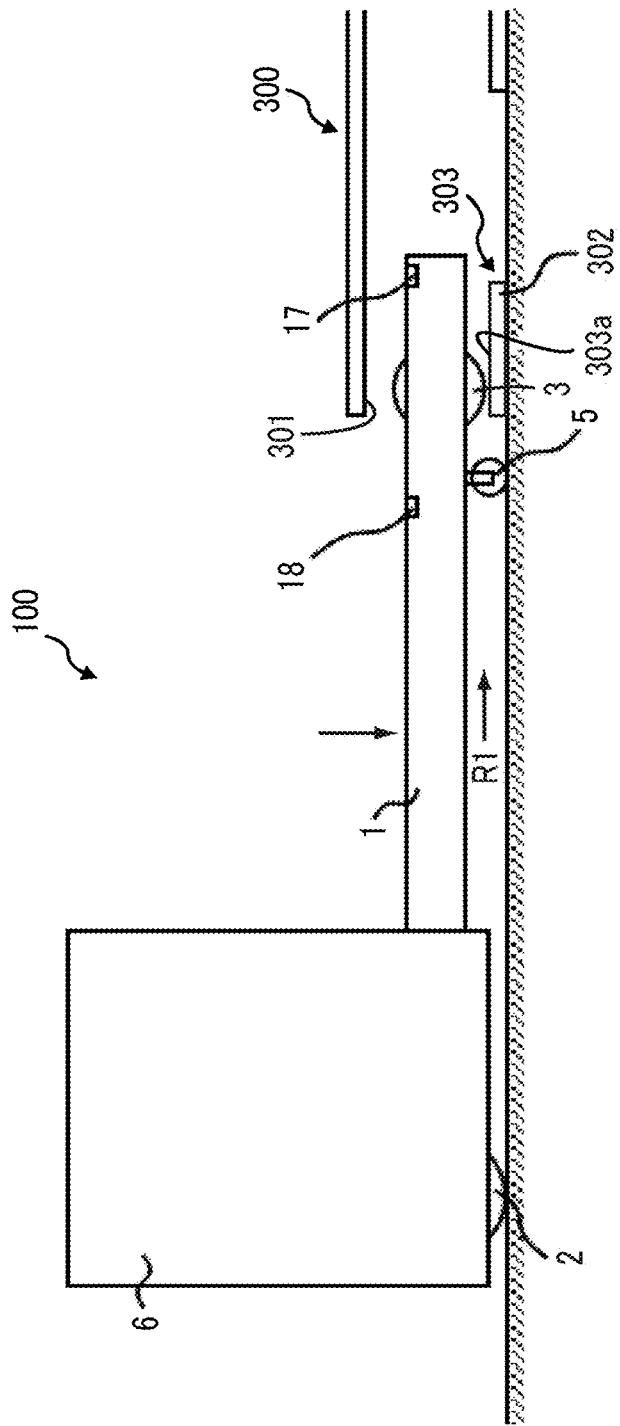
FIG. 25 illustrates a state in which the fork is being inserted from the state of FIG. 24 and the driven wheel comes above the upper face of the step member.

After the auxiliary wheel 5 is grounded on the floor and the position of the driven wheel 3 is set higher than the upper face 303a of the step member 303 by lowing the fork 1, the lifter 100 activates or drives the drive motor 22 to rotate the drive wheel 2 to move for a distance between the first step detection unit 17 and the rotation axis center of the driven wheel 3 to insert the fork 1 into the pallet 300 until the driven wheel 3 comes above the upper face 303a of the step member 303 formed on the bottom side of the pallet 300 as illustrated in FIG. 25.

Figure 26:
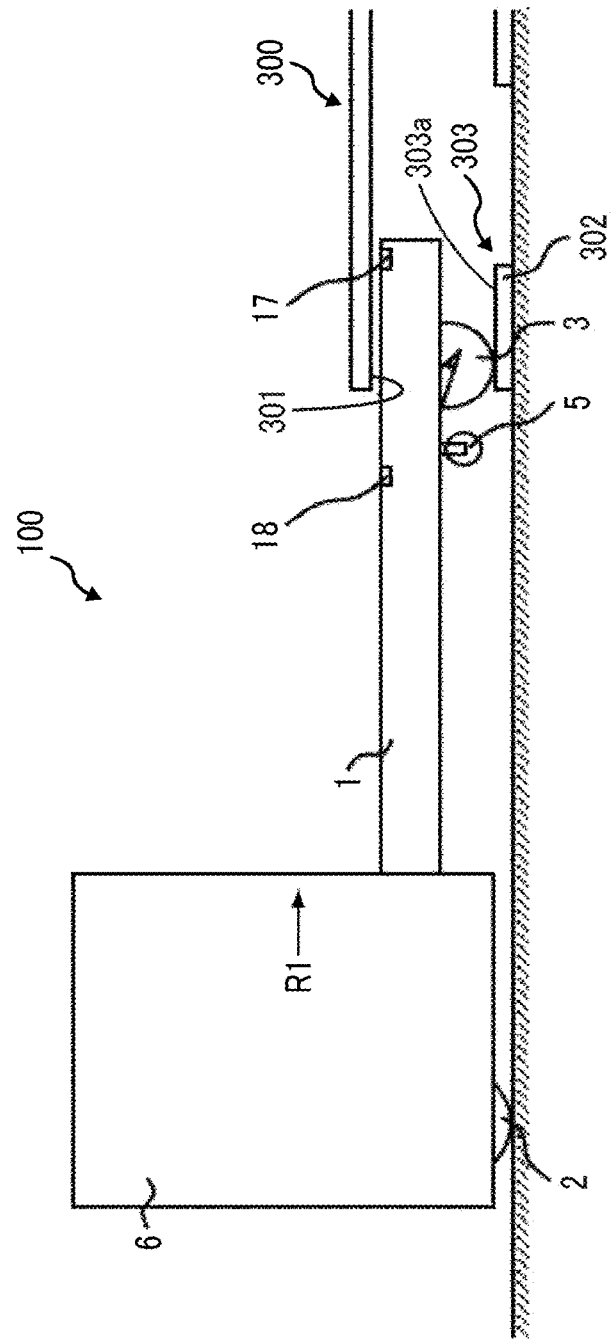
FIG. 26 illustrates a state in which the auxiliary wheel rise as the fork rises.

After inserting the fork 1 until the driven wheel 3 comes above the upper face 303a of the step member 303 formed on the bottom side of the pallet 300, the lifter 100 lifts up the fork 1 to contact the driven wheel 3 on the upper face 303a of the step member 303 as illustrated in FIG. 26.

Figure 27:
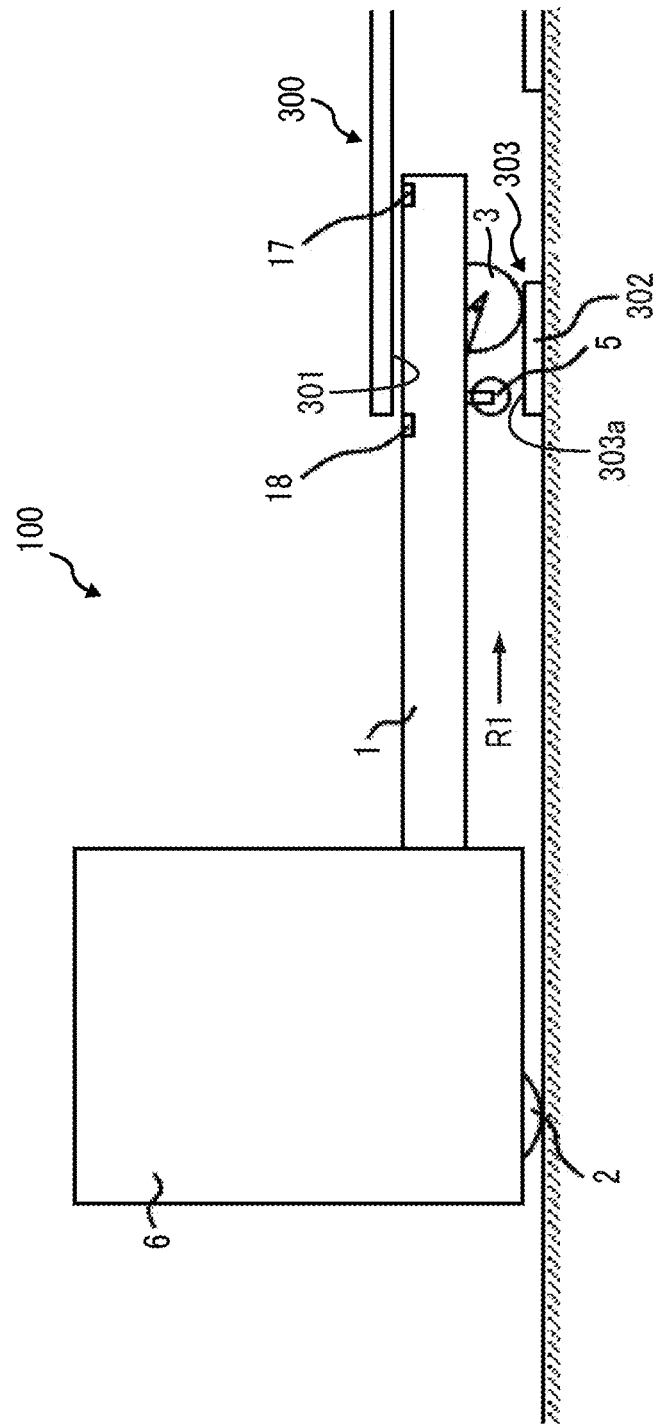
FIG. 27 illustrates a state in which the fork is being inserted while the driven wheel being contacted on the upper face of the step member and the auxiliary wheel rises.
Figure 28:
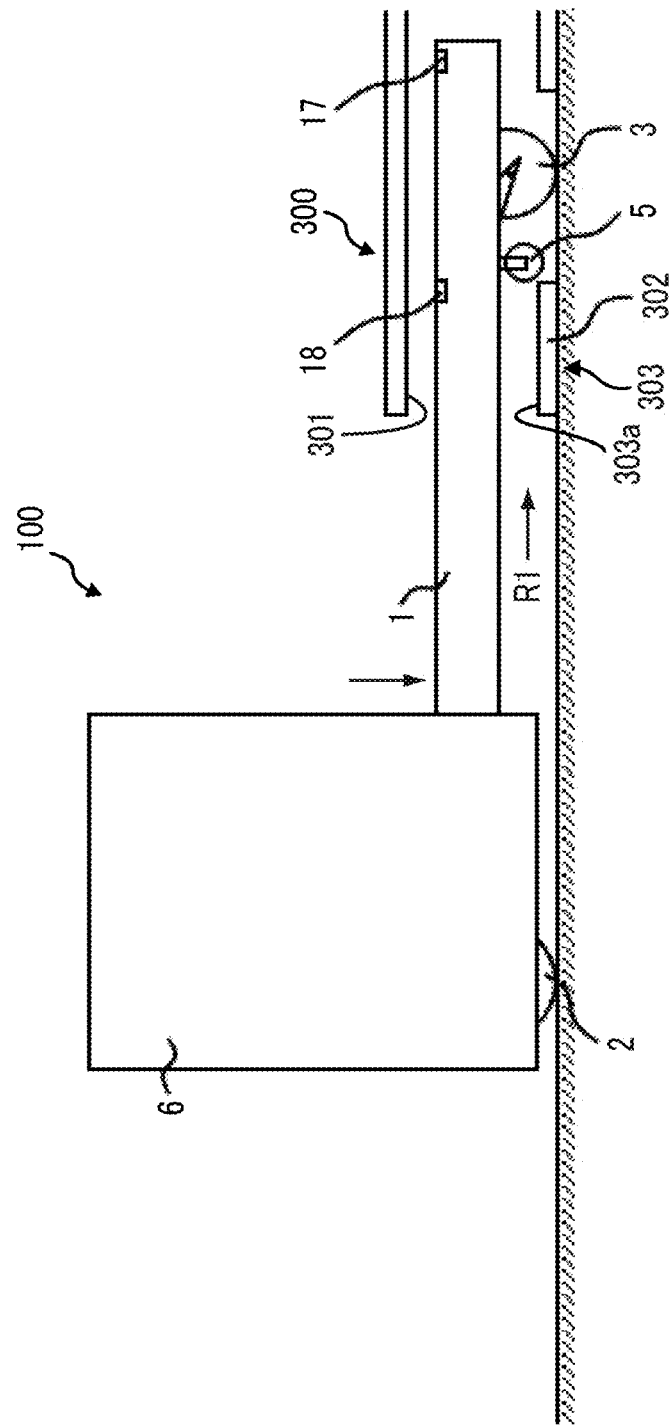
FIG. 28 illustrates a state in which the driven wheel and auxiliary wheel have stepped over or passed over the step member.

After contacting the driven wheel 3 on the upper face 303a of the step member 303 by lifting up the fork 1, the lifter 100 further inserts the fork 1 while contacting the driven wheel 3 on the upper face 303a of the step member 303 as illustrated in FIG. 27, and then the lifter 100 lowers the driven wheel 3 from the upper face 303a of the step member 303 as illustrated in FIG. 28, with which the driven wheel 3 steps over or passes over the step member 303 formed on the bottom side of the pallet 300.

Further, when the first step detection unit 17 detects the next step member 303, the lifter 100 is operated as above described again to step over or pass over the next step member 303. The fork 1 is inserted into the pallet 300 by stepping over the step member 303 of the pallet 300 until the positional relationship between the fork 1 and the pallet 300 is set to a state in which the lifter 100 can lift up and carry or hold the pallet 300 stably.

Hereinafter, a description is given of an operation of the lifter 100 when the fork 1 is extracted from the pallet 300 with reference to FIGS. 29 to 35 (the fork extraction operation of the second embodiment), in which the auxiliary wheel 5 is disposed or mounted at the position closer to the rear end portion 1A compared to the driven wheel 3 in the fork 1 and the position of the auxiliary wheel 5 is settable lower than the position of the driven wheel 3 by lowering the fork 1.

Figure 29:
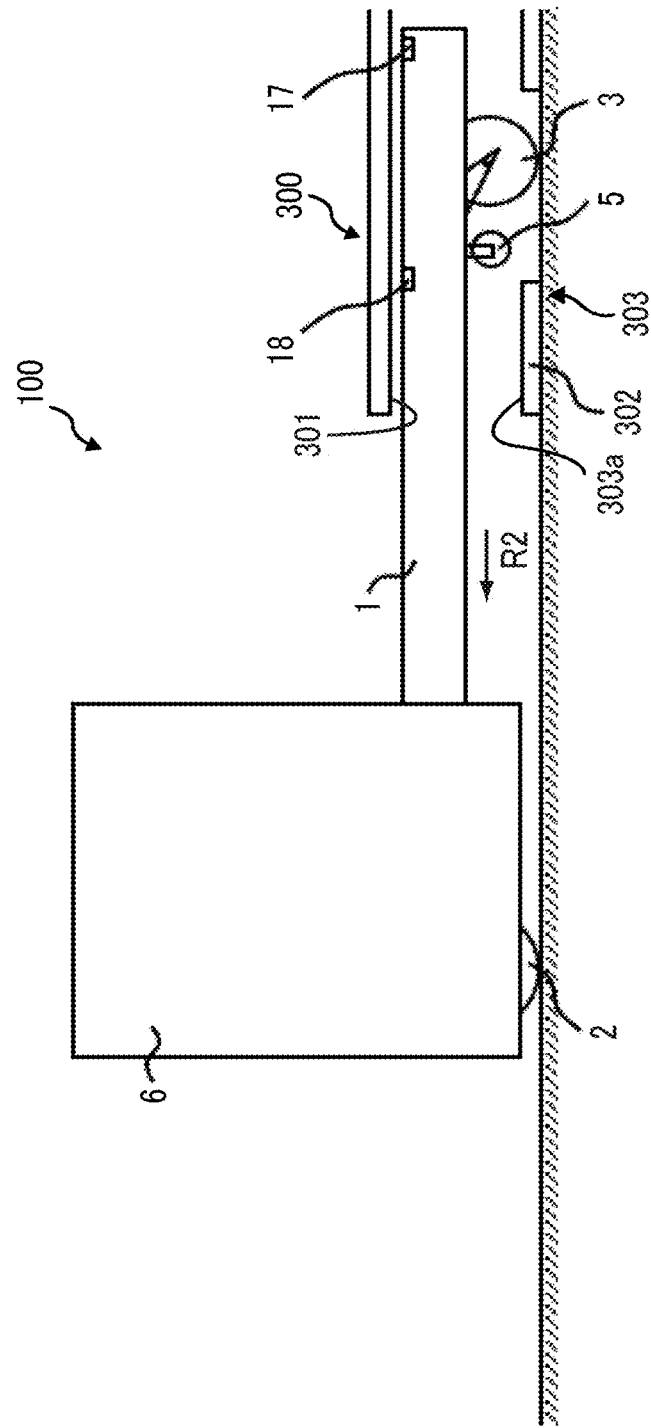
FIG. 29 illustrates an initial state in which a fork is to be extracted from a pallet.

FIG. 29 illustrates a state in which the second step detection unit 18, disposed at the position closer to the rear end portion of the fork 1 compared to the position of the rotation axis center of the auxiliary wheel 5, is positioned or comes above the step member 303 of the pallet 300. In the state illustrated in FIG. 29, the detection face of the second step detection unit 18, attached or mounted to the fork 1, faces a downward direction. When the second step detection unit 18 detects the step member 303, the lifter 100 lifts up the fork 1 so that the auxiliary wheel 5 is set higher than the upper face 303a of the step member 303.

Figure 30:
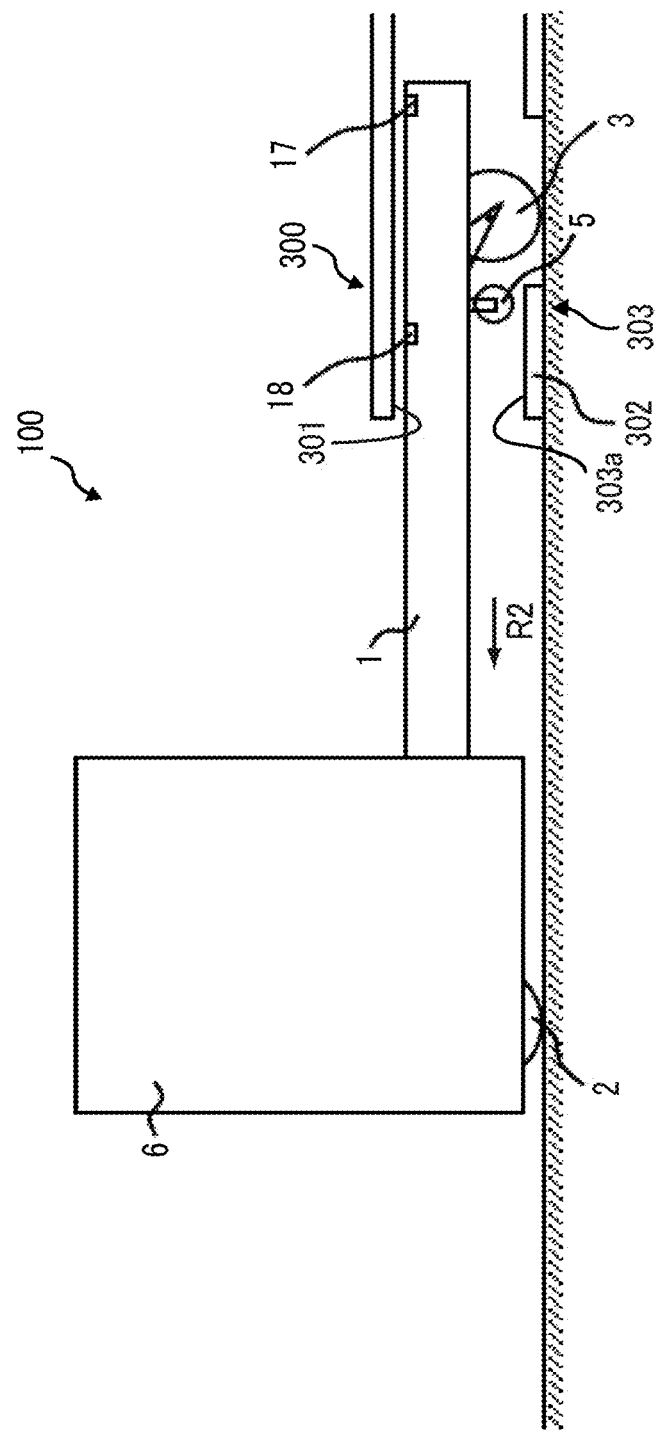
FIG. 30 illustrates a state in which an auxiliary wheel comes above a step member of the pallet during the extraction.
Figure 31:
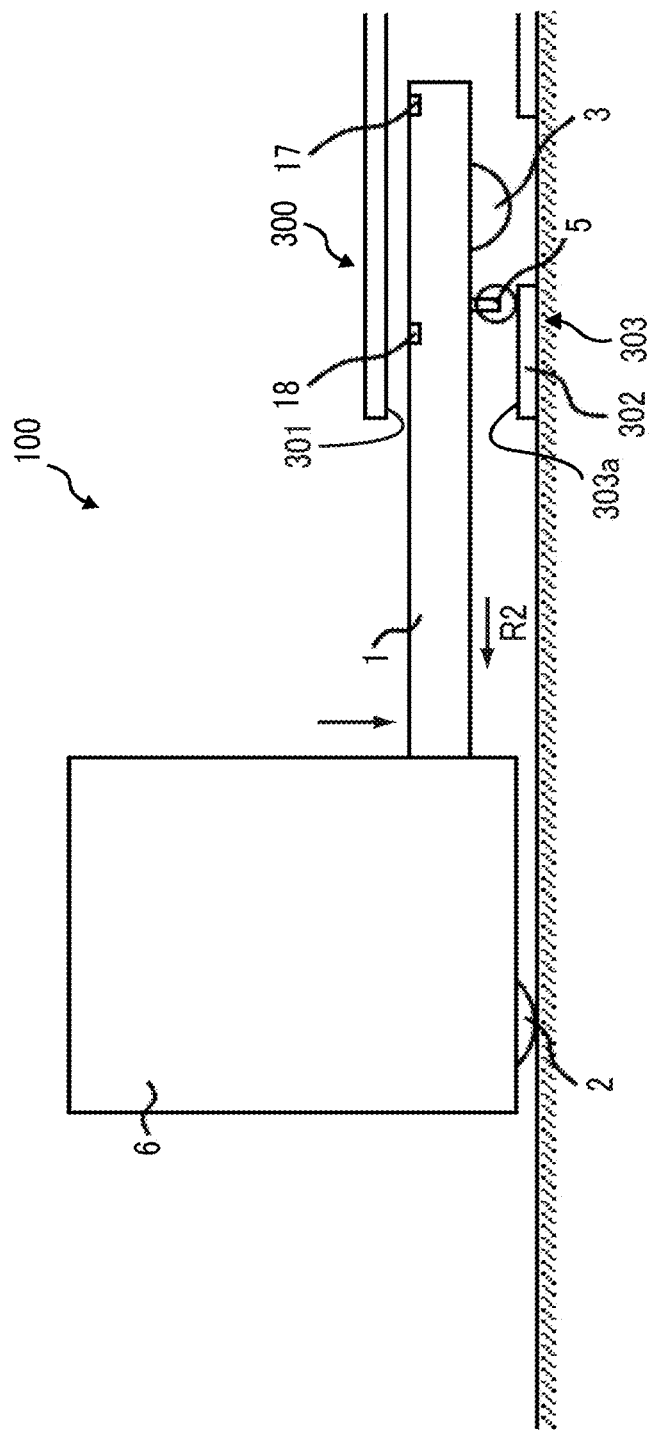
FIG. 31 illustrates a state in which the auxiliary wheel being contacted on the upper face of the step member during the extraction.

After the second step detection unit 18 detects the step member 303 and the fork 1 is lifted up to set the auxiliary wheel 5 at the position higher than the upper face 303a of the step member 303, the lifter 100 activates or drives the drive motor 22 to rotate the drive wheel 2 to move for a distance between the second step detection unit 18 and the rotation axis center of the auxiliary wheel 5 to extract the fork 1 until the auxiliary wheel 5 comes above the upper face 303a of the step member 303 as illustrated in FIG. 30, After extracting the fork 1 until the auxiliary wheel 5 comes above the upper face 303a of the step member 303, the lifter 100 lowers the fork 1 to contact the auxiliary wheel 5 on the upper face 303a of the step member 303 as illustrated in FIG. 31. Then, the lifter 100 further lowers the fork 1 until the driven wheel 3 is set at a position higher than the auxiliary wheel 5 as illustrated in FIG. 31.

Figure 32:
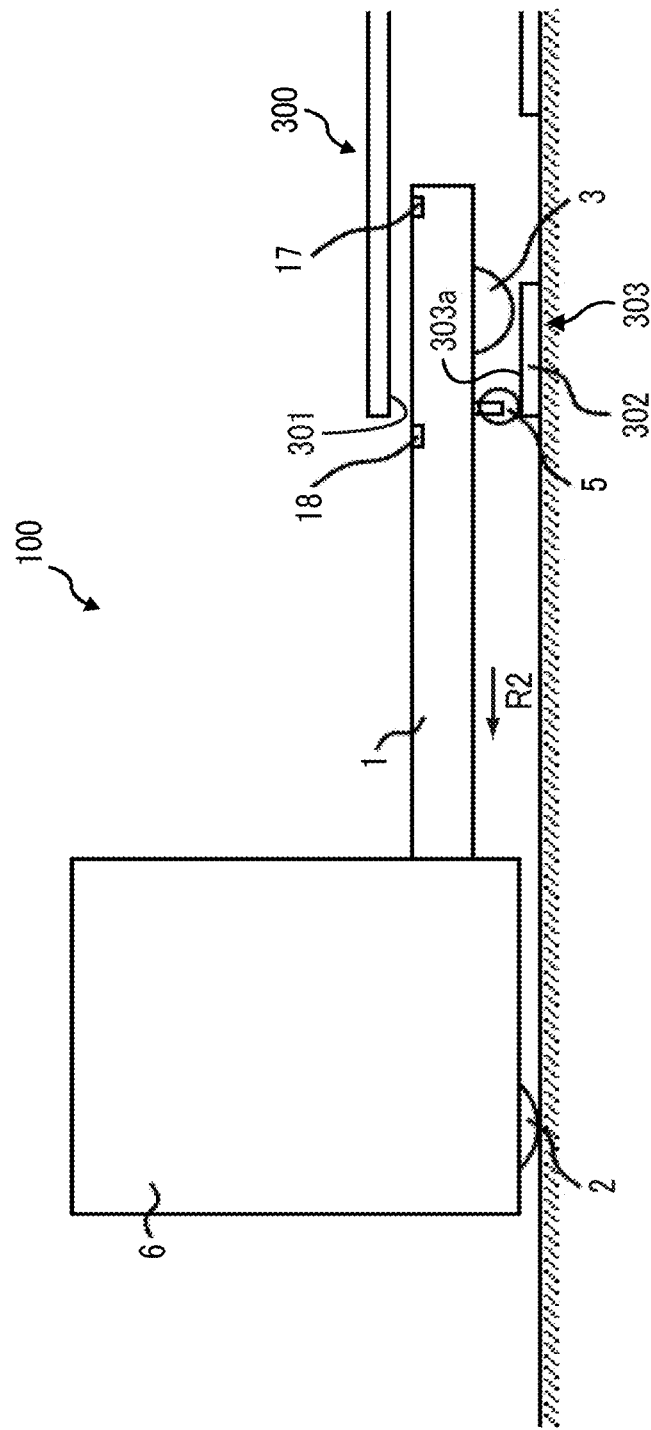
FIG. 32 illustrates a state in which a driven wheel rises while the auxiliary wheel being contacted on the upper face of the step member by lowering the fork during the extraction.

While the auxiliary wheel 5 is being contacted on the upper face 303a of the step member 303 and the position of the driven wheel 3 is being set higher than the position of the auxiliary wheel 5, the lifter 100 activates or drives the drive motor 22 to rotate the drive wheel 2 to move for a distance between the rotation axis center of the auxiliary wheel 5 (the rotation center of the axis shaft 12) and the rotation axis center of the driven wheel 3 (the rotation center of the axis shaft 15) to extract the fork 1 until the driven wheel 3 comes above the step member 303 as illustrated in FIG. 32.

Figure 33:
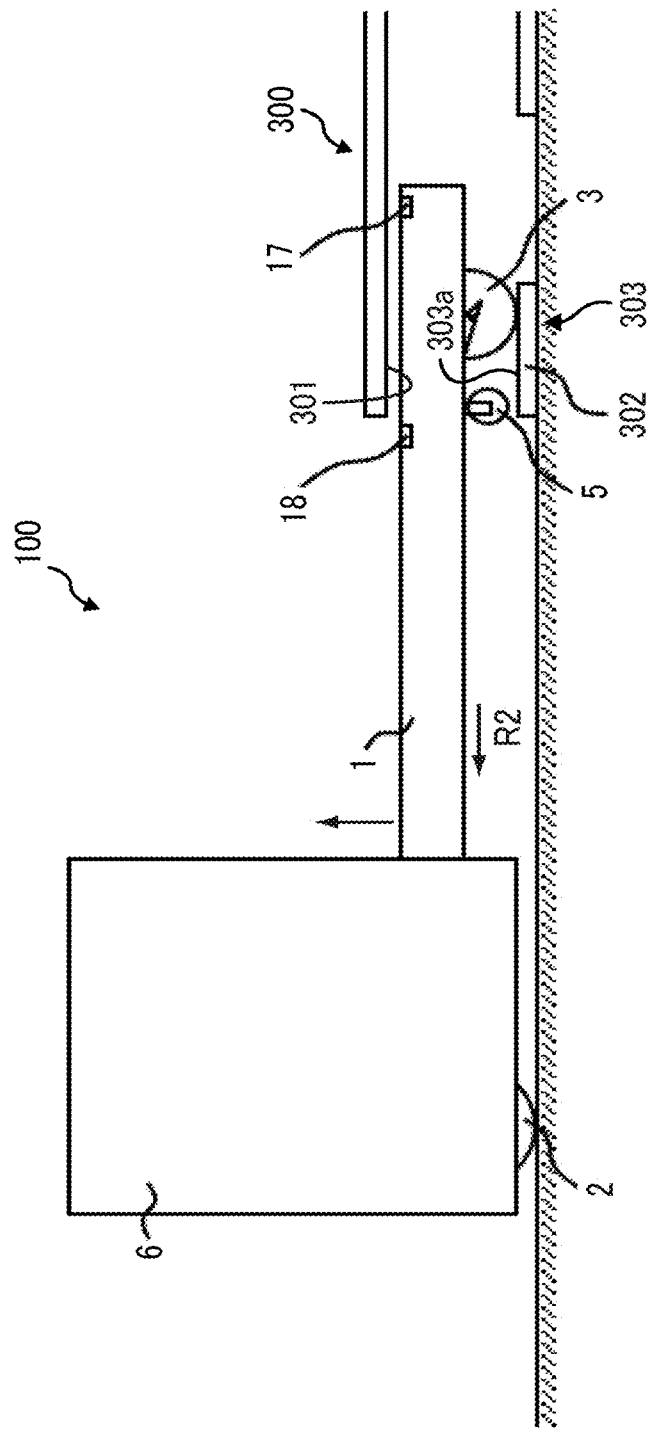
FIG. 33 illustrates a state in which the driven wheel being contacted on the upper face of the step member during the extraction.

After extracting the fork 1 until the driven wheel 3 comes above the step member 303, the lifter 100 lifts up the fork 1 to contact the driven wheel 3 on the upper face 303a of the step member 303 as illustrated in FIG. 33.

Figure 34:
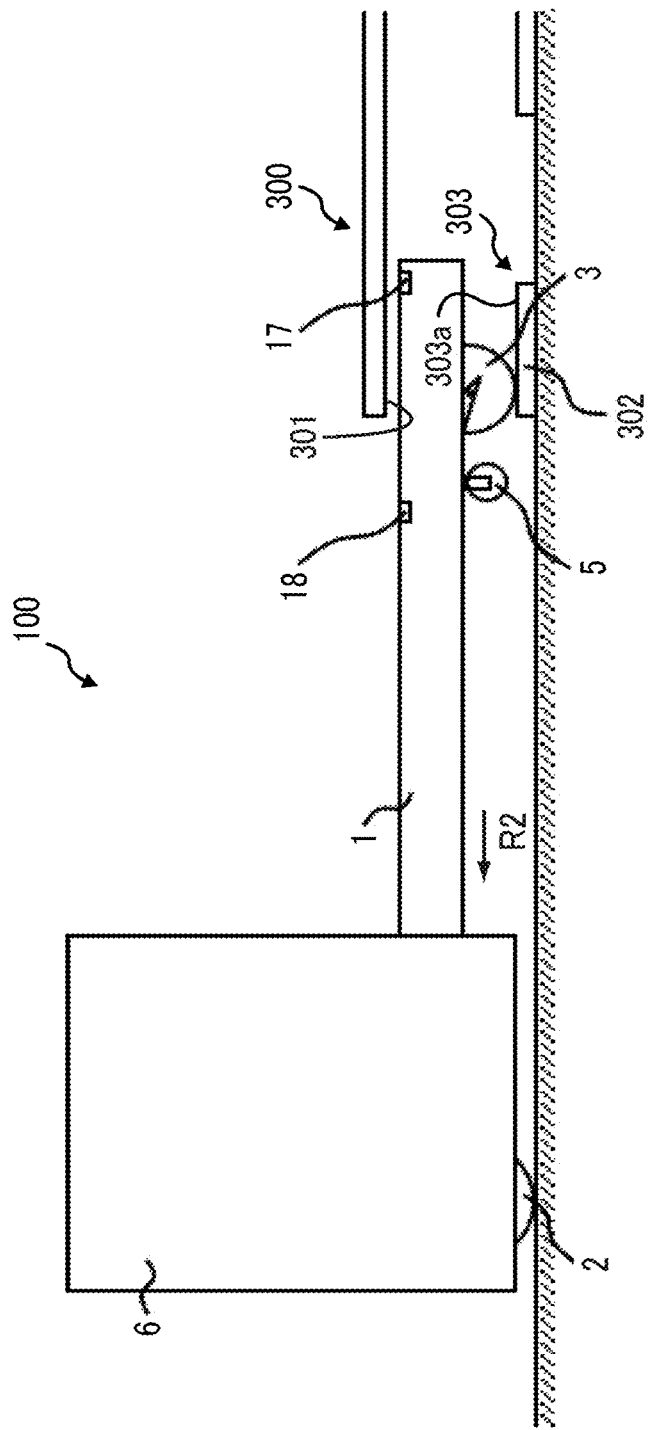
FIG. 34 illustrates a state in which the auxiliary wheel has stepped over or passed over the step member.
Figure 35:
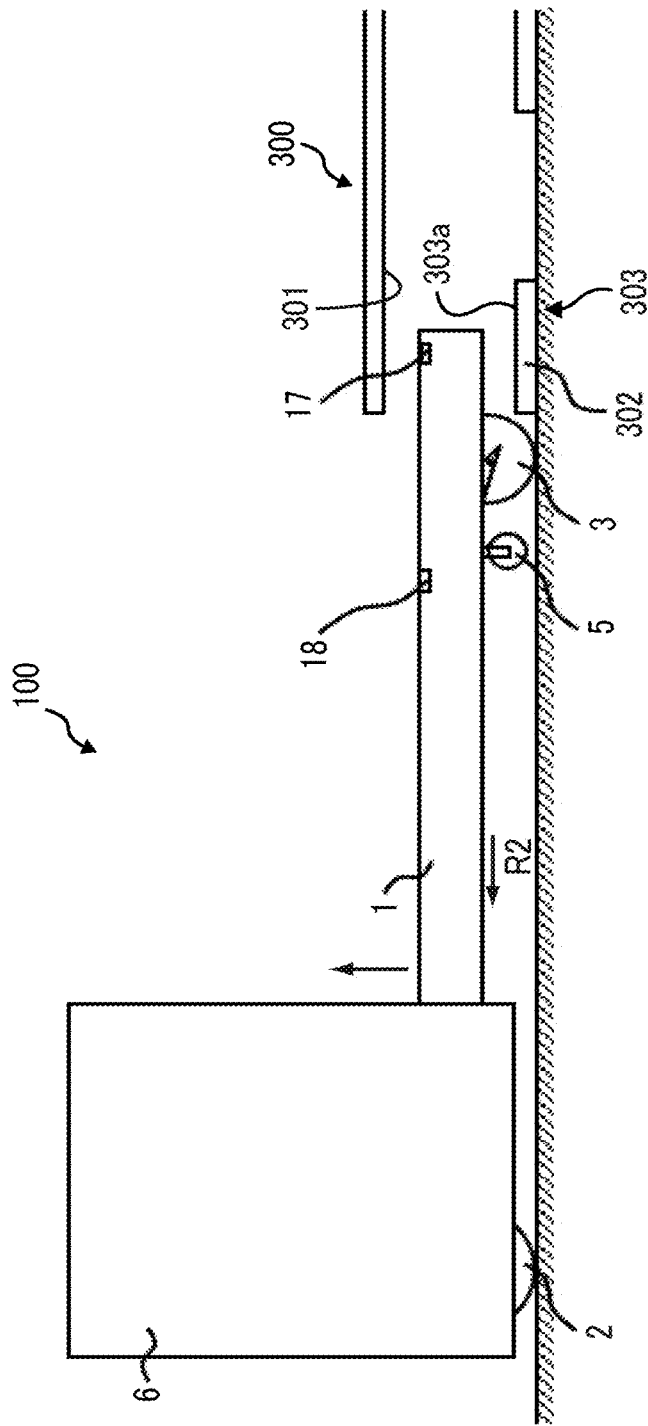
FIG. 35 illustrates a state in which the fork is extracted from the pallet.

After contacting the driven wheel 3 on the upper face 303a of the step member 303 by lifting up the fork 1, the lifter 100 extracts the fork 1 while contacting the driven wheel 3 on the upper face 303a of the step member 303 as illustrated in FIG. 34, then the lifter 100 lowers the driven wheel 3 from the upper face 303a of the step member 303 as illustrated in FIG. 35, with which the driven wheel 3 steps over or passes over the step member 303 formed on the bottom side of the pallet 300.

Further, when the second step detection unit 18 detects the next step member 303, the lifter 100 is operated as above described again to step over or pass over the next step member 303. The fork 1 can be extracted from the pallet 300 by stepping over all of the step members 303 of the pallet 300 by repeating the above described extraction operation.

Third Embodiment

FIGS. 36 to 42 illustrate an operation of the lifter 100 when the fork 1 is inserted into the pallet 300 (the fork insertion operation of the third embodiment), in which the auxiliary wheel 4 is disposed or mounted at the position closer to the front end portion 1B compared to the driven wheel 3 in the fork 1, and the position of the auxiliary wheel 4 is settable lower than the position of the driven wheel 3 by lowering the fork 1, and the auxiliary wheel 5 is disposed or mounted at the position closer to the rear end portion 1A compared to the driven wheel 3 in the fork 1 and the position of the auxiliary wheel 5 is settable lower than the position of the driven wheel 3 by lowering the fork 1.

Figure 36:
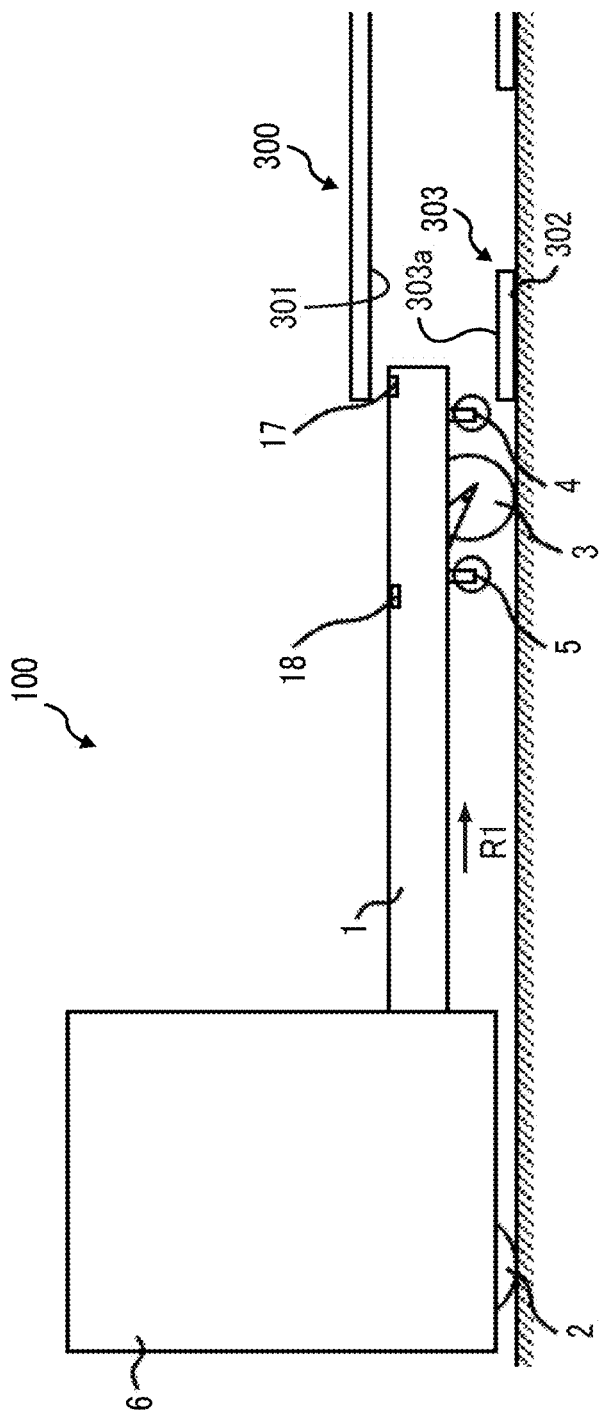
FIG. 36 illustrates a side view illustrating an initial state when inserting a fork having two auxiliary wheels into a pallet of a third embodiment.

In the state illustrated in FIG. 36, the detection face of the first step detection unit 17, disposed at the position closer to the front end portion 1B compared to the rotation axis center of the auxiliary wheel 4 in the fork 1, faces a downward direction.

When the first step detection unit 17 detects the step member 303 formed on the bottom side of the pallet 300, the lifter 100 lifts up the fork 1 so that the auxiliary wheel 4 is set higher than the upper face 303a of the step member 303 as illustrated in FIG. 36.

Figure 37:
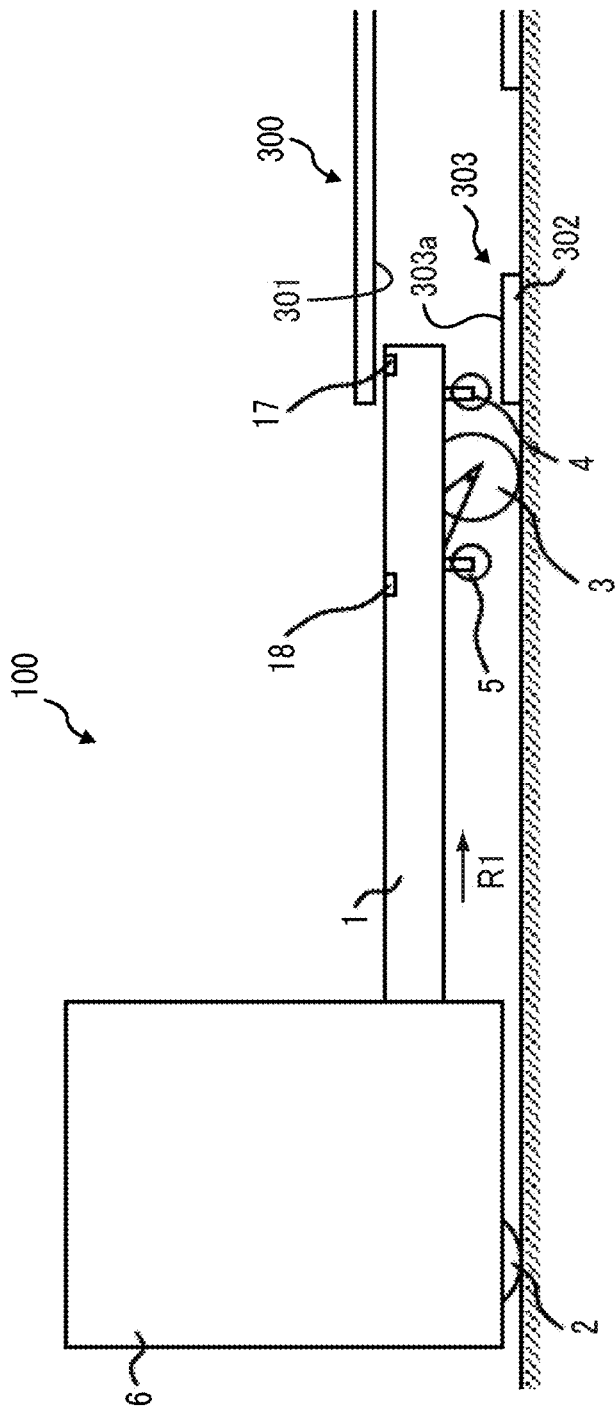
FIG. 37 illustrates a side view illustrating a state in which an auxiliary wheel comes above a step member of the pallet from the state of FIG. 36.

After the first step detection unit 17 detects the step member 303 and the fork 1 is lifted up to set the auxiliary wheel 4 higher than the upper face 303a of the step member 303, the lifter 100 activates or drives the drive motor 22 to rotate the drive wheel 2 to move for a distance between the first step detection unit 17 and the rotation axis center of the auxiliary wheel 4 to insert the fork 1 into the pallet 300 until the auxiliary wheel 4 comes above the upper face 303a of the step member 303 as illustrated in FIG. 37.

Figure 38:
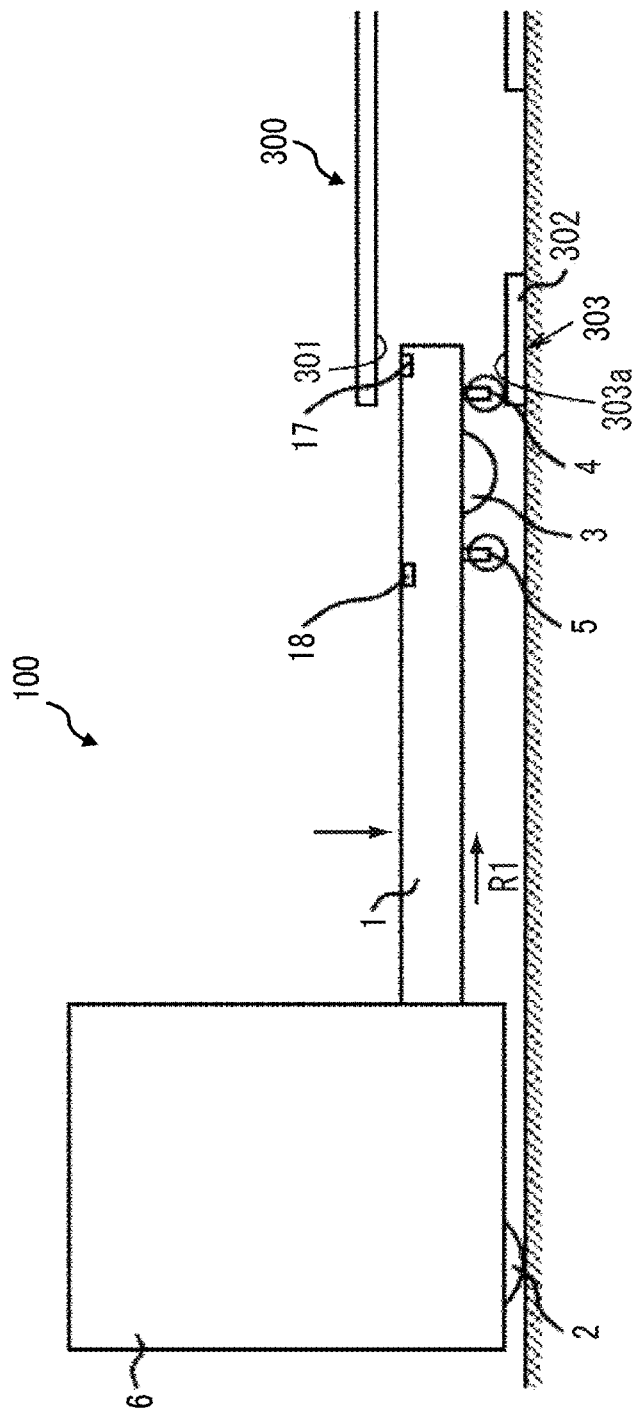
FIG. 38 illustrates a state in which a driven wheel moves upward and one of auxiliary wheels contacts the upper face of the step member by lowering the fork.

After inserting the fork 1 until the auxiliary wheel 4 comes above the upper face 303a of the step member 303, the lifter 100 lowers the fork 1 to contact the auxiliary wheel 4 on the upper face 303a of the step member 303, and then the lifter 100 further lowers the fork 1 until the driven wheel 3 is set at a position higher than the auxiliary wheel 4 as illustrated in FIG. 38.

Figure 39:
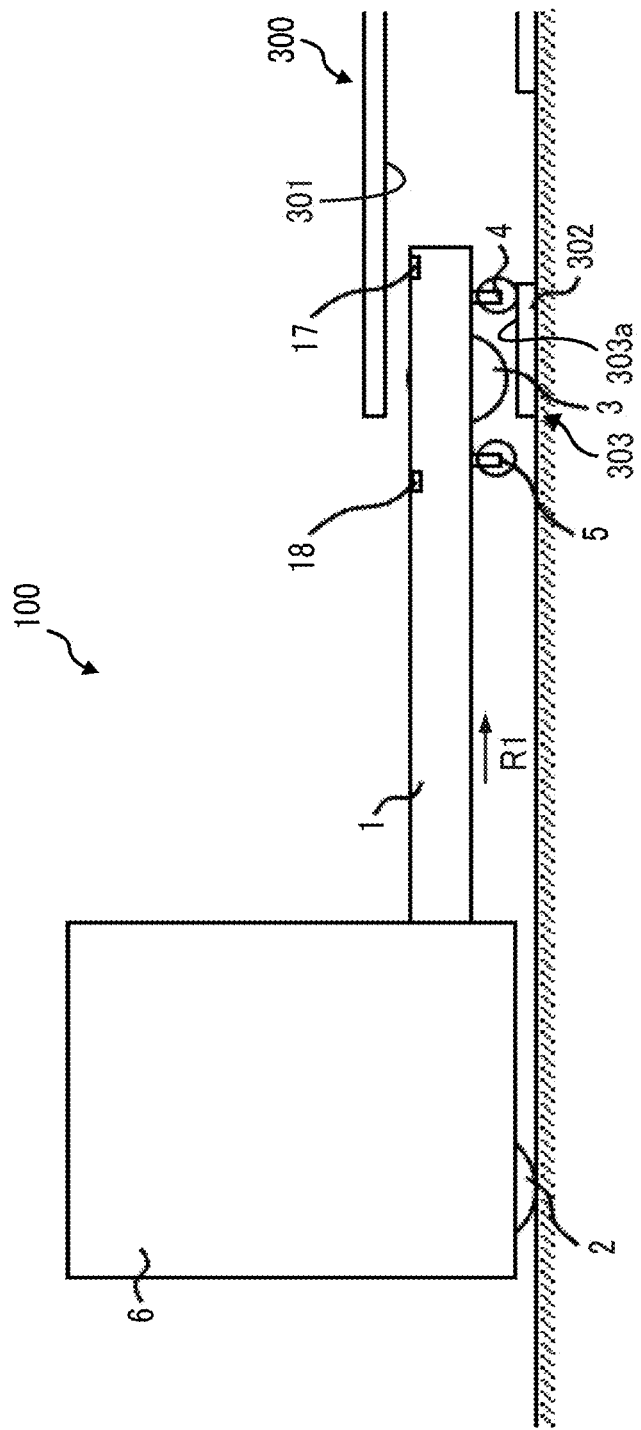
FIG. 39 illustrates a state in which the fork is being inserted while one of the auxiliary wheel being contacted on the upper face of the step member.

While the auxiliary wheel 4 is being contacted on the upper face 303a of the step member 303 and the driven wheel 3 is set at a position higher than the auxiliary wheel 4, the lifter 100 activates or drives the drive motor 22 to rotate the drive wheel 2 for a distance between the rotation axis center of the auxiliary wheel 4 and the rotation axis center of the driven wheel 3 to insert the fork 1 until the driven wheel 3 comes above the upper face 303a of the step member 303 as illustrated in FIG. 39.

Figure 40:
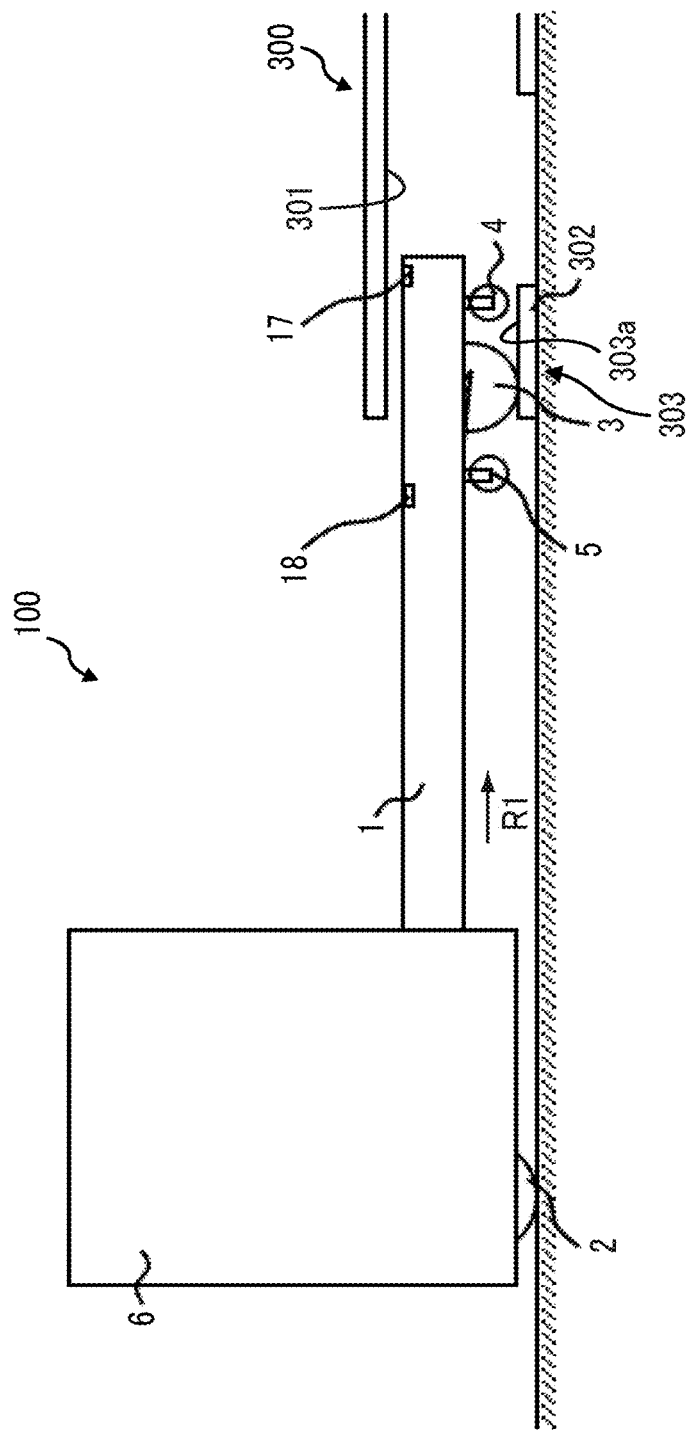
FIG. 40 illustrates a state in which the driven wheel descends and contacts with the upper face of the step member by lifting up the fork.

After inserting the fork 1 until the driven wheel 3 comes above the upper face 303a of the step member 303, the lifter 100 lifts up the fork 1 to contact the driven wheel 3 on the upper face 303a of the step member 303 as illustrated in FIG. 40.

Figure 41:
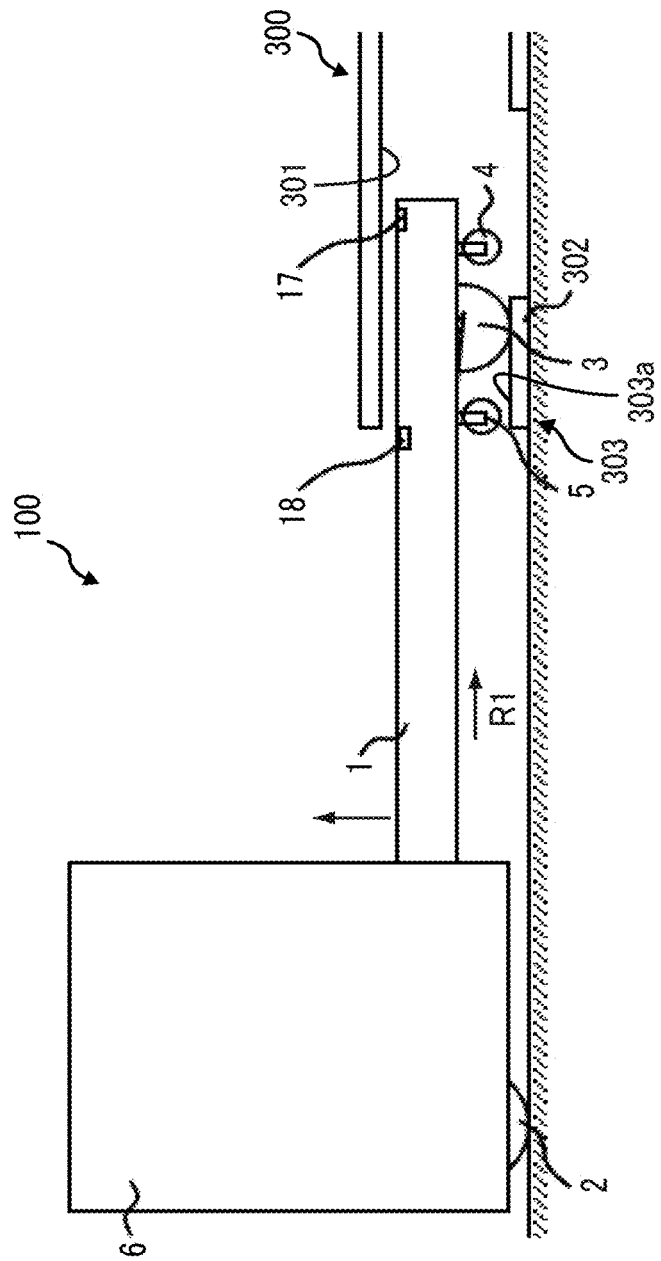
FIG. 41 illustrates a state in which the fork is being inserted while the driven wheel being contacted on the upper face of the step member.
Figure 42:
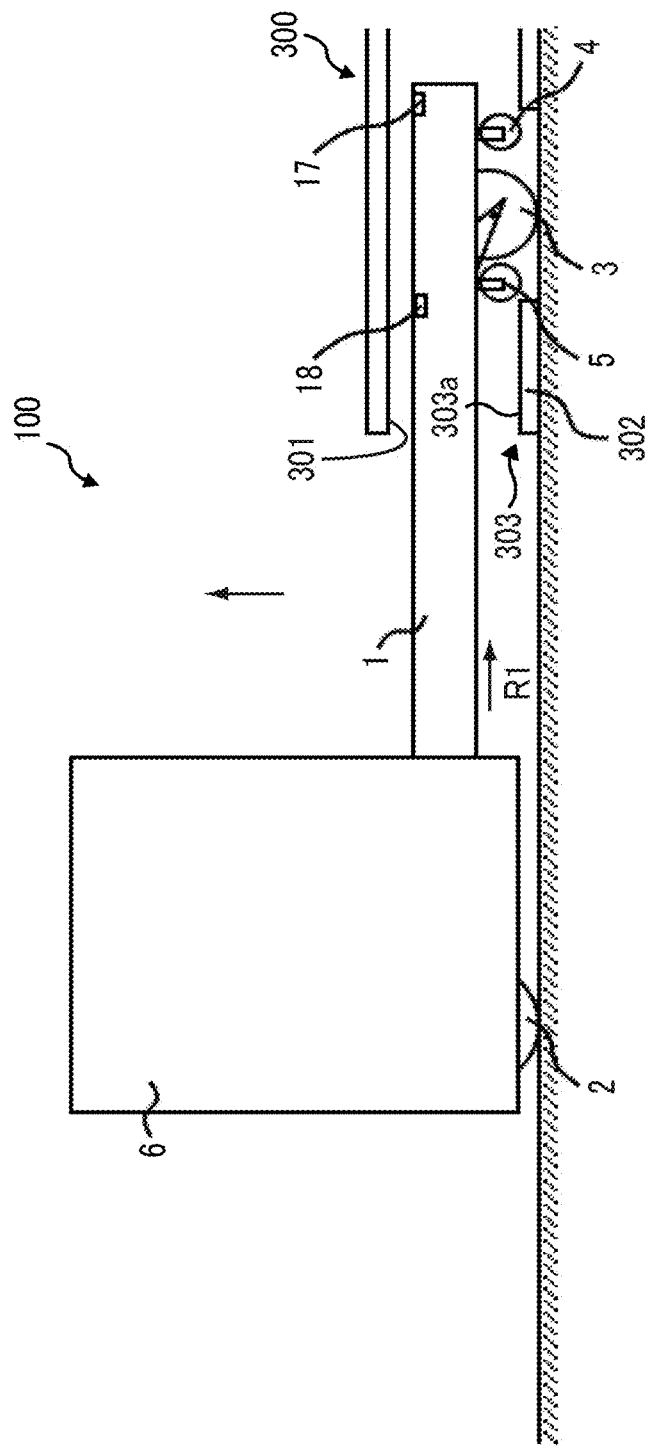
FIG. 42 illustrates a state in which the driven wheel and the auxiliary wheels have stepped over or passed over the step member.

After contacting the driven wheel 3 on the step member 303 formed on the bottom side of the pallet 300, the lifter 100 inserts the fork 1 while contacting the driven wheel 3 on the upper face 303a of the step member 303 as illustrated in FIG. 41, and then the lifter 100 lowers the driven wheel 3 and the auxiliary wheel 5, disposed at the position closer to the rear end portion 1A compared to the driven wheel 3 in the fork 1, from the upper face 303a of the step member 303 as illustrated in FIG. 42, with which the driven wheel 3 steps over or passes over the step member 303 formed on the bottom side of the pallet 300.

Further, when the first step detection unit 17 detects the next step member 303, the lifter 100 is operated as above described again to step over or pass over the next step member 303. The fork 1 is inserted into the pallet 300 by stepping over the step member 303 of the pallet 300 until the positional relationship between the fork 1 and the pallet 300 is set to a state in which the lifter 100 can lift up and carry or hold the pallet 300 stably.

Hereinafter, a description is given of an operation of the lifter 100 having the auxiliary wheels 4 and 5 when the fork 1 is to be extracted from the pallet 300 with reference to FIGS. 43 to 49 (the fork extraction operation of the third embodiment).

Figure 43:
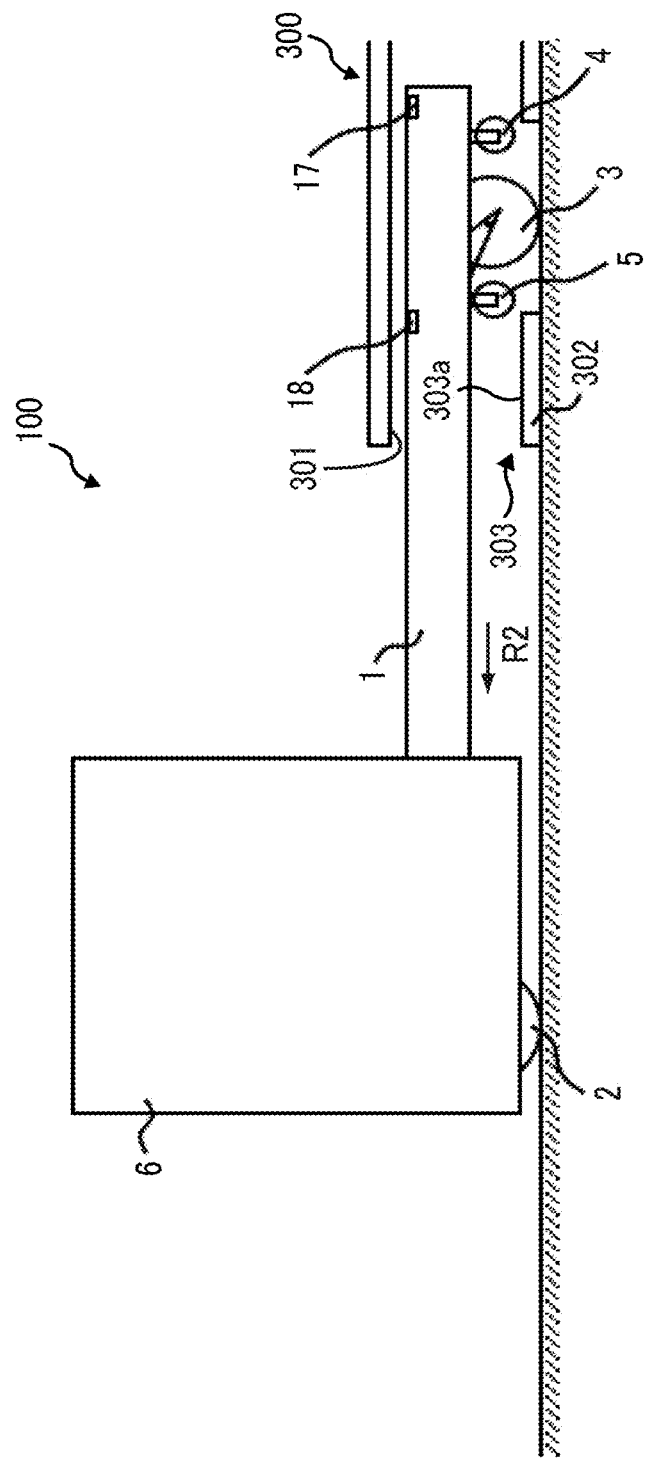
FIG. 43 illustrates an initial state in which a fork is to be extracted from a pallet.

FIG. 43 illustrates a state in which the second step detection unit 18, disposed at the position closer to the rear end portion of the fork 1 compared to the position of the rotation axis center of the auxiliary wheel 5, is positioned or comes above the step member 303 of the pallet 300. In the state illustrated in FIG. 43, the detection face of the second step detection unit 18, attached or mounted to the fork 1, faces a downward direction.

When the second step detection unit 18 detects the step member 303 formed on the bottom side of the pallet 300, the lifter 100 lifts up the fork 1 so that the auxiliary wheel 5 is positioned higher than an upper face 303a of the step member 303 as illustrated in FIG. 43.

Figure 44:
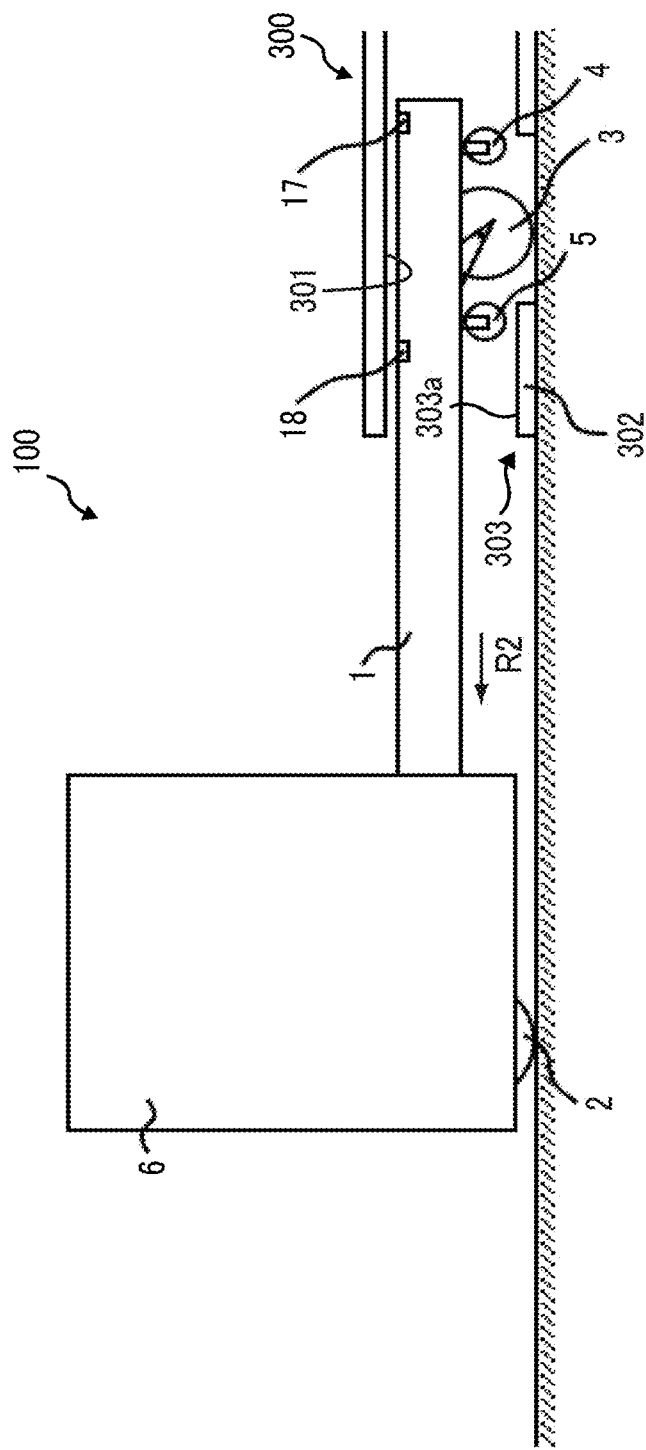
FIG. 44 illustrates a state in which one auxiliary wheel comes above a step member of the a pallet during the extraction.

After the second step detection unit 18 detects the step member 303 formed on the bottom side of the pallet 300 and the fork 1 is lifted up to set the auxiliary wheel 5 higher than the upper face 303a of the step member 303, the lifter 100 activates or drives the drive motor 22 to rotate the drive wheel 2 for a distance between the second step detection unit 18 and the rotation axis center of the auxiliary wheel 5 to extract the fork 1 until the auxiliary wheel 5 comes above the upper face 303a of the step member 303 as illustrated in FIG. 44.

Figure 45:
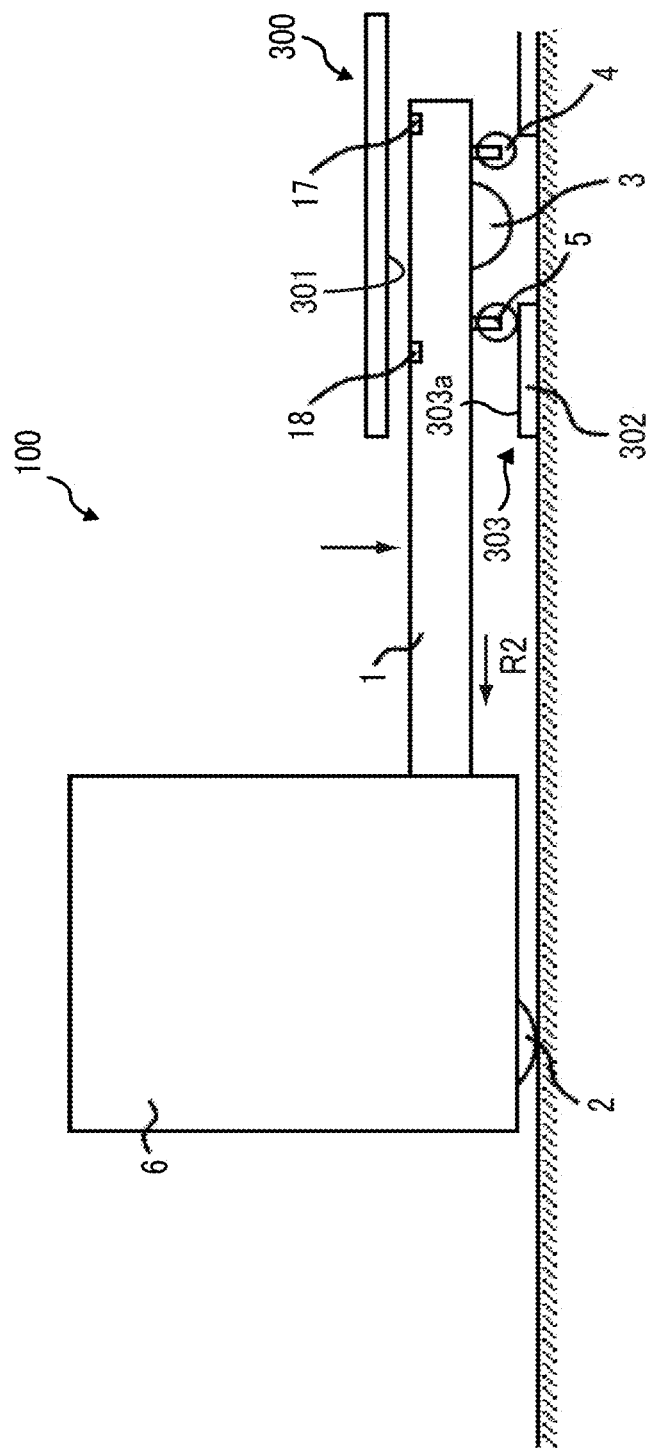
FIG. 45 illustrates a state in which the driven wheel rises and one auxiliary wheel contacts the upper face of the step member by lowering the fork during the extraction.

After extracting the fork 1 until the auxiliary wheel 5 comes above the upper face 303a of the step member 303 formed on the bottom side of the pallet 300, the lifter 100 lowers the fork 1 to contact the auxiliary wheel 5 on the upper face 303a of the step member 303, and then the lifter 100 further lowers the fork 1 until the driven wheel 3 is set at a position higher than the auxiliary wheel 5 as illustrated in FIG. 45.

Figure 46:
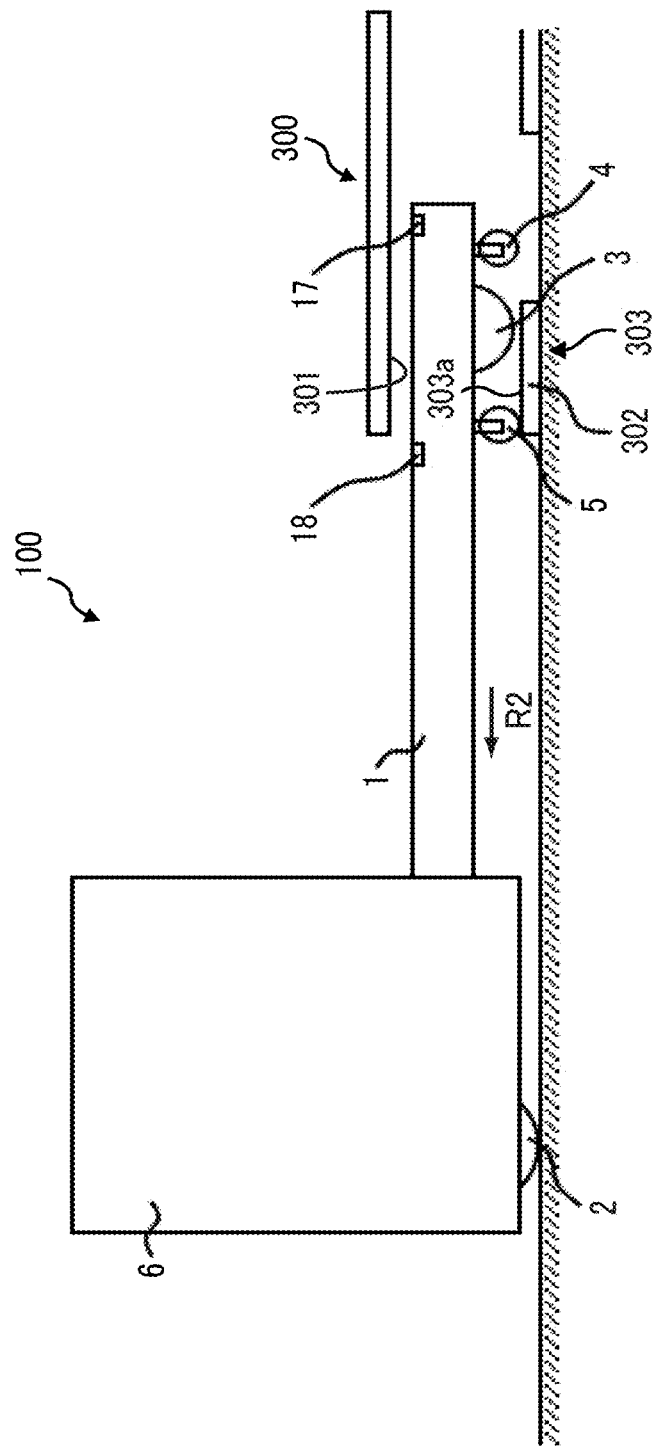
FIG. 46 illustrates a state in which the driven wheel comes above the step member while one auxiliary wheel being contacted on the upper face of the step member during the extraction.

While the auxiliary wheel 5 is being contacted on the upper face 303a of the step member 303 and the position of the driven wheel 3 is being set higher than the position of the auxiliary wheel 5, the lifter 100 activates or drives the drive motor 22 to rotate the drive wheel 2 for a distance between the rotation axis center of the auxiliary wheel 5 and the rotation axis center of the driven wheel 3 to extract the fork 1 until the driven wheel 3 comes above the upper face 303a of the step member 303 as illustrated in FIG. 46.

Figure 47:
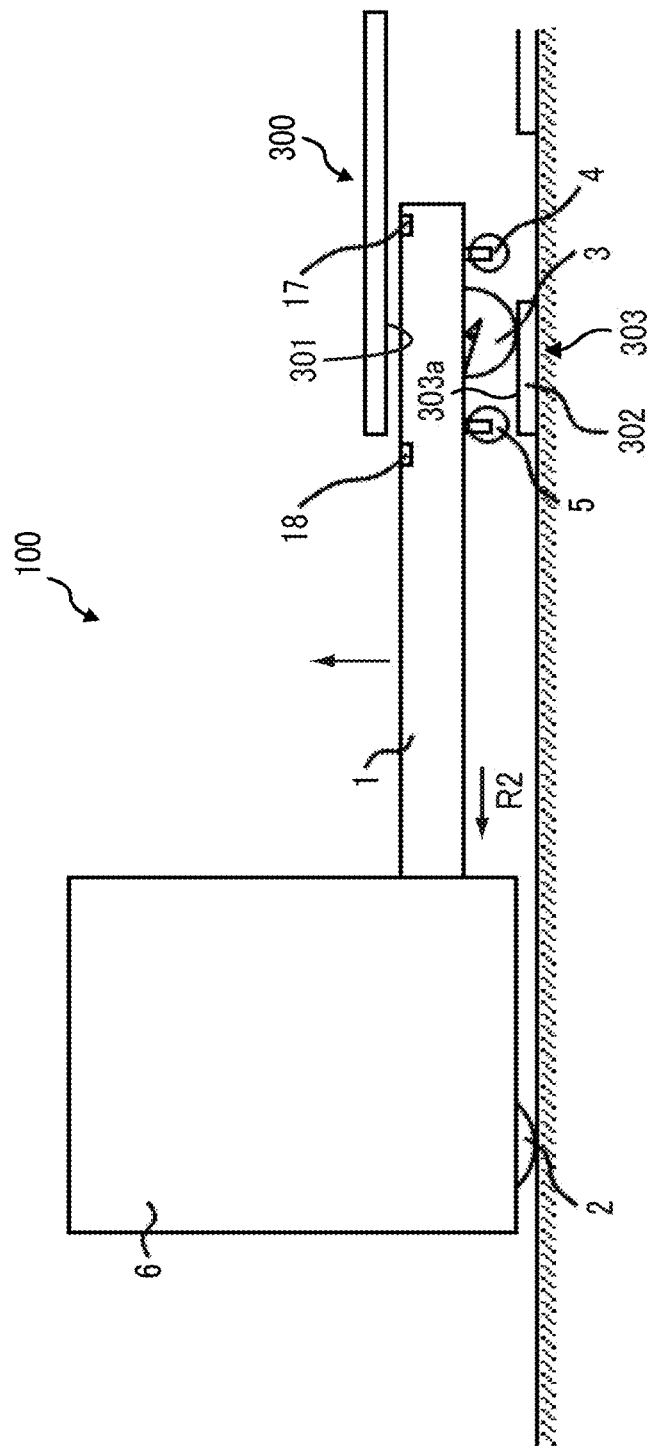
FIG. 47 illustrates a state in which the driven wheel descends and contacts the upper face of the step member by lifting up the fork during the extraction.

After extracting the fork 1 until the driven wheel 3 comes above the step member 303, the lifter 100 lifts up the fork 1 to contact the driven wheel 3 on the upper face 303a of the step member 303 as illustrated in FIG. 47.

Figure 48:
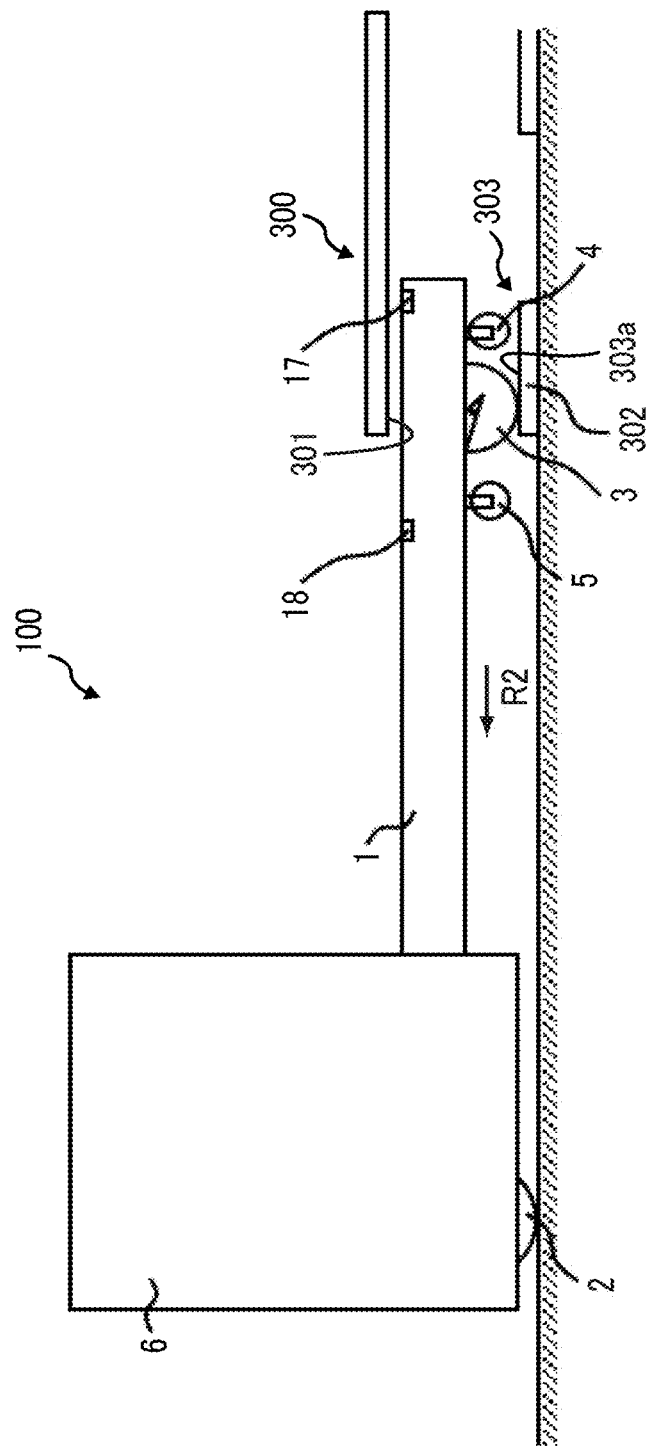
FIG. 48 illustrates a state in which the fork is being extracted in the extraction direction while the driven wheel being contacted on the upper face of the step member.
Figure 49:
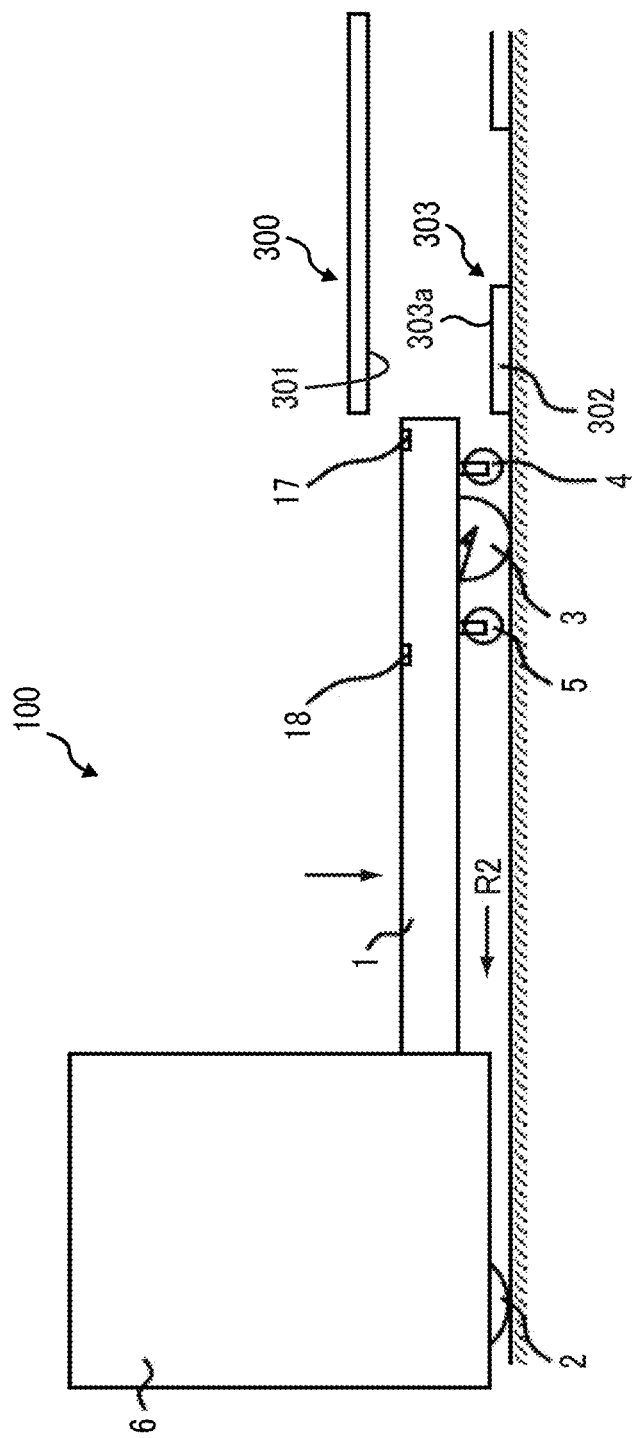
FIG. 49 illustrates a state in which the fork is extracted from the pallet.

After contacting the driven wheel 3 on the upper face 303a of the step member 303 by lifting up the fork 1, the lifter 100 extracts the fork 1 while contacting the driven wheel 3 on the upper face 303a of the step member 303 as illustrated in FIG. 48, and then the lifter 100 lowers the driven wheel 3 from the upper face 303a of the step member 303 as illustrated in FIG. 49, with which the driven wheel 3 steps over or passes over the step member 303 formed on the bottom side of the pallet 300.

Further, when the second step detection unit 18 detects the next step member 303, the lifter 100 is operated as above described again to step over or pass over the next step member 303. The fork 1 can be extracted from the pallet 300 by stepping over all of the step members 303 of the pallet 300 by repeating the above described extraction operation.

Figure 50:
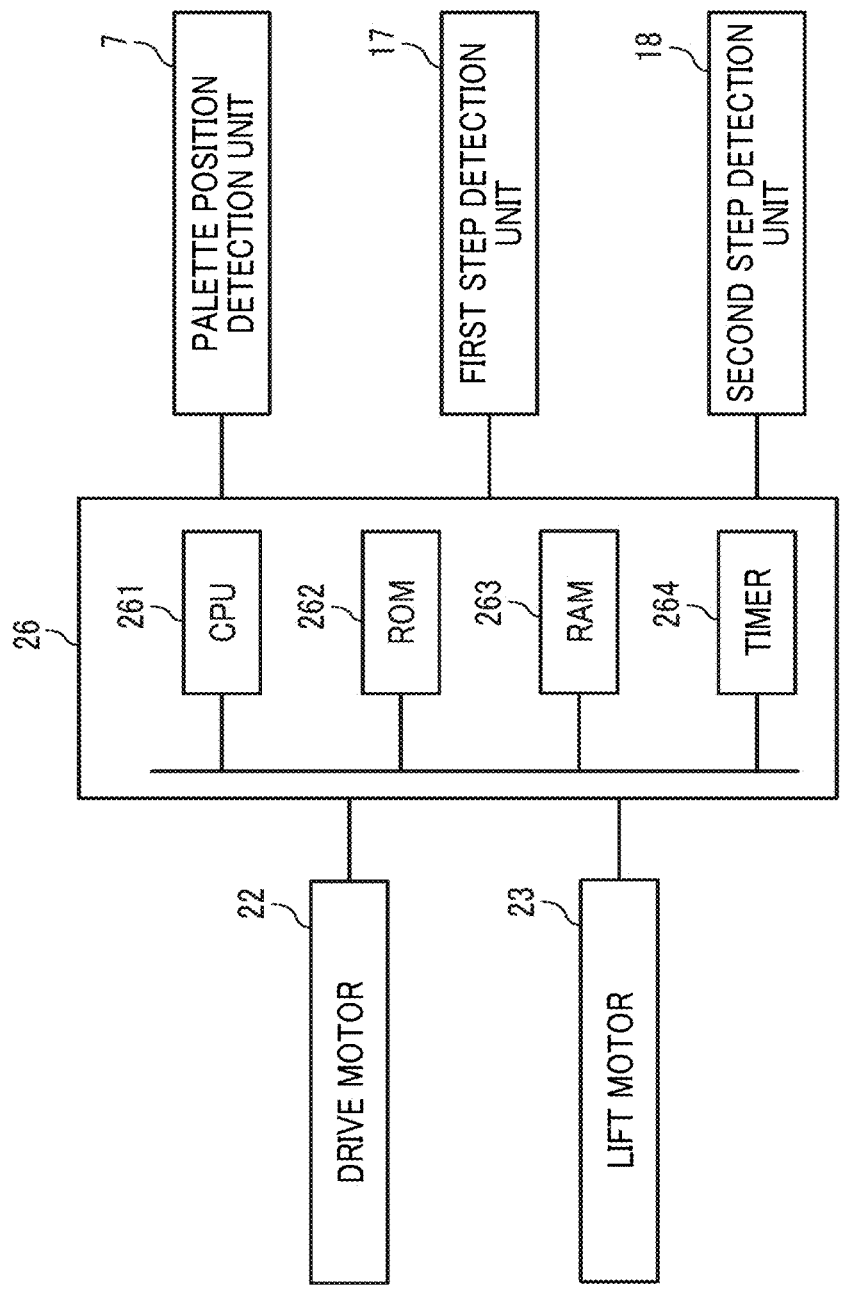
FIG. 50 is an example of a hardware block diagram of a control system of a transport apparatus.

Hereinafter, a description is given of a configuration of the control unit 26 of the lifter 100 with reference to FIG. 50. As illustrated in FIG. 50, the pallet position detection unit 7 and the first step detection unit 17 and the second step detection unit 18 are connected to the input side of the control unit 26 via signal lines. The drive motor 22 and the lift motor 23 (control targets) are connected to the output side of the control unit 26 via signal lines. The control unit 26 includes, for example, a central processing unit (CPU) 261, a read only memory (ROM) 262 and a random access memory (RAM) 263 as storage units, and a timer 264 as a measurement unit.

The measuring device 24 for measuring an elevation or lift amount of the fork 1 is implemented by the control unit 26. The measuring device 24 calculates the elevation or lift amount based on the detection information received from the first step detection unit 17 and/or second step detection unit 18. The map database memory 27 is used during the autonomous travelling operation. Similar to the control unit 26, the route calculation unit 28 can be a computer including a CPU, a storage unit, and a timer, and the like, and is used during the autonomous travelling operation. In the embodiments, the map database memory 27 and the route calculation unit 28 are individually provided with the control unit 26, but the CPU 261 of the control unit 26 can configure the route calculation unit 28, and the ROM 262 can configure the map database memory 27.

Hereinafter, a description is given of controlling sequence of the fork insertion operation (insertion operation) and the fork extraction operation (extraction operation) according to the first to third embodiments with reference to FIGS. 51 to 56. The fork insertion operation and the fork extraction operation are performed mainly by the control unit 26, and are performed during the fork insertion operation and the fork extraction operation in an automatic transport system to be described later.

Figure 51:
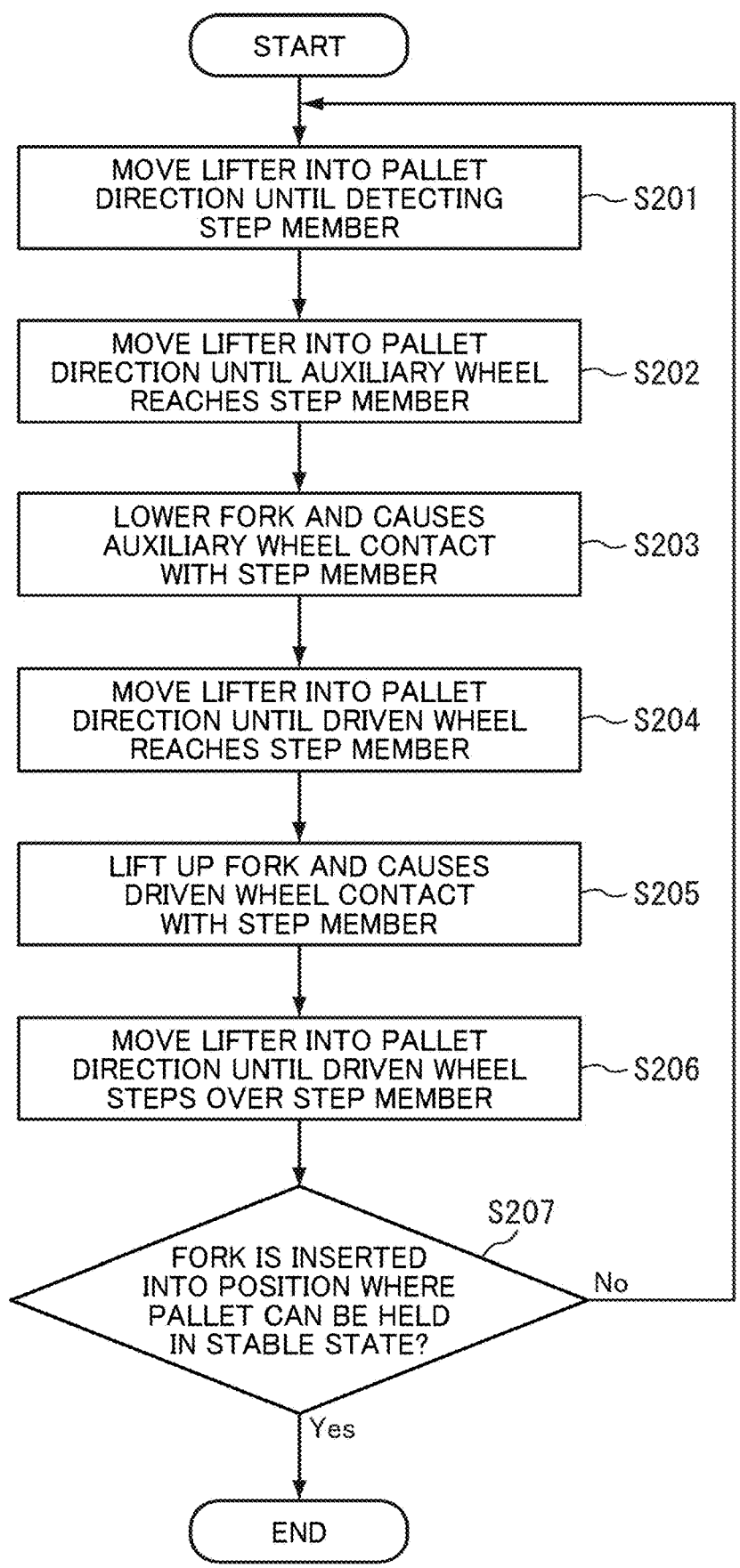
FIG. 51 is a flowchart illustrating a controlling sequence during an insertion operation of the first embodiment and the third embodiment.

FIG. 51 is a flowchart illustrating the controlling sequence during the insertion operation of the first embodiments and the third embodiment. That is, FIG. 51 is a flowchart illustrating the controlling sequence of the fork insertion operation into the pallet 300 in a case where the auxiliary wheel 4 alone is disposed at the position closer to the front end portion 1B compared to the driven wheel 3 in the fork 1, and a case where the auxiliary wheels 4 and 5 are disposed at both of the front and rear end sides of the driven wheel 3.

In step S201, the control unit 26 moves the lifter 100 into the pallet direction until the first step detection unit 17 detects the step member 303. In step S201, the drive motor 22 is activated or driven to rotate the drive wheel 2. When the first step detection unit 17 detects the step member 303, the control unit 26 stops or deactivates the drive motor 22.

After the first step detection unit 17 detects the step member 303, in step S202, the control unit 26 activates or drives the drive motor 22 to rotate the drive wheel 2 to move the lifter 100 into the pallet direction until the auxiliary wheel 4 reaches the step member 303.

In step S203, the control unit 26 activates or drives the lift motor 23 to lower the fork 1 and causes the auxiliary wheel 4 to be contacted on the upper face 303a of the step member 303. In step S203, the fork 1 is lowered until a height of the driven wheel 3 becomes higher than a height of the auxiliary wheel 4. The height of the driven wheel 3 and the height of the auxiliary wheel 4 cam be determined using the detection signals received from the first step detection unit 17.

In step S204, the control unit 26 activates or drives the drive motor 22 to move the lifter 100 into the pallet 300 until the driven wheel 3 reaches the step member 303.

In step S205, the control unit 26 lifts up the fork 1 and causes the driven wheel 3 to contact with the upper face 303a of the step member 303. In step S205, the lift motor 23 is operated to lift up the fork 1, and the lift motor 23 is stopped when the detection signal received from the first step detection unit 17 indicates that the driven wheel 3 is being contacted with the upper face 303a of the step member 303.

In step S206, the control unit 26 activates or drives the drive motor 22 to move the lifter 100 into the pallet 300 until the driven wheel 3 steps over or passes over the step member 303.

In step S207, the control unit 26 checks or confirms whether the fork 1 is inserted into a position where the pallet 300 can be held in a stable state by the fork 1. In step S207, the control unit 26 can determine the position of the fork 1 using signals received from the pallet position detection unit 7, such as a photo reflector, provided near the root of the fork 1, and can determine the position of the fork 1 by measuring the travel distance after detecting the step member 303 for the first time.

If the fork 1 is inserted into the position where the pallet 300 can be held in the stable state (S207: Yes), the control unit 26 deactivates the drive motor 22 to end the insertion operation, and if the fork 1 is not yet inserted into the position where the pallet 300 can be held in the stable state (S207: No), the sequence returns to step S201 and then a stepping-over operation is repeated.

Figure 52:
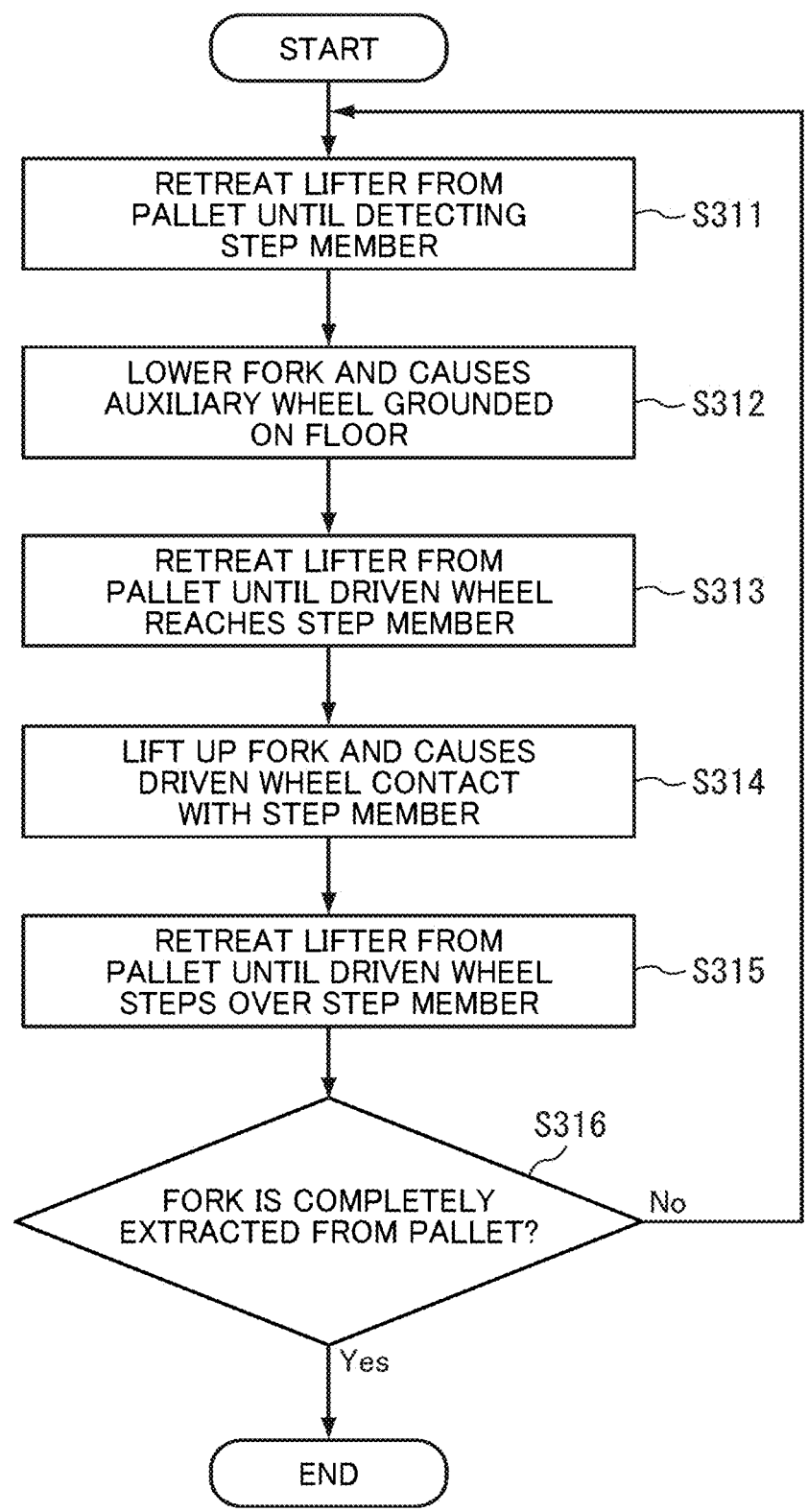
FIG. 52 is a flowchart illustrating a controlling sequence during an extraction operation of the first embodiment.

FIG. 52 is a flowchart illustrating the controlling sequence during the extraction operation of the first embodiment. That is, FIG. 52 illustrates a case of the fork extraction operation from the pallet 300 when the auxiliary wheel 4 is disposed or mounted at the front side of the driven wheel 3 (see FIGS. 17 to 22).

Under a state when the fork 1 is being inserted into the pallet 300, in step S311, until the second step detection unit 18 detects the step member 303, the control unit 26 activates or drives the drive motor 22 to move the lifter 100 in a direction, opposite to the direction when inserting the fork 1 into the pallet 300, to retreat or extract the fork 1 from the pallet 300.

After the second step detection unit 18 detects the step member 303, in step S312, the control unit 26 activates or drives the lift motor 23 to lower the fork 1 and causes the auxiliary wheel 4 grounded on the floor, such as the ground. In step S312, the fork 1 is lowered until a height of the driven wheel 3 becomes higher than a height of the step member 303.

In step S313, the control unit 26 activates or drives the drive motor 22 to retreat the lifter 100 from the pallet 300 until the driven wheel 3 reaches the step member 303.

In step S314, the control unit 26 activates or drives the lift motor 23 to lift up the fork 1 and causes the driven wheel 3 to contact with the upper face 303a of the step member 303.

In step S314, the fork 1 is lifted up until a height of the auxiliary wheel 4 becomes higher than a height of the step member 303.

In step S315, the control unit 26 activates or drives the drive motor 22 to retreat the lifter 100 from the pallet 300 until the driven wheel 3 steps over the step member 303.

In step S316, the control unit 26 checks or confirms whether the fork 1 is completely extracted from the pallet 300. The control unit 26 can perform whether the fork 1 is completely extracted from the pallet 300, for example, by measuring the traveling distance from the start time of the fork extraction operation. If the fork 1 is completely extracted from the pallet 300 (S316: Yes), the control unit 26 ends the fork extraction operation, and if the fork 1 is not yet extracted from the pallet 300 (S316: No), the sequence returns to step S311 and then a stepping-over operation is repeated.

Figure 53:
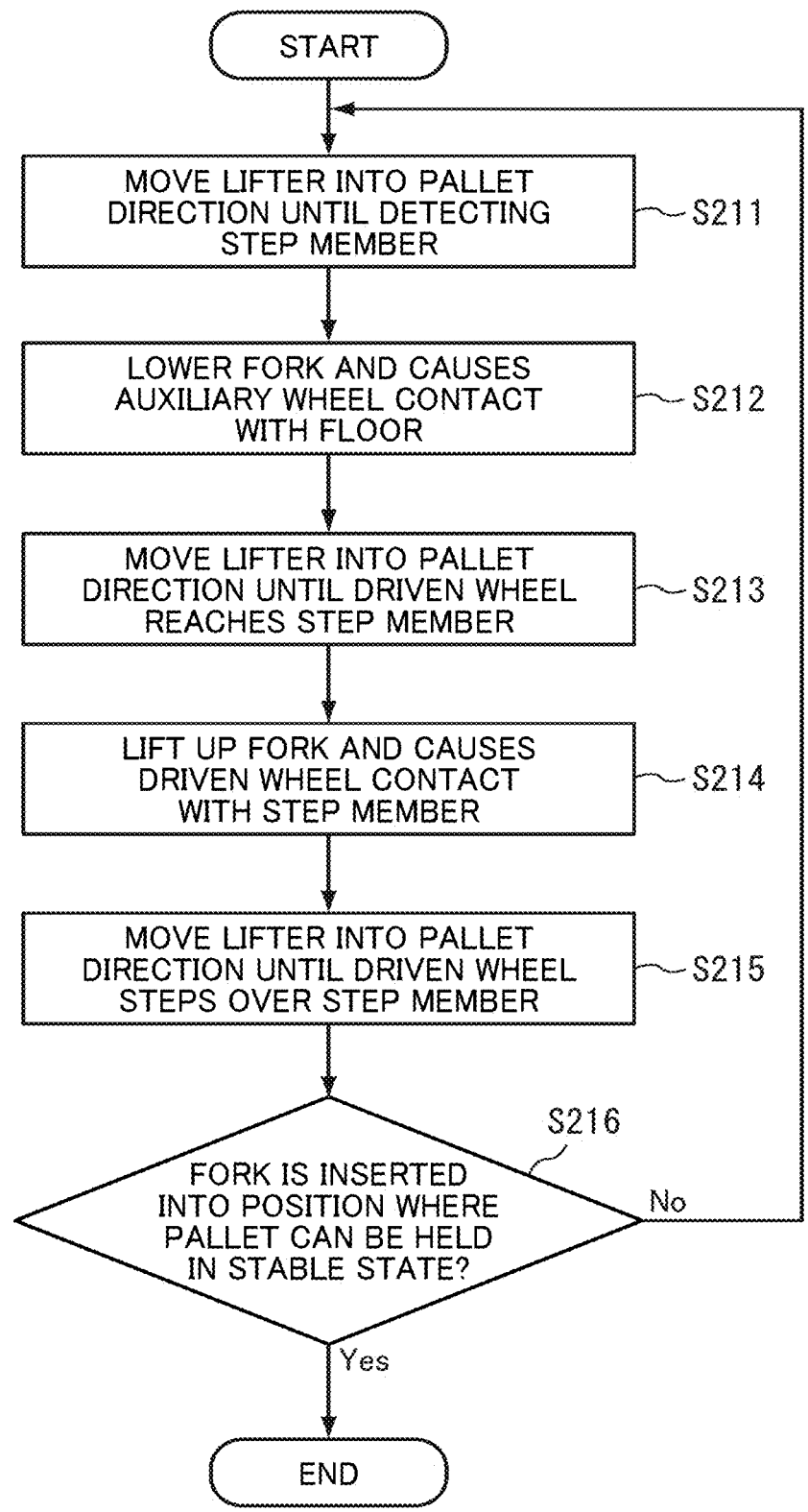
FIG. 53 is a flowchart illustrating a controlling sequence during an insertion operation of the second embodiment.

FIG. 53 is a flowchart illustrating the controlling sequence during the insertion operation of the second embodiment. That is, FIG. 53 is a flowchart illustrating the controlling sequence of the fork insertion operation into the pallet 300 in a case where the auxiliary wheel 5 is disposed or mounted at the position closer to the rear end portion 1A compared to the driven wheel 3 in the fork 1.

In step S211, the control unit 26 moves the lifter 100 into the pallet direction until the first step detection unit 17 detects the step member 303. In step S211, the drive motor 22 is activated or driven to rotate the drive wheel 2.

After the first step detection unit 17 detects the step member 303, in step S212, the control unit 26 activates or drives the lift motor 23 to lower the fork 1 to ground or contact the auxiliary wheel 5 on the floor used as a pallet placing surface. In step S212, the fork 1 is lowered until the height of the driven wheel 3 becomes higher than the height of the step member 303.

In step S213, the control unit 26 activates or drives the drive motor 22 to move the lifter 100 into the pallet 300 until the driven wheel 3 reaches the step member 303.

In step S214, the control unit 26 activates or drives the lift motor 23 to lift up the fork 1 and causes the driven wheel 3 to contact with the upper face 303a of the step member 303. In step S214, the lift motor 23 is operated in a direction to lift up the fork 1 until a height of the auxiliary wheel 5 becomes higher than the height of the step member 303.

In step S215, the control unit 26 activates or drives the drive motor 22 to move the lifter 100 into the pallet 300 until the driven wheel 3 steps over the step member 303.

In step S216, the control unit 26 checks or confirms whether the fork 1 is inserted into a position where the pallet 300 can be held in a stable state by the fork 1. In step S216, the control unit 26 can determine the position of the fork 1 using signals received from the pallet position detection unit 7, such as a photo reflector, provided near the root of the fork 1, and can determine the position of the fork 1 by measuring the travel distance after detecting the step member 303 for the first time.

If the fork 1 is inserted into the position where the pallet 300 can be held in the stable state (S216: Yes), the control unit 26 deactivates the drive motor 22 to end the insertion operation, and if the fork 1 is not yet inserted into the position where the pallet 300 can be held in the stable state (S216: No), the sequence returns to step S211 and then a stepping-over operation is repeated.

Figure 54:
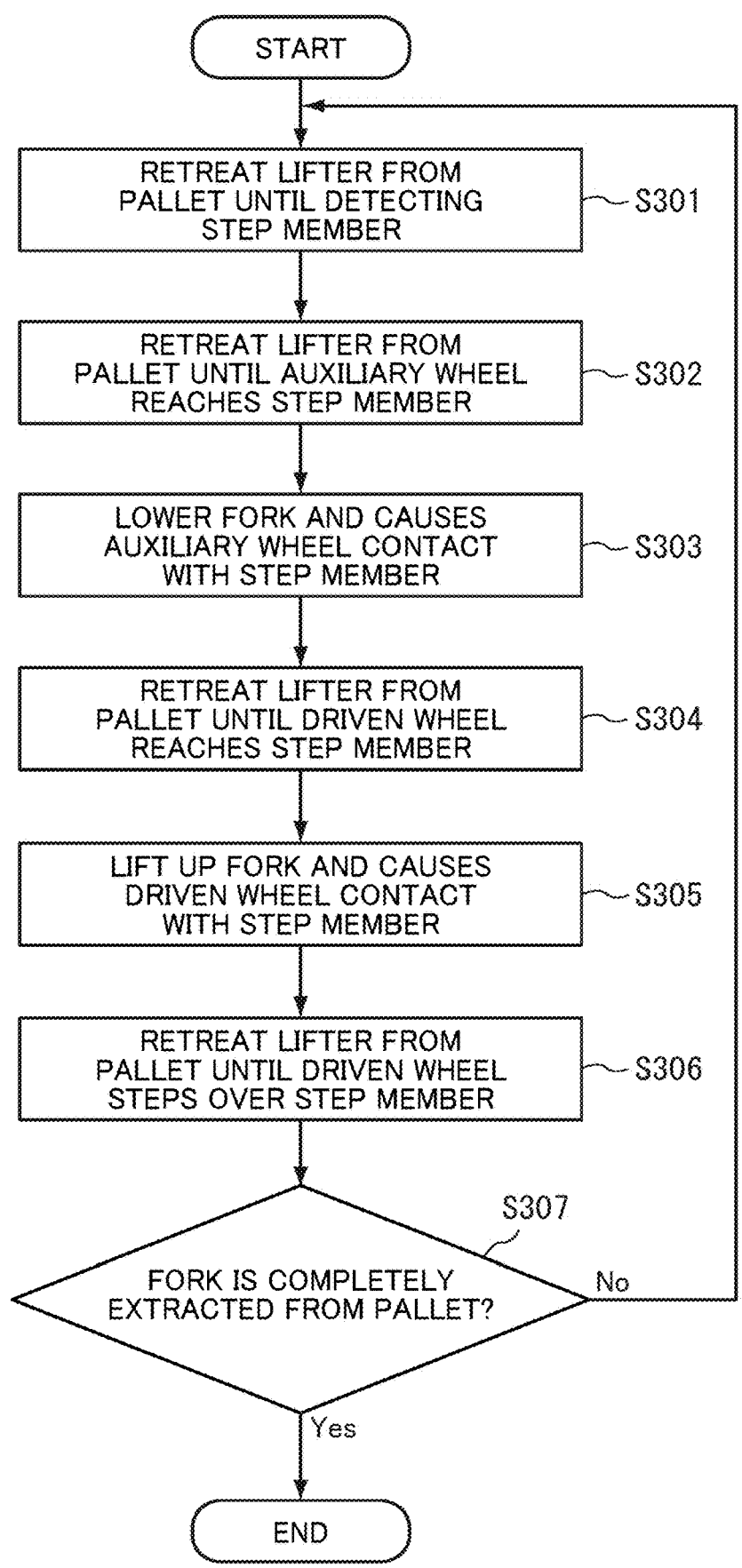
FIG. 54 is a flowchart illustrating a controlling sequence during an extraction operation of the second embodiment and the third embodiment.

FIG. 54 is a flowchart illustrating the controlling sequence during the extraction operation of the second embodiment and the third embodiment. That is, FIG. 54 is a flowchart illustrating the controlling sequence of fork extraction operation of the pallet 300 in a case where the auxiliary wheel 5 is disposed or mounted at the position closer to the rear end portion 1A compared to the driven wheel 3 in the fork 1, and a case where the auxiliary wheels 4 and 5 are disposed at both of the front side and rear side of the driven wheel 3.

Before step S301, the fork 1 is being inserted into the pallet 300. Then, in step S301, the control unit 26 causes the lifter 100 to retreat in a direction in which the fork 1 is extracted from the pallet 300 until the second step detection unit 18 detects the step member 303. That is, the drive motor 22 is rotated in a direction, opposite to the forward direction (insertion direction), to rotate the drive wheel 2.

When the second step detection unit 18 detects the step member 303, in step S302, the control unit 26 retreats the lifter 100 from the pallet 300 until the auxiliary wheel 5 reaches the step member 303.

In step S303, the control unit 26 lowers the fork 1 and causes the auxiliary wheel 5 to contact with the upper face 303a of the step member 303. In step S303, the lift motor 23 is activated or driven to lower the fork 1 until the height of the driven wheel 3 becomes higher than the height of the auxiliary wheel 5. The height of the driven wheel 3 and the height of the auxiliary wheel 5 can be detected by the second step detection unit 18, or can be set by the lift motor 23 driven by a pre-set lifting amount or elevation amount.

In step S304, the control unit 26 activates or drives the drive motor 22 to retreat the lifter 100 from the pallet 300 until the driven wheel 3 reaches the step member 303.

In step S305, the control unit 26 activates or drives the lift motor 23 to lift up the fork 1 and causes the driven wheel 3 to contact with the upper face 303a of the step member 303.

In step S306, the control unit 26 rotates the drive motor 22 to retreat the lifter 100 from the pallet 300 until the driven wheel 3 steps over the step member 303.

In step S307, the control unit 26 checks or confirms whether the fork 1 is completely extracted from the pallet 300. The control unit 26 can perform whether the fork 1 is completely extracted from the pallet 300, for example, by measuring the traveling distance from a start time of the fork extraction operation. If the fork 1 is completely extracted from the pallet 300 (S307: Yes), the control unit 26 ends the fork extraction operation, and if the fork 1 is not yet extracted from the pallet 300 (S307: No), the sequence returns to step S301 and then a stepping-over operation is repeated.

Since the lifter 100 (transport apparatus) having the fork 1 can be adapted as autonomous travel apparatus, the lifter 100 having the fork 1 can be applied to an automatic transport system used, for example, in warehouses.

Figure 55:
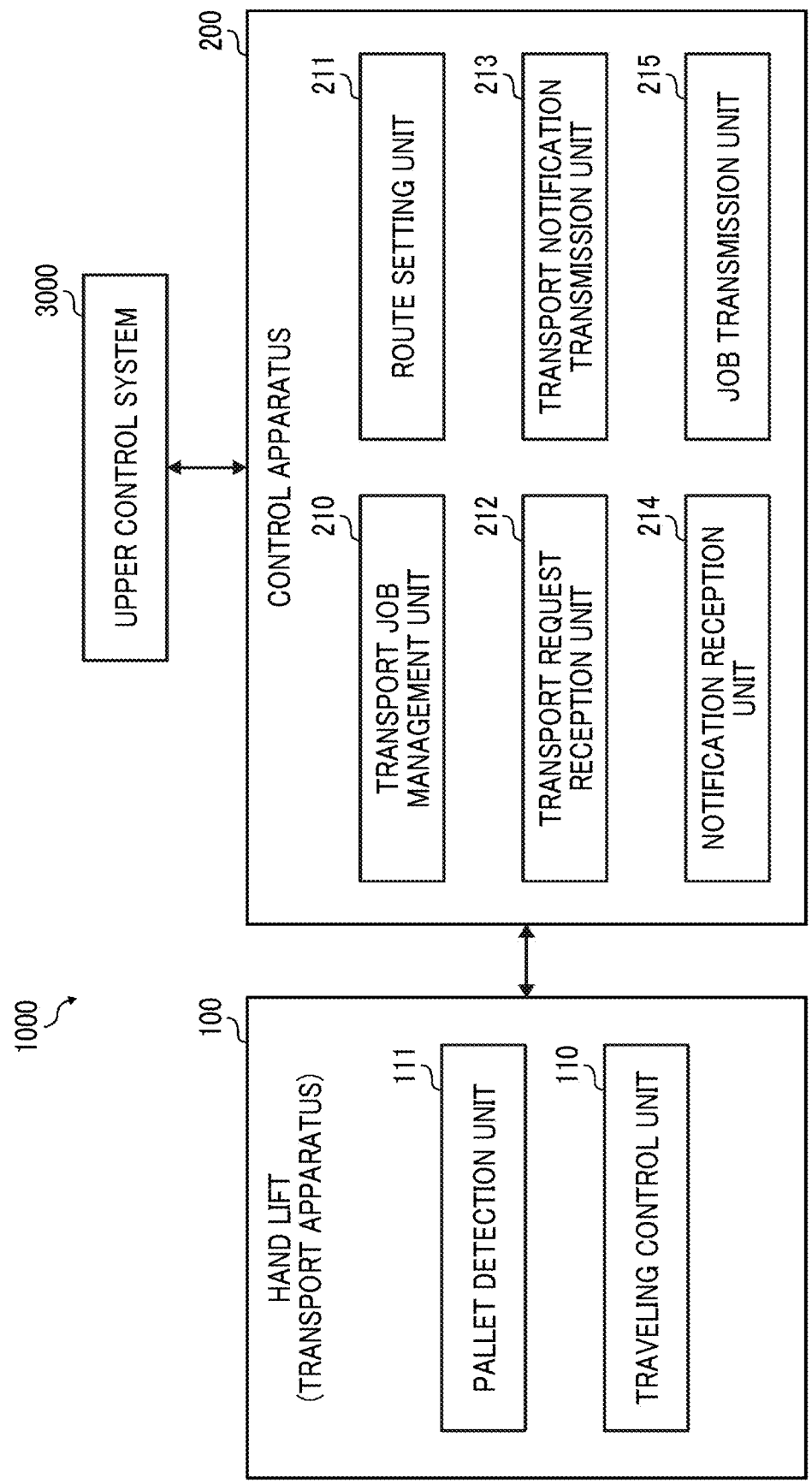
FIG. 55 is an example of a hardware block diagram of a control system of an automatic transport system that uses a transport apparatus.

Hereinafter, a description is given of the automatic transport system with reference to FIG. 55. FIG. 55 is an example configuration of an automatic transport system 1000. The automatic transport system 1000 includes, for example, the lifter 100, a control apparatus 200 used for controlling a traveling route of the lifter 100, and an upper control system 3000 for controlling the control apparatus 200.

The lifter 100 includes, for example, a pallet detection unit 111 and a traveling control unit 110. The traveling control unit 110 controls the control unit 26 that controls traveling and stopping of the lifter 100.

The upper control system 3000 outputs transport request information, and has a function of transmitting the transport request information request information to the control apparatus 200.

The control apparatus 200 is provided with a function of generating a job performed by the lifter 100 based on the transport request information received from the upper control system 3000, managing or controlling the job, and setting the traveling route. That is, the control apparatus 200 includes, for example, a transport job management unit 210, a route setting unit 211, a transport request reception unit 212, a transport notification transmission unit 213, a notification reception unit 214, and a job transmission unit 215. The job transmission unit 215 is implemented by a communication device that transmits information to the lifter 100.

The lifter 100 receives a job transmitted from the job transmission unit 215 of the control apparatus 200, and autonomously travels under the control of the traveling control unit 110 according to the information of the job. The job transmitted from the job transmission unit 215 is generated and managed based on a transport request received from the upper control system 3000 by the transport job management unit 210.

The autonomous driving of the lifter 100 is implemented by a method of controlling the traveling distance and posture using the odometry and gyro sensor, a method of recognizing the position of the lifter 100 based on the map information used by the lifter 100 and external information acquired by the laser range finder and camera.

The traveling route is set by the route setting unit 211 of the control apparatus 200 based on, for example, two dimensional coordinate information, which is included in the transport request.

The lifter 100 includes a communication function for transmitting a job completion notification to the notification reception unit 214 of the control apparatus 200 when the job is completed. When the transport job is completed, the control apparatus 200 uses the transport notification transmission unit 213 to transmit a transport completion notice to the upper control system 3000.

Figure 56:
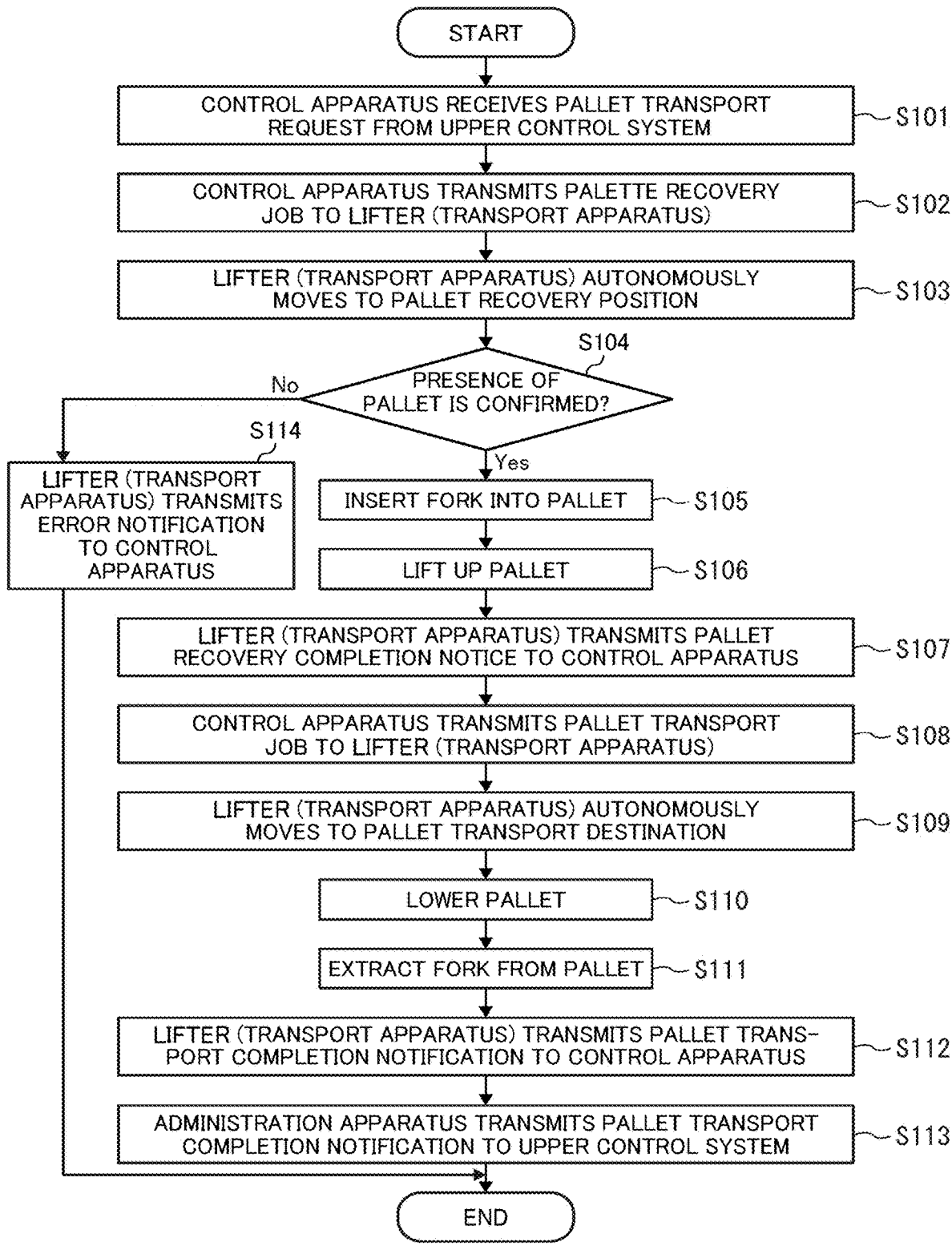
FIG. 56 is a flowchart of a processing of an automatic transport operation.

FIG. 56 is a flowchart of a processing when an automatic transport operation using the lifter 100 for moving the pallet 300 is performed as a job. Hereinafter, a description is given of the operation of the automatic transport system 1000 with reference to FIG. 56. The automatic transport system 1000 can be implemented by transmitting and receiving information between the lifter 100, the control apparatus 200, and the upper control system 3000 via wired or wireless communication, and executing various set programs.

In step S101, the transport request reception unit 212 of the control apparatus 200 receives a pallet transport request transmitted from the upper control system 3000, such as a factory production process management system.

In step S102, the job transmission unit 215 of the control apparatus 200 transmits a pallet recovery job, generated by the transport job management unit 210 based on the pallet transport request, to the lifter 100 (transport apparatus).

In step S103, the lifter 100 autonomously moves to a pallet recovery position. The autonomous driving is performed by controlling the lifter 100 using the traveling control unit 110.

When the lifter 100 arrives at the pallet recovery position, in step S104, the pallet detection unit 111 of the lifter 100 checks or confirms presence or absence of a pallet. The pallet detection unit 111 can check or confirm the presence or absence of the pallet using, for example, a method of recognizing the insertion hole 301 of the pallet 300 using a depth camera or a method of using information obtained from the pallet position detection unit 7.

In step S104, if the pallet 300 exists (S104: Yes), the fork insertion operation of inserting the fork 1 into the pallet 300 is performed in step S105.

If the presence of the pallet 300 is not confirmed (S104: No), in step S114, the lifter 100 transmits an error notification to the notification reception unit 214 of the control apparatus 200.

In step S105, the fork insertion operation of inserting the fork 1 into the pallet 300 is performed, in which the fork 1 including any one of the auxiliary wheels 4 and 5, or both of the auxiliary wheels 4 and 5 described above in the first embodiment to third embodiment is used. The completion of the insertion of the fork 1 can be determined, for example, using the detection information obtained from the pallet position detection unit 7 provided near the root of the fork 1 (the body 6), or the distance that the lifter 100 has moved forward when the fork 1 is inserted into the insertion hole 301 of the pallet 300.

After completing the insertion of the fork 1, in step S106, the pallet 300 is lifted up by the fork 1. In step S106, the lift motor 23 is operated to lift up the fork 1, and the pallet 300 is set to a state where the pallet 300 is lifted up from the floor or ground.

After completing the lifting of the pallet 300, in step S107, the lifter 100 (transport apparatus) transmits a notice of completion of the pallet recovery to the notification reception unit 214 of the control apparatus 200.

In step S108, the job transmission unit 215 of the control apparatus 200 transmits a pallet transport job, generated from the pallet transport request by the transport job management unit 210, to the lifter 100.

In step S109, the lifter 100 autonomously moves to a pallet transport destination based on the pallet transport job.

In step S110, when the lifter 100 arrives at the pallet transport destination, the lifter 100 lowers the pallet 300. In step S110, the lift motor 23 is operated in a direction, opposite to the direction used for lifting up the pallet, to lower the fork 1 to place the pallet 300 on the floor used for placing the pallet 300.

Then, in step S111, the fork extraction operation of extracting the fork 1 from the pallet 300 is performed as described in the first embodiment to the third embodiment.

Then, in step S112, the lifter 100 transmits a pallet transport completion notification to the notification reception unit 214 of the control apparatus 200.

In step S113, the transport notification transmission unit 213 of the control apparatus 200 transmits the pallet transport completion notification to the upper control system 3000, with which one job is completed.

As described above, the fork 1 includes, for example, the auxiliary wheels 4 and/or 5 that can be positioned relatively lower than the driven wheel 3 mounted at the front end portion of the fork 1, and the first step detection unit 17 and/or the second step detection unit 18, provided at least in the front side and rear side of the rotation center axis of the auxiliary wheel, for detecting the step member 303 formed on the bottom side of the pallet 300. Since the fork 1 is lowered based on the detection result of the first step detection unit 17 and/or the second step detection unit 18 to contact the auxiliary wheels 4 and/or 5 on the step member 303, the auxiliary wheel 4 or the auxiliary wheel 5 can be contacted on the upper face 303a of the step member 303 while stepping over the step member 303, in which the lowering amount of the fork 1 can be set smaller compared to when the auxiliary wheel 4 or the auxiliary wheel 5 is grounded on the floor.

In the first embodiment, the auxiliary wheel 4 is provided at the front side of the driven wheel 3 (the direction in which the fork 1 is inserted), and the positional relationship between the auxiliary wheel 4 and the driven wheel 3 changes based on the detection result of the first step detection unit 17, with which the resistance during the insertion of the fork 1 into the pallet 300 by the lifter 100 can be reduced.

In the second embodiment, the auxiliary wheel 5 is provided at the rear side of the driven wheel 3 (the direction in which the fork 1 is extracted), and the positional relationship between the auxiliary wheel 5 and the driven wheel 3 changes based on the detection result of the second step detection unit 18, with which the resistance during the insertion of the fork 1 into the pallet 300 by the lifter 100 can be reduced.

In the third embodiment, the auxiliary wheel 4 is provided at the front side of the driven wheel 3 (the direction in which the fork 1 is inserted) and the auxiliary wheel 5 is provided at the rear side of the driven wheel 3 (the direction in which the fork 1 is extracted), and the positional relationship between the auxiliary wheels 4 and 5 and the driven wheel 3 changes based on the detection results of the first step detection unit 17 and the second step detection unit 18, with which the resistance during the insertion of the fork 1 into the pallet 300 and extraction of the fork 1 from the pallet 300 the pallet 300 by the lifter 100 can be reduced.

The pallet having 1100×1100 size used in Japan has the step member having a height of approximately 15 mm, and a height of the insertion hole of the pallet is about 90 mm. On the other hand, the height of the fork 1 of the lifter 100 is about 50 mm to 60 mm, and the movable range of the fork 1 in the elevation direction or up-to-down direction when performing the fork insertion operation is about 30 mm. Therefore, the reduction of the elevation or lift amount of the fork 1 can become an effective technique because it can reduce the resistance during the fork insertion into the pallet 300 and the fork extraction from the pallet 300 having the standard size.

In the third embodiment, a space of the auxiliary wheel 4 and a space of the auxiliary wheel 5 are required to be set at the front side and rear side of the driven wheel 3.

In the first or second embodiments, when the auxiliary wheel 4 or auxiliary wheel 5 is provided at any one the front side and rear side of the driven wheel 3 (the space for disposing the auxiliary wheels are not settable at both of the front side and rear side of the driven wheel 3), when the pallet 300 having the step member 303 having a lower height is used, and when the stepping over the step member 303 can be performed by grounding the auxiliary wheel 4 or the auxiliary wheel 5 on the floor, the above described effect can be attained. That is, in the case where the elevation or lift amount of the fork 1 is to be reduced when to perform the stepping over action of the step member 303, it is effective to provide the auxiliary wheel 4 and the auxiliary wheel 5 at the front side and rear side of the driven wheel 3 or to provide any one of the auxiliary wheels 4 and 5 at any one of the front side and rear side of the driven wheel 3 (the space for disposing the auxiliary wheels are not settable at both of the front side and rear side of the driven wheel 3) to reduce the resistance during the fork insertion into the pallet 300 and the fork extraction from the pallet 300

Hereinafter, a description is given of dimensions of the driven wheel 3 and the auxiliary wheels 4 and 5, and the pallet used for the lifter 100. The auxiliary wheels 4 and 5 have the same diameter and made of the same material.

Driven wheel: diameter of 80 mm, material of nylon, load resistance is 1000 kg because the maximum loading weight is 1000 kg.

Auxiliary wheel: diameter of 35 mm, material of nylon, load resistance is 120 kg (bearing wheel having minimum diameter easy to purchase)

Pallet size: width of 1100 mm, depth of 1100 mm, height of 120 mm

Height of step member: 15 mm

Depth of step member: 90 mm (measured value of wooden pallet), 150 mm (measured value of plastic pallet)

Height of insertion hole: 90 mm

Fork height: 60 mm

Distance from the upper face of fork to the rotation center axis of the auxiliary wheel: 60 mm It is preferable that the auxiliary wheel diameter is set smaller to secure a clearance between the driven wheel 3 that is movable by lifting and lowering the fork 1 and the auxiliary wheel 4 and the auxiliary wheel 5 attached or mounted to the fork 1, to set a wider clearance when inserting the fork 1 into the insertion hole having the height of 90 mm, and to limit the distance between the rotation center axis of the driven wheel 3 (axis shaft 15) and the axis shafts 16 and 12 of the auxiliary wheels (the depth of the step member) to 90 mm or less.

Figure 57A:
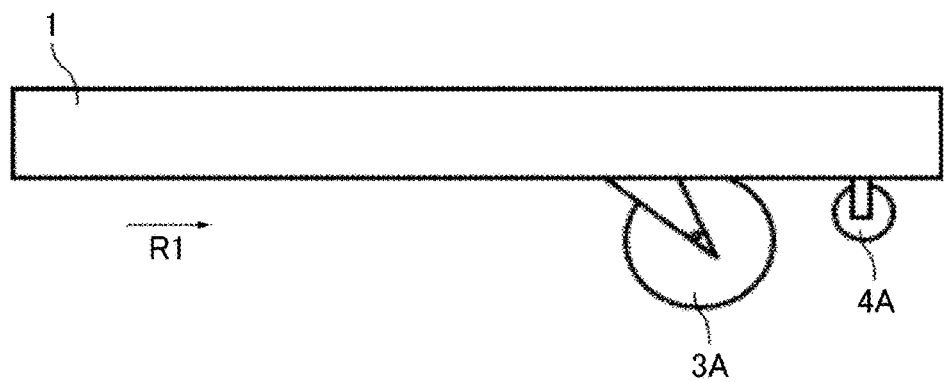
FIGS. 57A, 57B and 57C illustrate examples of conventional lifters having wheel configurations for facilitating a stepping over of step member of a pallet.
Figure 57B:
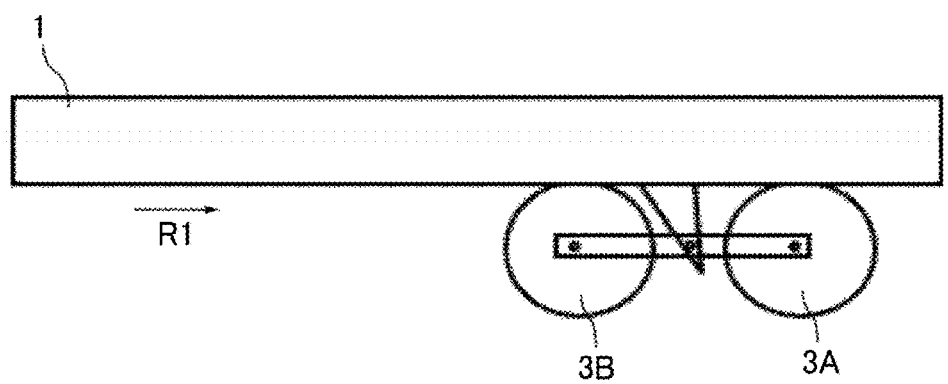
Figure 57C:
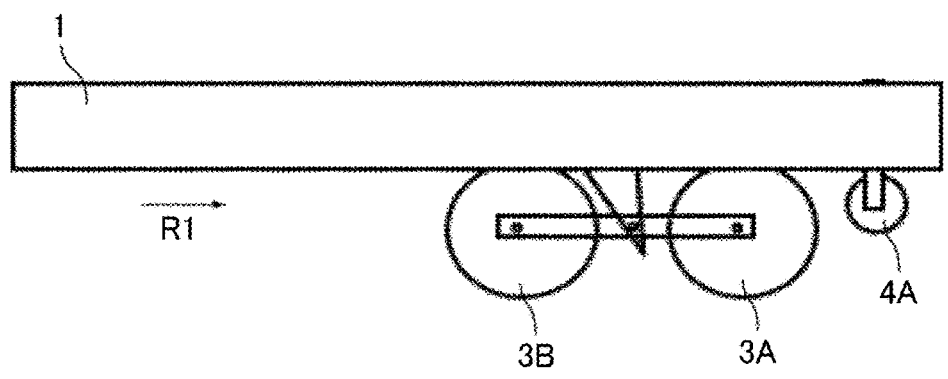

FIGS. 57A to 57C illustrate examples of conventional lifters having wheel configurations for facilitating a stepping over of step member of a pallet. FIG. 57A illustrates a configuration of comparison example 1 having a driven wheel 3A, and an auxiliary wheel 4A fixed to a fork in the front side of the driven wheel 3A. FIG. 57B illustrates a configuration of comparison example 2 having two driven wheel 3A and 3B being connected using a link. FIG. 57C illustrates a configuration of comparison example 3 combing comparison examples 1 and 2.

The inventors have performed a computer simulation using a computer-executable analysis software for comparing the comparison examples 1, 2, and 3 illustrated in FIGS. 57A to 57C. The simulation results are indicated in FIG. 58. In FIG. 58, the circle (O) means a result that when the transport apparatus contacts the pallet, the fork can be inserted into the pallet by stepping over the step member of the pallet without pushing the pallet, while the cross (X) means a result that when the transport apparatus contacts the pallet, the transport apparatus pushes the pallet and cannot stepover the step member of the pallet, and the fork cannot be inserted into the pallet. The simulation was performed using following three wheels configurations.

(1) Comparison example 1 having a configuration including the driven wheel 3A and the auxiliary wheel 4A fixed to the fork in the front side of the driven wheel 3A (see FIG. 57A).

(2) Comparison example 2 having a configuration including the driven wheels 3A and 3B (two wheels) being connected by the link (see FIG. 57B).

(3) Comparison example 3 having a configuration including the driven wheels 3A and 3B (two wheels) being connected by the link, and the auxiliary wheel 4A fixed to the fork in the front side of the driven wheel 3A and 3B (see FIG. 57C).

Further, the simulation was performed using following conditions for pallet.

Condition C1: Pallet having weight of 4.8 kg (actual weight of wooden pallet having typical chrysanthemum size of 950 mm×650 mm used in the printing industry in Japan)

10 kg (actual weight of plastic pallet of 1100 mm×1100 mm used in Japan)

15 kg (actual weight of wooden pallet of 1100 mm×1100 mm used in Japan)

20 kg 30 kg 40 kg

Condition C2: static friction coefficient of pallet of 0.22 (measured using spring scale)

Condition C3: Height of step member of pallet of 15 mm

Further, the simulation was performed using following conditions for the transport apparatus such as the lifter 100.

Condition C4: Fork weight of 20 kg

Condition C5: Driven wheel diameter of 80 mm

Condition C6: Auxiliary wheel diameter of 35 mm

Condition C7: Height of auxiliary wheel from ground when inserting is 11.5 mm (relative height to step member is 3.5 mm)

Condition C8: Traveling speed for insertion is 0.2 m/s

Under the above conditions, the simulation of inserting the forks having the respective wheel configurations into the pallet was performed. When the pallet was an empty pallet not loaded with a load object, the wheel configurations of comparison examples 2 and 3 can step over the step member of pallets having the weight of 20 kg to 40 kg while the wheel configuration of comparison example 1 can step over the step member of pallet having the weight of 40 kg alone, which means the wheel configurations of comparison examples 2 and 3 can step over the step member of pallet having the light-weight compared to the wheel configuration of comparison example 1.

However, as indicated in FIG. 58, if the pallet weight becomes lighter, such as 15 kg or less, the wheel configurations of comparison examples 2 and 3 cannot step over the step member of pallet, and the wheel configuration of comparison example 1 cannot step over the step member of pallet, which means the wheel configurations of comparison examples 1, 2 and 3 cannot step over the step member of pallet if the pallet weight is equal to or less than a given weight, such as 15 kg or less. This may occur because the weight that the lifter can step over the step member of pallet and the static friction force of the pallet exerting on the floor where the pallet is placed may be substantially the same, the force exerted by the driven wheel to the step member of the pallet into the insertion direction of the driven wheel when stepping over the step member of the pallet may become greater than the static friction force of the pallet exerting on the floor, which may be one factor of the movement of the pallet when inserting the driven wheel.

By contrast, as to the wheel configuration of the fork 1 applying the above described embodiments, even if the fork 1 is inserted into the lighter-weight pallet, such as a pallet having 4.8 kg, the lifter 100 can step over the step member. This may occur because, in the above described embodiments, the driven wheel 3 is moved upward during the insertion operation of the fork 1 and only the auxiliary wheel 4 contacts with the step member 303 as illustrated in FIGS. 12 and 13, and thereby the force exerted on the step member 303 in the direction (i.e., fork insertion direction) becomes smaller than the static frictional force of the pallet 300. Further, when the driven wheel 3 is positioned or comes above the step member 303, and then the driven wheel 3 is lowered and moved while being contacted on the upper face 303a of the step member 303 (see FIGS. 14 and 15), the driven wheel 3 can apply a pushing force to the step member 303, with which the static frictional force of the pallet 300 may increase.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above. For example, the primary rotatable member is not limited to the wheel as long as the primary rotatable member can be a ball or a roller having a shape that can contact on the ground surface using a point contact or a line contact, and being rotatably supported. Although an example of the transport apparatus has been described using the lifter 100 which is capable of automatic traveling, the configuration of the transport apparatus is not limited to thereto. For example, the effects equivalent to those described above can be attained for any manual transport apparatus that lifts up the fork by operating a handle unit, and any non-automatic-traveling transport apparatus that lifts up the fork using a drive source by applying the configuration of the driven wheel 3 that moves up and down according to the elevation of the fork, the configuration of the auxiliary wheels 4 and 5, and the configuration of the first step detection unit 17 and the second step detection unit 18 of the above described embodiment.

As to the above described embodiments, the primary rotatable member is provided on the fork, the auxiliary rotatable member provided on the fork at least the position closer to the fork insertion direction or the fork extraction direction compared to the primary rotatable member, the auxiliary rotator can be positioned relatively lower than the primary rotatable member by lowering the fork in at least one of the fork insertion direction or the fork extraction direction, the step detection unit provided on the fork at least the position closer to the fork insertion direction or the fork extraction direction compared to the auxiliary rotatable member, detects a step member formed on a carriage base. When the step member is detected by the step detection unit, the fork is lowered, with which the load applied to the pallet when passing over the step member can be reduced compared to the conventional configurations. As to the above described embodiments, the transport apparatus that can improve operability and efficiency without increasing the size of transport apparatus can be provided.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. A transport apparatus for transporting a carriage base, comprising:
   a body;
   a fork having a shape extending from the body, the fork having one portion supported by the body and another portion protruded from the body, the fork is insertable into the carriage base and extractable from the carriage base, the fork being inserted into the carriage base when transporting the carriage base using the transport apparatus;
   a lifter including one or more links;
   a controller configured to control at least the lifter;
   a primary rotatable structure mounted at a front end portion of the fork via the lifter, a relative position of the primary rotatable structure with respect to the fork is changeable using the lifter;
   an auxiliary rotatable structure mounted at least at one rotatable structure-attaching position of the fork closer to a front end portion of the fork compared to the primary rotatable structure along an insertion direction or another rotatable structure-attaching position of the fork closer to a rear end portion of the fork compared to the primary rotatable structure along an extraction direction of the fork, the auxiliary rotatable structure is settable at a position where the lowest point of the auxiliary rotatable structure is lower than the lowest point of the primary rotatable structure when the fork is lowered using the lifter; and
   a step detector, disposed at least at one detector-attaching position of the fork closer to the front end portion of the fork compared to the auxiliary rotatable structure along the insertion direction or another detector-attaching position of the fork closer to the rear end portion of the fork compared to the auxiliary rotatable structure along the extraction direction of the fork, the step detector detects a step structure formed in the carriage base,
   wherein the controller lowers the fork using the lifter in response to a detection of the step structure by the step detector.

2. The transport apparatus according to claim 1,
   wherein the auxiliary rotatable structure is mounted at the one rotatable structure-attaching position of the fork closer to the front end portion of the fork compared to the primary rotatable structure along the insertion direction of the fork, and
   wherein the step detector is mounted at the one detector attaching position of the fork closer to the front end portion of the fork compared to the auxiliary rotatable structure along the insertion direction of the fork.

3. The transport apparatus according to claim 1,
   wherein the auxiliary rotatable member is mounted at the another rotatable structure-attaching position of the fork closer to the rear end portion of the fork compared to the primary rotatable structure along the extraction direction of the fork, and
   wherein the step detector is mounted at the another detector attaching position of the fork closer to the rear end portion of the fork compared to the auxiliary rotatable structure along the extraction direction of the fork.

4. The transport apparatus according to claim 1,
   wherein the auxiliary rotatable structure comprises a first auxiliary rotatable structure and a second auxiliary rotatable structure, the first auxiliary rotatable structure is mounted at the one rotatable structure-attaching position of the fork closer to the front end portion of the fork compared to the primary rotatable structure along the insertion direction of the fork, and the second auxiliary rotatable structure is mounted at the another rotatable-structure-attaching position of the fork closer to the rear end portion of the fork compared to the primary rotatable structure along the extraction direction of the fork, and
   wherein the step detector comprises a first step detector and a second step detector, the first step detector is mounted at the one detector-attaching position of the fork closer to the front end portion of the fork compared to the auxiliary rotatable structure along the insertion direction of the fork, and the second step detector is mounted at the another detector-attaching position of the fork closer to the rear end portion of the fork compared to the auxiliary rotatable structure along the extraction direction of the fork.

5. The transport apparatus according to claim 1,
wherein the lifter supports an end of the one portion of the fork with the body, and the fork is movable in an up-to-down direction using the lifter.

6. The transport apparatus according to claim 5,
wherein when the step detector detects the step structure of the carriage base to be transported, the step detector detects a distance from the fork to the step structure, the controller controls the lifter to move the fork to set the auxiliary rotatable structure higher than an upper face of the step structure, the controller further controls a drive motor to insert the fork into the carriage base until the auxiliary rotatable structure comes above the step structure, the controller further controls the lifter to lower the fork until the primary rotatable structure is positioned higher than the auxiliary rotatable structure, the controller further controls the drive motor to insert the fork into the carriage base while the auxiliary rotatable structure is being contacted on the upper face of the step structure until the primary rotatable structure comes above the upper face of the step structure, the controller further controls the lifter to lift up the fork until the primary rotatable structure is contacted on the upper face of the step structure, and the controller further controls the drive motor to insert the fork into the carriage base while the primary rotatable structure is being contacted on the upper face of the step structure and lower the primary rotatable structure from the step structure so that the fork holds the carriage base.

7. The transport apparatus according to claim 1,
wherein the body includes a drive source and a drive rotatable structure driven by the drive source, wherein the primary rotatable structure is a driven rotatable structure.

\* \* \* \* \*